(12) United States Patent
LeMay et al.

(10) Patent No.: US 12,019,562 B2
(45) Date of Patent: Jun. 25, 2024

(54) CRYPTOGRAPHIC COMPUTING INCLUDING ENHANCED CRYPTOGRAPHIC ADDRESSES

(71) Applicant: Intel Corporation, Santa Clara, CA (US)

(72) Inventors: Michael D. LeMay, Hillsboro, OR (US); David M. Durham, Beaverton, OR (US); Anjo Lucas Vahldiek-Oberwagner, Portland, OR (US); Anna Trikalinou, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/481,405

(22) Filed: Sep. 22, 2021

(65) Prior Publication Data

US 2022/0206958 A1     Jun. 30, 2022

Related U.S. Application Data

(63) Continuation of application No. PCT/US2020/067076, filed on Dec. 26, 2020.

(51) Int. Cl.
*G06F 12/14* (2006.01)
*G06F 12/1027* (2016.01)

(52) U.S. Cl.
CPC ...... *G06F 12/1408* (2013.01); *G06F 12/1027* (2013.01); *G06F 12/1441* (2013.01); *G06F 12/1466* (2013.01)

(58) Field of Classification Search
CPC ............. G06F 12/0253; G06F 12/0831; G06F 12/1027; G06F 12/1408; G06F 12/1441;
(Continued)

(56) References Cited

U.S. PATENT DOCUMENTS 9,015,824 B1    4/2015  Drewry et al.
9,135,450 B2    9/2015  Grobman et al.
(Continued)

FOREIGN PATENT DOCUMENTS

EP     3745273 A1      12/2020
KR   101754518 B1       7/2017
(Continued)

OTHER PUBLICATIONS

Carlini, Nicholas, et al.; "Control-Flow Bending: On the Effectiveness of Control-Flow Integrity," Proceedings of the 24th USENIX Security Symposium; Washington, D.C.; Aug. 2015; 16 pages.
(Continued)

*Primary Examiner* — Aracelis Ruiz
(74) *Attorney, Agent, or Firm* — Alliance IP, LLC

(57) ABSTRACT

An apparatus comprising a processor unit comprising circuitry to generate, for a first network host, a request for an object of a second network host, wherein the request comprises an address comprising a routable host ID of the second network host and an at least partially encrypted object ID, wherein the address uniquely identifies the object within a distributed computing domain; and a memory element to store at least a portion of the object.

23 Claims, 46 Drawing Sheets

(58) Field of Classification Search
CPC .............. G06F 12/1446; G06F 21/606; G06F 21/6218; G05F 21/606; G05F 21/6218
See application file for complete search history.

(56) References Cited

U.S. PATENT DOCUMENTS

| | | | |
|---|---|---|---|
| 9,390,268 | B1 | 7/2016 | Martini et al. |
| 9,436,847 | B2 | 9/2016 | Durham et al. |
| 9,753,754 | B2 | 9/2017 | Howell et al. |
| 9,830,162 | B2 | 11/2017 | LeMay |
| 9,954,950 | B2 | 4/2018 | LeMay et al. |
| 10,326,744 | B1 | 6/2019 | Nossik et al. |
| 10,706,164 | B2 | 7/2020 | LeMay et al. |
| 10,785,028 | B2 | 9/2020 | Girkar et al. |
| 10,860,709 | B2 | 12/2020 | LeMay et al. |
| 11,216,366 | B2 | 1/2022 | Durham et al. |
| 11,403,234 | B2 | 8/2022 | Durham et al. |
| 11,416,624 | B2 | 8/2022 | Durham et al. |
| 2002/0065993 | A1 | 5/2002 | Chauvel |
| 2005/0010804 | A1 | 1/2005 | Bruening et al. |
| 2006/0080553 | A1 | 4/2006 | Hall |
| 2007/0192592 | A1 | 8/2007 | Goettfert et al. |
| 2007/0220500 | A1 | 9/2007 | Saunier |
| 2008/0205651 | A1 | 8/2008 | Goto et al. |
| 2008/0229425 | A1 | 9/2008 | Perrin et al. |
| 2008/0288785 | A1 | 11/2008 | Rao et al. |
| 2008/0320601 | A1 | 12/2008 | Linsley |
| 2009/0249064 | A1 | 10/2009 | Atley et al. |
| 2010/0122088 | A1 | 5/2010 | Oxford |
| 2010/0281273 | A1 | 11/2010 | Lee et al. |
| 2013/0191649 | A1 | 7/2013 | Muff et al. |
| 2013/0232507 | A1 | 9/2013 | Farrugia et al. |
| 2013/0283396 | A1 | 10/2013 | Langer et al. |
| 2014/0020092 | A1 | 1/2014 | Davidov |
| 2014/0149730 | A1 | 5/2014 | Joshi et al. |
| 2015/0032996 | A1 | 1/2015 | Koeberl et al. |
| 2015/0381358 | A1 | 12/2015 | Grobman et al. |
| 2016/0092702 | A1 | 3/2016 | Durham et al. |
| 2016/0292422 | A1* | 10/2016 | Hayashi .................. G06F 21/57 |
| 2016/0335187 | A1 | 11/2016 | Greenspan et al. |
| 2016/0364341 | A1 | 12/2016 | Banginwar et al. |
| 2016/0371496 | A1 | 12/2016 | Sell |
| 2016/0380772 | A1 | 12/2016 | Gopal et al. |
| 2017/0063547 | A1 | 3/2017 | Brandt et al. |
| 2017/0093567 | A1 | 3/2017 | Gopal et al. |
| 2017/0235957 | A1 | 8/2017 | Maletsky |
| 2017/0237560 | A1 | 8/2017 | Mueller et al. |
| 2017/0249260 | A1 | 8/2017 | Sahita et al. |
| 2017/0300425 | A1 | 10/2017 | Meredith et al. |
| 2017/0308297 | A1 | 10/2017 | Roberts et al. |
| 2017/0344297 | A1 | 11/2017 | Woolman et al. |
| 2017/0364704 | A1 | 12/2017 | Wright et al. |
| 2018/0046576 | A1 | 2/2018 | Lesartre et al. |
| 2018/0082057 | A1 | 3/2018 | LeMay et al. |
| 2018/0268170 | A1 | 9/2018 | Li et al. |
| 2019/0044927 | A1 | 2/2019 | Sood et al. |
| 2019/0102322 | A1* | 4/2019 | Chhabra ............. G06F 12/1466 |
| 2019/0227951 | A1 | 7/2019 | Durham et al. |
| 2019/0339978 | A1* | 11/2019 | Wallach .............. G06F 12/0891 |
| 2019/0377574 | A1 | 12/2019 | Weimer |
| 2020/0050553 | A1 | 2/2020 | Hajj et al. |
| 2020/0089430 | A1 | 3/2020 | Kanno |
| 2020/0125501 | A1 | 4/2020 | Durham et al. |
| 2020/0125770 | A1 | 4/2020 | LeMay et al. |
| 2020/0159676 | A1 | 5/2020 | Durham et al. |
| 2020/0201789 | A1 | 6/2020 | Durham et al. |
| 2020/0241775 | A1 | 7/2020 | Breslow |
| 2020/0249995 | A1 | 8/2020 | Wong et al. |
| 2020/0379902 | A1 | 12/2020 | Durham et al. |
| 2020/0380140 | A1 | 12/2020 | Medwed et al. |
| 2020/0382303 | A1 | 12/2020 | Girkar et al. |
| 2021/0200673 | A1 | 7/2021 | Gupta et al. |
| 2021/0240638 | A1 | 8/2021 | Deutsch et al. |
| 2021/0405896 | A1 | 12/2021 | Durham et al. |
| 2022/0012188 | A1 | 1/2022 | Durham et al. |
| 2022/0382885 | A1 | 12/2022 | Durham et al. |

FOREIGN PATENT DOCUMENTS

| | | |
|---|---|---|
| WO | 2013147794 A1 | 10/2013 |
| WO | 2014059438 A2 | 4/2014 |
| WO | 2021162792 A1 | 8/2021 |
| WO | 2022139850 | 6/2022 |

OTHER PUBLICATIONS

Carr, Scott A. et al., "DataShield: Configurable Data Confidentiality and Integrity," Purdue University, ASIA CCS, '17, Apr. 2-6, 2017, Abu Dhabi, United Arab Emirates (12 pages).
Chen, Tony et al., "Pointer Tagging for Memory Safety." Microsoft. Retrieved from https://www.microsoft.com/en-us/research/uploads/prod/2019/07/Pointer-Tagging-for-Memory-Safety.pdf, 23 pages.
Durham, David M. et al; U.S. Appl. No. 17/539,933, filed Dec. 1, 2021.
Durham, David M., et al.; U.S. Appl. No. 17/791,000; filed Jul. 6, 2022.
EPO; Extended European Search Report issued in EP Patent Application No. 20210029.3, dated May 20, 2021; 8 pages.
EPO; Office Action issued in EP Patent Application No. 20210029.3, dated Mar. 16, 2022; 4 pages.
Haraken@, et al.,; "MTECheckedPtr" Last updated Jul. 9, 2020; Accessed Jul. 19, 2022; Retrieved from https://docs.google.com/document/d/1ph7iOorkGqTuETFZp-xvHV4L2rYootuz1ThzAAoGe30/edit#heading=h.b57m9s7iv7yr, 9 pages.
Haraken@; "CheckedPtr2 and CheckedPtr3," retrieved from the Internet at https://docs.google.com/document/d/14TsvTgswPUOQuQol9TmkFQnuSaFD8ZLHRvzapNw15vs; published Apr. 4, 2020; 8 pages.
Hong, H. et al., "Data-Oriented Programming: On the Expressiveness of Non-Control Data Attacks," IEEE S&P, 18 pages, 2016.
Intel; "Intel 64 and IA-32 Architectures Software Developer's Manual," vol. 1: Basic Architecture, Chapter 3: Basic Execution Environment; Oct. 2019; 57 pages.
Intel; "Intel 64 and IA-32 Architectures Software Developer's Manual," vol. 1: Basic Architecture, Chapter 6: Procedure Calls, Interrupts, and Exceptions; Oct. 2019; 48 pages.
Intel; "Intel 64 and IA-32 Architectures Software Developer's Manual," vol. 3: System Programming Guide, Chapter 6; Oct. 2019; 110 pages.
Kim, Yonghae, et al.; "Hardware-based Always-On Heap Memory Safety," 2020 53rd Annual IEEE/ACM International Symposium on Microarchitecture (MICRO); Athens, Greece; 14 pages.
Mohamed et al., "A scheme for implementing address translation storage buffers," Proceedings of the 2002 IEEE Canadian Conference on Electrical and Computer Engineering, 2002, pp. 626-632.
Myoung Jin Nam, Periklis Akritidis, and David J Greaves. 2019. Framer: a tagged-pointer capability system with memory safety applications. In Proceedings of the 35th Annual Computer Security Applications Conference (ACSAC 19), Association for Computing Machinery, New York, NY, USA, 612-626, https://doi.org/10.1145/3359789.3359799.
Notice of Allowance, U.S. Appl. No. 16/024,259, dated May 20, 2020, 20 pages.
Notice of Allowance, U.S. Appl. No. 16/728,928, dated Feb. 22, 2021, 10 pages.
Notice of Allowance, U.S. Appl. No. 17/321,087, dated Apr. 13, 2022, 13 pages.
Notice of Allowance, U.S. Appl. No. 17/321,087, dated May 4, 2022, 9 pages.
PCT International Search Report and Written Opinion issued in PCT/US2020/067072, dated May 26, 2021; 13 pages.
Watson et al., Capability Hardware Enhanced RISC Instructions (CHERI): Notes on the Meltdown and Spectre Attacks, University of Campbridge Computer Laboratory, Feb. 2018, 16 pages.
Yan, Z., et al., "Hardware translation coherence for virtualized systems," 2017 3 ACM/IEEE 44th Annual International Symposium on Computer Architecture (ISCA), 2017, pp. 430-443, doi: 10.1145/3079856.3080211. {Year: 2017).

(56) References Cited

OTHER PUBLICATIONS

USPTO Non-Final Office Action for U.S. Appl. No. 17/539,933, filed Dec. 1, 2021 entitled, Security Check Systems and Methods for Memory Allocations (5 pages).
France Intellectual Property Office; Search Report issued in FR2114288, dated Jan. 12, 2023; 24 pages with English translation.
EPO; Extended European Search Report issued in EP Patent Application No. 22153425.8, dated Jul. 18, 2022; 8 pages.
PCT International Preliminary Report on Patentability issued in PCT/US2020/067072, dated Aug. 25, 2022; 8 pages.
Ainsworth, Sam et al., "MarkUs: Drop-in use-after-free prevention for low-level languages," 2020 IEEE Symposium on Security and Privacy, Cambridge, UK (14 pages).
Filardo, Nathaniel Wesley et al., "Cornucopia: Temporal Safety for CHERI Heaps;" Cambridge, UK. (18 pages).
GitHub.com; "V8 Garbage Collector," Oct. 23, 2018 (13 pages).
L. Muscariello et al., "Hybrid Information—Centric Networking draft-muscariello-intarea-hicn-00," Cisco Systems, Inc., Jun. 7, 2018 (21 pages).
PCT International Search Report and Written Opinion issued in PCT/US2020/067076, dated Sep. 9, 2021; 11 pages.
Watson, Robert N.M., et al., "Capability Hardware Enhanced RISC Instructions: CHERI Instruction-Set Architecture (Version 8)," University of Cambridge Computer Laboratory Technical Report No. 951, Cambridge, UK; Oct. 2020 (590 pages).
Xia, Hongyan et al., "CHERIvoke: Characterising Pointer Revocation using CHERI Capabilities for Temporal Memory Safety," MICRO-52, Oct. 2019, Columbus, OH, US (13 pages).
USPTO Final Office Action for U.S. Appl. No. 17/485,213 received on Aug. 8, 2023, entitled, Object and Cacheline Granularity Cryptographic Memory Integrity (19 pages).
Dutch Office Action received in Application No. 2029792, dated Mar. 22, 2023, with Statement of Relevance, 15 pages.
L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008, doi: 10.1109/TC.2008.69; 14 pages.
Non-Final Office Action received in U.S. Appl. No. 16/998,913, dated Jan. 25, 2023, 13 pages.
International Preliminary Report on Patentability for International Patent Application No. PCT/US2020/067076, dated Jul. 6, 2023; 7 pages.
Kroes et al., Fast and Generic Metadata Management with Mid-Fat Pointers, 2017, ACM, 6 pages (Year: 2017).
Non-Final Office Action received in U.S. Appl. No. 17/472,272, dated Jul. 7, 2023, 11 pages.
USPTO Non-Final Office Action for U.S. Appl. No. 17/485,213 received on Feb. 14, 2023, entitled, Object and Cacheline Granularity Cryptographic Memory Integrity (19 pages).
France Intellectual Property Office; Office Action issued in FR2114288, dated Nov. 28, 2023; 4 pages with English translation.
French Office Action received in Application No. 2114288, dated Apr. 3, 2024, with English translation, 6 pages.

\* cited by examiner

CRYPTOGRAPHIC COMPUTING INCLUDING ENHANCED CRYPTOGRAPHIC ADDRESSES

CROSS-REFERENCE TO RELATED APPLICATION(S)

This application is a continuation of International Application No. PCT/US2020/067076, filed Dec. 26, 2020, entitled "CRYPTOGRAPHIC COMPUTING INCLUDING ENHANCED CRYPTOGRAPHIC ADDRESSES," the specification of which is incorporated herein by reference in its entirety.

TECHNICAL FIELD

This disclosure relates in general to the field of computer systems, and more particularly, to cryptographic computing.

BACKGROUND

Cryptographic computing may refer to computer system security solutions that employ cryptographic mechanisms inside of processor components to protect data stored by a computing system. The cryptographic mechanisms may be used to encrypt the data itself and/or pointers to the data using keys, tweaks, or other security mechanisms. Cryptographic computing is an important trend in the computing industry, with the very foundation of computing itself becoming fundamentally cryptographic. Cryptographic computing represents a sea change, a fundamental rethinking of systems security with wide implications for the industry.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

Figure 1:
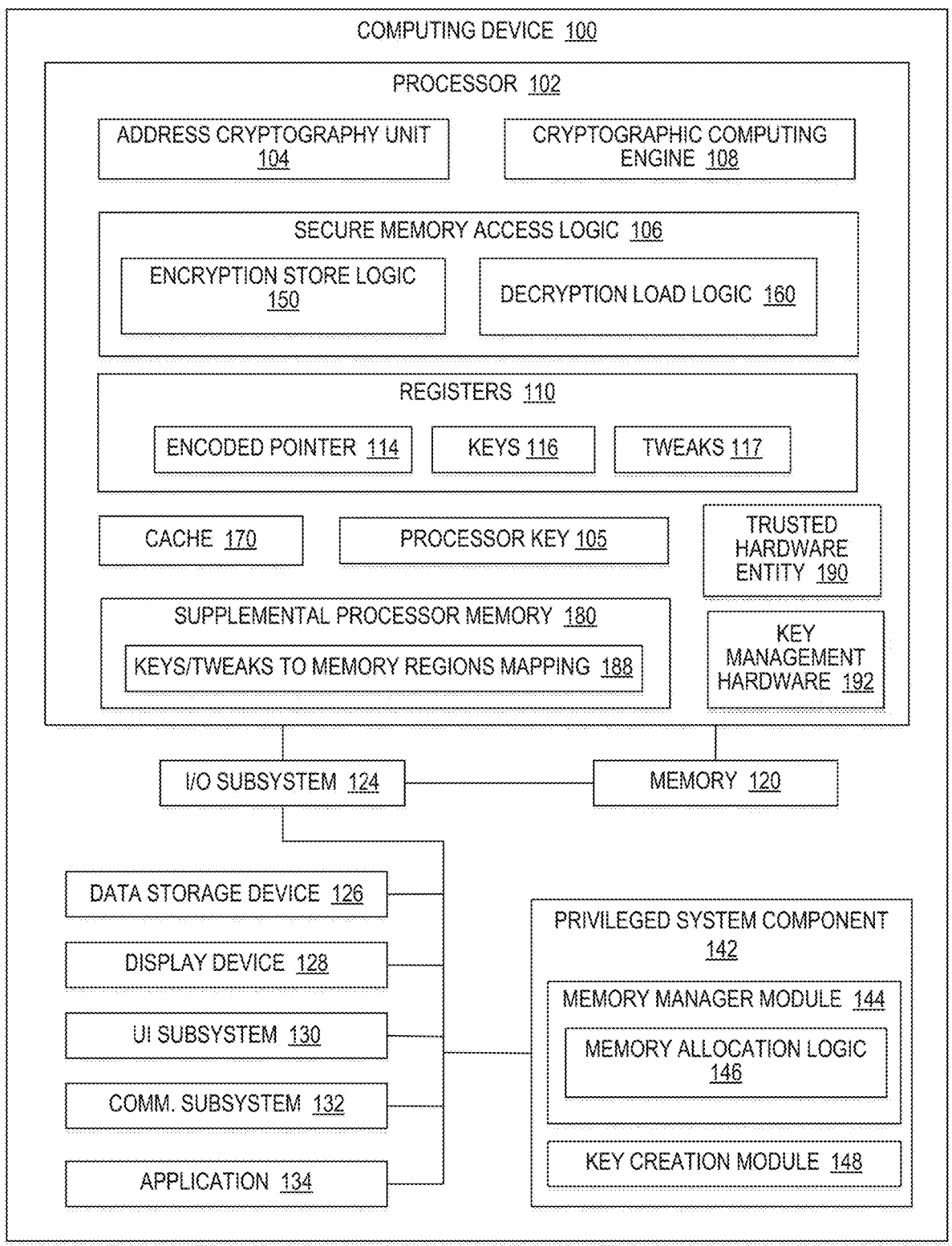
FIG. 1 is a simplified block diagram of an example computing device configured with secure memory access logic according to at least one embodiment of the present disclosure.

This disclosure provides various possible embodiments, or examples, for implementations of memory write instructions that may be used in the context of cryptographic computing. Generally, cryptographic computing may refer to computer system security solutions that employ cryptographic mechanisms inside processor components as part of its computation. Some cryptographic computing systems may implement the encryption and decryption of pointer addresses (or portions thereof), keys, data, and code in a processor core using encrypted memory access instructions. Thus, the microarchitecture pipeline of the processor core may be configured in such a way to support such encryption and decryption operations.

Embodiments disclosed in this application are related to proactively blocking out-of-bound accesses to memory while enforcing cryptographic isolation of memory regions within the memory. Cryptographic isolation may refer to isolation resulting from different regions or areas of memory being encrypted with one or more different parameters. Parameters can include keys and/or tweaks. Isolated memory regions can be composed of objects including data structures and/or code of a software entity (e.g., virtual machines (VMs), applications, functions, threads). Thus, isolation can be supported at arbitrary levels of granularity such as, for example, isolation between virtual machines, isolation between applications, isolation between functions, isolation between threads, or isolation between data structures (e.g., few byte structures).

Encryption and decryption operations of data or code associated with a particular memory region may be performed by a cryptographic algorithm using a key associated with that memory region. In at least some embodiments, the cryptographic algorithm may also (or alternatively) use a tweak as input. Generally, parameters such as 'keys' and 'tweaks' are intended to denote input values, which may be secret and/or unique, and which are used by an encryption or decryption process to produce an encrypted output value or decrypted output value, respectively. A key may be a unique value, at least among the memory regions or subregions being cryptographically isolated. Keys may be maintained, e.g., in either processor registers or processor memory (e.g., processor cache, content addressable memory (CAM), etc.) that is accessible through instruction set extensions. A tweak can be derived from an encoded pointer (e.g., security context information embedded therein) to the memory address where data or code being encrypted/decrypted is stored or is to be stored and, in at least some scenarios, can also include security context information associated with the memory region.

At least some embodiments disclosed in this specification, including read and write operations, are related to pointer based data encryption and decryption in which a pointer to a memory location for data or code is encoded with a tag and/or other metadata (e.g., security context information) and may be used to derive at least a portion of tweak input to data or code cryptographic (e.g., encryption and decryption) algorithms. Thus, a cryptographic binding can be created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. In some pointer encodings, a slice or segment of the address in the pointer includes a plurality of bits and is encrypted (and decrypted) based on a secret address key and a tweak based on the metadata. Other pointers can be encoded with a plaintext memory address (e.g., linear address) and metadata.

For purposes of illustrating the several embodiments for proactively blocking out-of-bound memory accesses while enforcing cryptographic isolation of memory regions, it is important to first understand the operations and activities associated with data protection and memory safety. Accordingly, the following foundational information may be viewed as a basis from which the present disclosure may be properly explained.

Known computing techniques (e.g., page tables for process/kernel separation, virtual machine managers, managed runtimes, etc.) have used architecture and metadata to provide data protection and isolation. For example, in previous solutions, memory controllers outside the CPU boundary support memory encryption and decryption at a coarser granularity (e.g., applications), and isolation of the encrypted data is realized via access control. Typically, a cryptographic engine is placed in a memory controller, which is outside a CPU core. In order to be encrypted, data travels from the core to the memory controller with some identification of which keys should be used for the encryption. This identification is communicated via bits in the physical address. Thus, any deviation to provide additional keys or tweaks could result in increased expense (e.g., for new buses) or additional bits being "stolen" from the address bus to allow additional indexes or identifications for keys or tweaks to be carried with the physical address. Access control can require the use of metadata and a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or object bounds information).

Cryptographic isolation of memory compartments (also referred to herein as 'memory regions'), resolves many of the aforementioned issues (and more). Cryptographic isolation may make redundant the legacy modes of process separation, user space, and kernel with a fundamentally new fine-grain protection model. With cryptographic isolation of memory compartments, protections are cryptographic, with various types of processor units (e.g., processors and accelerators) alike utilizing secret keys (and optionally tweaks) and ciphers to provide access control and separation at increasingly finer granularities. Indeed, isolation can be supported for memory compartments as small as a one-byte object to as large as data and code for an entire virtual machine. In at least some scenarios, cryptographic isolation may result in individual applications or functions becoming the boundary, allowing each address space to contain multiple distinct applications or functions. Objects can be selectively shared across isolation boundaries via pointers. These pointers can be cryptographically encoded or non-cryptographically encoded. Furthermore, in one or more embodiments, encryption and decryption happens inside the processor core, within the core boundary. Because encryption happens before data is written to a memory unit outside the core, such as the L1 cache or main memory, it is not necessary to "steal" bits from the physical address to convey key or tweak information, and an arbitrarily large number of keys and/or tweaks can be supported.

Cryptographic isolation leverages the concept of a cryptographic addressing layer where the processor encrypts at least a portion of software allocated memory addresses (addresses within the linear/virtual address space, also referred to as "pointers") based on implicit and/or explicit metadata (e.g., context information) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key. A tweak comprises one or more bits that represent a value. In one or more embodiments, a tweak may compose all or part of an initialization vector (IV) for a block cipher. A resulting cryptographically encoded pointer can comprise an encrypted portion (or slice) of the memory address and some bits of encoded metadata (e.g., context information). When decryption of an address is performed, if the information used to create the tweak (e.g., implicit and/or explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor.

These cryptographically encoded pointers (or portions thereof) may be further used by the processor as a tweak to the data encryption cipher used to encrypt/decrypt data they refer to (data referenced by the cryptographically encoded pointer), creating a cryptographic binding between the cryptographic addressing layer and data/code encryption. In some embodiments, the cryptographically encoded pointer may be decrypted and decoded to obtain the linear address. The linear address (or a portion thereof) may be used by the processor as a tweak to the data encryption cipher. Alternatively, in some embodiments, the memory address may not be encrypted but the pointer may still be encoded with some metadata representing a unique value among pointers. In this embodiment, the encoded pointer (or a portion thereof) may be used by the processor as a tweak to the data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

Although the cryptographically encoded pointer (or non-cryptographically encoded pointers) can be used to isolate data, via encryption, the integrity of the data may still be vulnerable. For example, unauthorized access of cryptographically isolated data can corrupt the memory region where the data is stored regardless of whether the data is encrypted, corrupting the data contents unbeknownst to the victim. Data integrity may be supported using an integrity verification (or checking) mechanism such as message authentication codes (MACs) or implicitly based on an entropy measure of the decrypted data, or both. In one example, MAC codes may be stored per cacheline and evaluated each time the cacheline is read to determine whether the data has been corrupted. Such mechanisms, however, do not proactively detect unauthorized memory accesses. Instead, corruption of memory (e.g., out-of-bounds access) may be detected in a reactive manner (e.g., after the data is written) rather than a proactive manner (e.g., before the data is written). For example, memory corruption may occur by a write operation performed at a memory location that is out-of-bounds for the software entity. With cryptographic computing, the write operation may use a key and/or a tweak that is invalid for the memory location. When a subsequent read operation is performed at that memory location, the read operation may use a different key on the corrupted memory and detect the corruption. For example, if the read operation uses the valid key and/or tweak), then the retrieved data will not decrypt properly and the corruption can be detected using a message authentication code, for example, or by detecting a high level of entropy (randomness) in the decrypted data (implicit integrity).

Turning to FIG. 1, FIG. 1 is a simplified block diagram of an example computing device 100 for implementing a proactive blocking technique for out-of-bound accesses to memory while enforcing cryptographic isolation of memory regions using secure memory access logic according to at least one embodiment of the present disclosure. In the example shown, the computing device 100 includes a processor 102 with an address cryptography unit 104, a cryptographic computing engine 108, secure memory access logic 106, and memory components, such as a cache 170 (e.g., L1 cache, L2 cache) and supplemental processor memory 180. Secure memory access logic 106 includes encryption store logic 150 to encrypt data based on various keys and/or tweaks and then store the encrypted data and decryption load logic 160 to read and then decrypt data based on the keys and/or tweaks. Cryptographic computing engine 108 may be configured to decrypt data or code for load operations based on various keys and/or tweaks and to encrypt data or code for store operations based on various keys and/or tweaks. Address cryptography unit 104 may be configured to decrypt and encrypt a linear address (or a portion of the linear address) encoded in a pointer to the data or code referenced by the linear address.

Processor 102 also includes registers 110, which may include e.g., general purpose registers and special purpose registers (e.g., control registers, model-specific registers (MSRs), etc.). Registers 110 may contain various data that may be used in one or more embodiments, such as an encoded pointer 114 to a memory address. The encoded pointer may be cryptographically encoded or non-cryptographically encoded. An encoded pointer is encoded with some metadata. If the encoded pointer is cryptographically encoded, at least a portion (or slice) of the address bits is encrypted. In some embodiments, keys 116 used for encryption and decryption of addresses, code, and/or data may be stored in registers 110. In some embodiments, tweaks 117 used for encryption and decryption of addresses, code, and/or data may be stored in registers 110.

A processor key 105 (also referred to herein as a 'hardware key') may be used for various encryption, decryption, and/or hashing operations and may be configured as a secure key in hardware of the processor 102. Processor key 105 may, for example, be stored in fuses, stored in read-only memory, or generated by a physically unclonable function that produces a consistent set of randomized bits. Generally, processor key 105 may be configured in hardware and known to processor 102, but not known or otherwise available to privileged software (e.g., operating system, virtual machine manager (VMM), firmware, system software, etc.) or unprivileged software.

The secure memory access logic 106 utilizes metadata about encoded pointer 114, which is encoded into unused bits of the encoded pointer 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the encoded pointer 114. For example, the metadata encoding and decoding provided by the secure memory access logic 106 can prevent the encoded pointer 114 from being manipulated to cause a buffer overflow, and/or can prevent program code from accessing memory that it does not have permission to access. Pointers may be encoded when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the encoded pointer 114, which points to the allocated memory, is encoded with the address metadata.

The address metadata can include valid range metadata. The valid range metadata allows executing programs to manipulate the value of the encoded pointer 114 within a valid range, but will corrupt the encoded pointer 114 if the memory is accessed using the encoded pointer 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the encoded pointer 114 (e.g., whether the encoded pointer 114 can be used to write, execute, or read the referenced memory).

In at least some other embodiments, other metadata (or context information) can be encoded in the unused bits of encoded pointer 114 such as a size of plaintext address slices (e.g., number of bits in a plaintext slice of a memory address embedded in the encoded pointer), a memory allocation size (e.g., bytes of allocated memory referenced by the encoded pointer), a type of the data or code (e.g., class of data or code defined by programming language), permissions (e.g., read, write, and execute permissions of the encoded pointer), a location of the data or code (e.g., where the data or code is stored), the memory location where the pointer itself is to be stored, an ownership of the data or code, a version of the encoded pointer (e.g., a sequential number that is incremented each time an encoded pointer is created for newly allocated memory, determines current ownership of the referenced allocated memory in time), a tag of randomized bits (e.g., generated for association with the encoded pointer), a privilege level (e.g., user or supervisor), a cryptographic context identifier (or crypto context ID) (e.g., randomized or deterministically unique value for each encoded pointer), etc. For example, in one embodiment, the address metadata can include size metadata that encodes the size of a plaintext address slice in the encoded pointer. The size metadata may specify a number of lowest order bits in the encoded pointer that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the encoded pointer to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating a version value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). In one example, decryption load logic 160 and encryption store logic 150 are embodied as part of new load (read) and store (write) processor instructions that perform respective decryption and encryption operations to isolate memory compartments. Decryption load logic 160 and encryption store logic 150 verify encoded metadata on memory read and write operations that utilize the new processor instructions (e.g., which may be counterparts to existing processor instructions such as MOV), where a general purpose register is used as a memory address to read a value from memory (e.g., load) or to write a value to memory (e.g., store).

The secure memory access logic 106 is executable by the computing device 100 to provide security for encoded pointers "inline," e.g., during execution of a program (such as a user space application 134) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the encoded pointer 114 may be embodied as, for example, a data pointer (which refers to a location of data), a code pointer (which refers to a location of executable code), an instruction pointer, or a stack pointer. As used herein, "context information" includes "metadata" and may refer to, among other things, information about or relating to an encoded pointer 114, such as a valid data range, a valid code range, pointer access permissions, a size of plaintext address slice (e.g., encoded as a power in bits), a memory allocation size, a type of the data or code, a location of the data or code, an ownership of the data or code, a version of the pointer, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., a register (where "memory" may refer to main memory or cache, e.g., a form of random access memory, and "register" may refer to a processor register, e.g., hardware), or any instruction that accesses or manipulates memory. Also as used herein, "memory access instruction" may refer to, among other things, a "MOV" or "STORE" instruction or any other instruction that causes data to be read, copied, or otherwise accessed at one storage location, e.g., a register, and moved into another storage location, e.g., memory, or any instruction that accesses or manipulates memory.

The address cryptography unit 104 can include logic (including circuitry) to perform address decoding of an encoded pointer to obtain a linear address of a memory location of data (or code). The address decoding can include decryption if needed (e.g., if the encoded pointer includes an encrypted portion of a linear address) based at least in part on a key and/or on a tweak derived from the encoded pointer. The address cryptography unit 104 can also include logic (including circuitry) to perform address encoding of the encoded pointer, including encryption if needed (e.g., the encoded pointer includes an encrypted portion of a linear address), based at least in part on the same key and/or on the same tweak used to decode the encoded pointer. Address encoding may also include storing metadata in the noncanonical bits of the pointer. Various operations such as address encoding and address decoding (including encryption and decryption of the address or portions thereof) may be performed by processor instructions associated with address cryptography unit 104, other processor instructions, or a separate instruction or series of instructions, or a higher-level code executed by a privileged system component such as an operating system kernel or virtual machine monitor, or as an instruction set emulator. As described in more detail below, address encoding logic and address decoding logic each operate on an encoded pointer 114 using metadata (e.g., one or more of valid range, permission metadata, size (power), memory allocation size, type, location, ownership, version, tag value, privilege level (e.g., user or supervisor), crypto context ID, etc.) and a secret key (e.g., keys 116), in order to secure the encoded pointer 114 at the memory allocation/access level.

The encryption store logic 150 and decryption load logic 160 can use cryptographic computing engine 108 to perform cryptographic operations on data to be stored at a memory location referenced by encoded pointer 114 or obtained from a memory location referenced by encoded pointer 114. The cryptographic computing engine 108 can include logic (including circuitry) to perform data (or code) decryption based at least in part on a tweak derived from an encoded pointer to a memory location of the data (or code), and to perform data (or code) encryption based at least in part on a tweak derived from an encoded pointer to a memory location for the data (or code). The cryptographic operations of the engine 108 may use a tweak, which includes at least a portion of the encoded pointer 114 (or the linear address generated from the encoded pointer) and/or a secret key (e.g., keys 116) in order to secure the data or code at the memory location referenced by the encoded pointer 114 by binding the data/code encryption and decryption to the encoded pointer.

Various different cryptographic algorithms may be used to implement the address cryptography unit 104 and cryptographic computing engine 108. Generally, Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer-based encryption have also emerged recently. The PRINCE cipher, for example, can be implemented in 3 clocks requiring as little as 799 $\mu m^2$ of area in the 10 nm process, providing half the latency of AES in a tenth the Silicon area. Cryptographic isolation may utilize these new ciphers, as well as others, introducing novel computer architecture concepts including, but not limited to: (i) cryptographic addressing, e.g., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion (s) thereof, contextual information about the referenced data, or any suitable combination thereof as tweaks for the data encryption. A variety of encryption modes that are tweakable can be used for this purpose of including metadata (e.g., counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation or other more complex logic) with an input block to produce the encrypted or decrypted block. In some block ciphers, the keystream is fed into the next block cipher to perform encryption or decryption.

The example encoded pointer 114 in FIG. 1 is embodied as a register 110 (e.g., a general purpose register of the processor 102). The example secret keys 116 may be generated by a key creation module 148 of a privileged system component 142, and stored in one of the registers 110 (e.g., a special purpose register or a control register such as a model specific register (MSR)), another memory location that is readable by the processor 102 (e.g., firmware, a secure portion of a data storage device 126, etc.), in external memory, or another form of memory suitable for performing the functions described herein. In some embodiments, tweaks for encrypting addresses, data, or code may be computed in real time for the encryption or decryption. Tweaks 117 may be stored in registers 110, another memory location that is readable by the processor 102 (e.g., firmware, a secure portion of a data storage device 126, etc.), in external memory, or another form of memory suitable for performing the functions described herein. In some embodiments, the secret keys 116 and/or tweaks 117 are stored in a location that is readable only by the processor, such as supplemental processor memory 180. In at least one embodiment, the supplemental processor memory 180 may be implemented as a new cache or content addressable memory (CAM). In one or more implementations, supplemental processor memory 180 may be used to store information related to cryptographic isolation such as keys and potentially tweaks, credentials, and/or context IDs.

Secret keys may also be generated and associated with cryptographically encoded pointers for encrypting/decrypting the address portion (or slice) encoded in the pointer. These keys may be the same as or different than the keys associated with the pointer to perform data (or code) encryption/decryption operations on the data (or code) referenced by the cryptographically encoded pointer. For ease of explanation, the terms "secret address key" or "address key" may be used to refer to a secret key used in encryption and decryption operations of memory addresses and the terms "secret data key" or "data key" may be used to refer to a secret key used in operations to encrypt and decrypt data or code.

On (or during) a memory allocation operation (e.g., a "malloc"), memory allocation logic 146 allocates a range of memory for a buffer, returns a pointer along with the metadata (e.g., one or more of range, permission metadata, size (power), memory allocation size, type, location, ownership, version, tag, privilege level, crypto context ID, etc.). In one example, the memory allocation logic 146 may encode plaintext range information in the encoded pointer 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 may be embodied in a memory manager module 144 of the privileged system component 142. The memory allocation logic 146 causes the pointer 114 to be encoded with the metadata (e.g., range, permission metadata, size (power), memory allocation size, type, location, ownership, version, tag value, privilege level, crypto context ID, some suitable combination thereof, etc.). The metadata may be stored in an unused portion of the encoded pointer 114 (e.g., non-canonical bits of a 64-bit address). For some metadata or combinations of metadata, the pointer 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the encoded pointer 114. Address adjustment logic adjusts the valid range metadata as needed so that the upper address bits (e.g., most significant bits) of the addresses in the address range do not change as long as the encoded pointer 114 refers to a memory location that is within the valid range indicated by the range metadata. This enables the encoded pointer 114 to be manipulated (e.g., by software performing arithmetic operations, etc.) but only so long as the manipulations do not cause the encoded pointer 114 to go outside the valid range (e.g., overflow the buffer).

In an embodiment, the valid range metadata is used to select a portion (or slice) of the encoded pointer 114 to be encrypted. In other embodiments, the slice of the encoded pointer 114 to be encrypted may be known a priori (e.g., upper 32 bits, lower 32 bits, etc.). The selected slice of the encoded pointer 114 (and the adjustment, in some embodiments) is encrypted using a secret address key (e.g., keys 116) and optionally, an address tweak, as described further below. On a memory access operation (e.g., a read, write, or execute operation), the previously-encoded pointer 114 is decoded. To do this, the encrypted slice of the encoded pointer 114 (and in some embodiments, the encrypted adjustment) is decrypted using a secret address key (e.g., keys 116) and an address tweak (if the address tweak was used in the encryption), as described further below.

The encoded pointer 114 is returned to its original (e.g., canonical) form, based on appropriate operations in order to restore the original value of the encoded pointer 114 (e.g., the true, original linear memory address). To do this in at least one possible embodiment, the address metadata encoded in the unused bits of the encoded pointer 114 are removed (e.g., return the unused bits to their original form). If the encoded pointer 114 decodes successfully, the memory access operation completes successfully. However, if the encoded pointer 114 has been manipulated (e.g., by software, inadvertently or by an attacker) so that its value falls outside the valid range indicated by the range metadata (e.g., overflows the buffer), the encoded pointer 114 may be corrupted as a result of the decrypting process performed on the encrypted address bits in the pointer. A corrupted pointer will raise a fault (e.g., a general protection fault or a page fault if the address is not mapped as present from the paging structures/page tables). One condition that may lead to a fault being generated is a sparse address space. In this scenario, a corrupted address is likely to land on an unmapped page and generate a page fault. Even if the corrupted address lands on a mapped page, it is highly likely that the authorized tweak or initialization vector for that memory region is different from the corrupted address that may be supplied as a tweak or initialization vector in this case. In this way, the computing device 100 provides encoded pointer security against buffer overflow attacks and similar exploits.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 106, the address cryptography unit 104, and the cryptographic computing engine 108.

The computing device 100 also includes memory 120, an input/output subsystem 124, a data storage device 126, a display device 128, a user interface (UI) subsystem 130, a communication subsystem 132, application 134, and the privileged system component 142 (which, illustratively, includes memory manager module 144 and key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor or processing/controlling circuit, or multiple diverse processing units or circuits (e.g., CPU and Graphics Processing Unit (GPU), etc.).

Processor memory may be provisioned inside a core and outside the core boundary. For example, registers 110 may be included within the core and may be used to store encoded pointers (e.g., 114), secret keys 116 and possibly tweaks 117 for encryption and decryption of data or code and addresses. Processor 102 may also include cache 170, which may be L1 and/or L2 cache for example, where data is stored when it is retrieved from memory 120 in anticipation of being fetched by processor 102.

The processor may also include supplemental processor memory 180 outside the core boundary. Supplemental processor memory 180 may be a dedicated cache that is not directly accessible by software. In one or more embodiments, supplemental processor memory 180 may store the mapping 188 between parameters and their associated memory regions. For example, keys may be mapped to their corresponding memory regions in the mapping 188. In some embodiments, tweaks that are paired with keys may also be stored in the mapping 188. In other embodiments, the mapping 188 may be managed by software.

In one or more embodiments, a hardware trusted entity 190 and key management hardware 192 for protecting keys in cryptographic computing may be configured in computing device 100. Hardware trusted entity 190 and key management hardware 192 may be logically separate entities or combined as one logical and physical entity. This entity is configured to provide code and data keys in the form of an encrypted key from which a code, data, or pointer key can be decrypted or a unique key identifier from which a code, data, or pointer key can be derived. Hardware trusted entity 190 and key management hardware 192 may be embodied as circuitry, firmware, software, or any suitable combination thereof. In at least some embodiments, hardware trusted entity and/or key management hardware 190 may form part of processor 102. In at least some embodiments, hardware trusted entity and/or key management hardware 190 may be embodied as a trusted firmware component executing in a privileged state. Examples of a hardware trusted entity can include, but are not necessarily limited to Secure-Arbitration Mode (SEAM) of Intel® Trust Domain Extensions, etc., Intel® Converged Security Management Engine (CSME), an embedded security processor, other trusted firmware, etc.

Generally, keys and tweaks can be handled in any suitable manner based on particular needs and architecture implementations. In a first embodiment, both keys and tweaks may be implicit, and thus are managed by a processor. In this embodiment, the keys and tweaks may be generated internally by the processor or externally by a secure processor. In a second embodiment, both the keys and the tweaks are explicit, and thus are managed by software. In this embodiment, the keys and tweaks are referenced at instruction invocation time using instructions that include operands that reference the keys and tweaks. The keys and tweaks may be stored in registers or memory in this embodiment. In a third embodiment, the keys may be managed by a processor, while the tweaks may be managed by software.

The memory 120 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 120 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory.

In some embodiments, memory 120 comprises one or more memory modules, such as dual in-line memory modules (DIMMs). In some embodiments, the memory 120 may be located on one or more integrated circuit chips that are distinct from an integrated circuit chip comprising processor 102 or may be located on the same integrated circuit chip as the processor 102. Memory 120 may comprise any suitable type of memory and is not limited to a particular speed or technology of memory in various embodiments.

In operation, the memory 120 may store various data and code used during operation of the computing device 100, as well as operating systems, applications, programs, libraries, and drivers. Memory 120 may store data and/or code, which includes sequences of instructions that are executed by the processor 102.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 120 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as one or more user space applications (e.g., application 134) and the privileged system component 142. The user space application may be embodied as any computer application (e.g., software, firmware, hardware, or a combination thereof) that interacts directly or indirectly with an end user via, for example, the display device 128 or the UI subsystem 130. Some examples of user space applications include word processing programs, document viewers/readers, web browsers, electronic mail programs, messaging services, computer games, camera and video applications, etc. Among other things, the privileged system component 142 facilitates the communication between the user space application (e.g., application 134) and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes key creation module 148, which may be embodied as software, firmware, hardware, or a combination of software and hardware. For example, the key creation module 148 may be embodied as a module of an operating system kernel, a virtual machine monitor, or a hypervisor. The key creation module 148 creates the secret keys 116 (e.g., secret address keys and secret data keys) and may write them to a register or registers to which the processor 102 has read access (e.g., a special purpose register). To create a secret key, the key creation module 148 may execute, for example, a random number generator or another algorithm capable of generating a secret key that can perform the functions described herein. In other implementations, secret keys may be written to supplemental processor memory 180 that is not directly accessible by software. In yet other implementations, secret keys may be encrypted and stored in memory 120. In one or more embodiments, when a data key is generated for a memory region allocated to a particular software entity the data key may be encrypted, and the software entity may be provided with the encrypted data key, a pointer to the encrypted data key, or a data structure including the encrypted key or pointer to the encrypted data key. In other implementations, the software entity may be provided with a pointer to the unencrypted data key stored in processor memory or a data structure including a pointer to the unencrypted data key. Generally, any suitable mechanism for generating, storing, and providing secure keys to be used for encrypting and decrypting data (or code) and to be used for encrypting and decrypting memory addresses (or portions thereof) encoded in pointers may be used in embodiments described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor, or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2A:
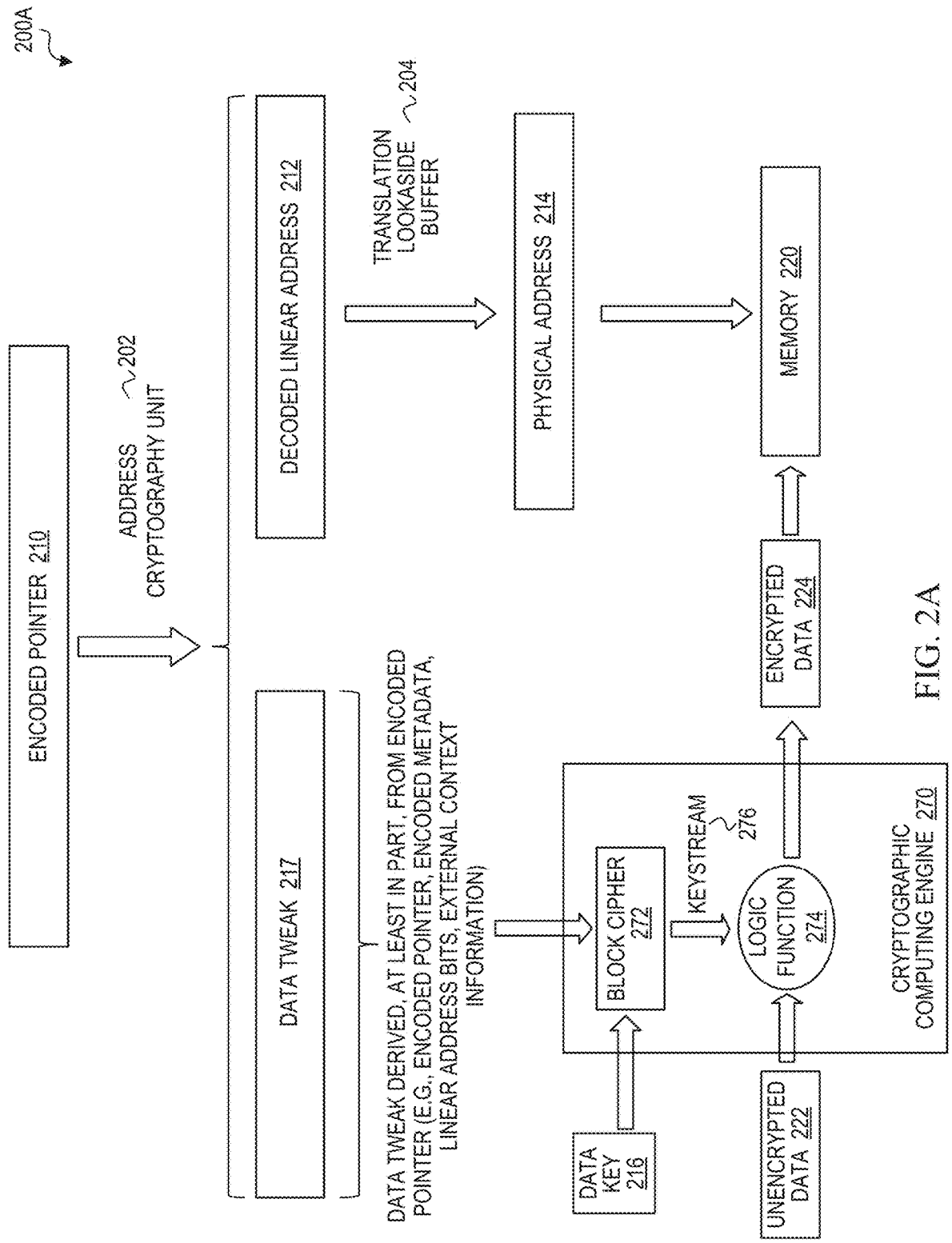
FIG. 2A is flow diagram illustrating a process of binding a generalized encoded pointer to encryption of data referenced by that pointer according to at least one embodiment of the present disclosure.

FIG. 2A is a simplified flow diagram illustrating a general process 200A of cryptographic computing based on embodiments of an encoded pointer 210. Process 200A illustrates storing (e.g., writing) data to a memory region at a memory address indicated by encoded pointer 210, where encryption and decryption of the data is bound to the contents of the pointer according to at least one embodiment. At least some portions of process 200A may be executed by hardware, firmware, and/or software of the computing device 100. In the example shown, pointer 210 is an example of encoded pointer 114 and is embodied as an encoded linear address including a metadata portion. The metadata portion is some type of context information (e.g., size/power metadata, tag, version, etc.) and the linear address may be encoded in any number of possible configurations, at least some of which are described herein.

Encoded pointer 210 may have various configurations according to various embodiments. For example, encoded pointer 210 may be encoded with a plaintext linear address or may be encoded with some plaintext linear address bits and some encrypted linear address bits. Encoded pointer 210 may also be encoded with different metadata depending on the particular embodiment. For example, metadata encoded in encoded pointer 210 may include, but is not necessarily limited to, one or more of size/power metadata, a tag value, or a version number.

Generally, process 200A illustrates a cryptographic computing flow in which the encoded pointer 210 is used to obtain a memory address for a memory region of memory 220 where data is to be stored, and to encrypt the data to be stored based, at least in part, on a tweak derived from the encoded pointer 210. First, address cryptography unit 202 decodes the encoded pointer 210 to obtain a decoded linear address 212. The decoded linear address 212 may be used to obtain a physical address 214 in memory 220 using a translation lookaside buffer 204 or page table (not shown). A data tweak 217 is derived, at least in part, from the encoded pointer 210. For example, the data tweak 217 may include the entire encoded pointer, one or more portions of the encoded pointer, a portion of the decoded linear address, the entire decoded linear address, encoded metadata, and/or external context information (e.g., context information that is not encoded in the pointer).

Once the tweak 217 has been derived from encoded pointer 210, a cryptographic computing engine 270 can compute encrypted data 224 by encrypting unencrypted data 222 based on a data key 216 and the data tweak 217. In at least one embodiment, the cryptographic computing engine 270 includes an encryption algorithm such as a keystream generator, which may be embodied as an AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce a keystream 276 and then a cryptographic operation (e.g., a logic function 274 such as an exclusive-or (XOR), or other more complex operations) can be performed on the unencrypted data 222 and the keystream 276 in order to generate encrypted data 224. It should be noted that the generation of the keystream 276 may commence while the physical address 214 is being obtained from the encoded pointer 210. Thus, the parallel operations may increase the efficiency of encrypting the unencrypted data. It should be noted that the encrypted data may be stored to cache (e.g., 170) before or, in some instances instead of, being stored to memory 220.

Figure 2B:
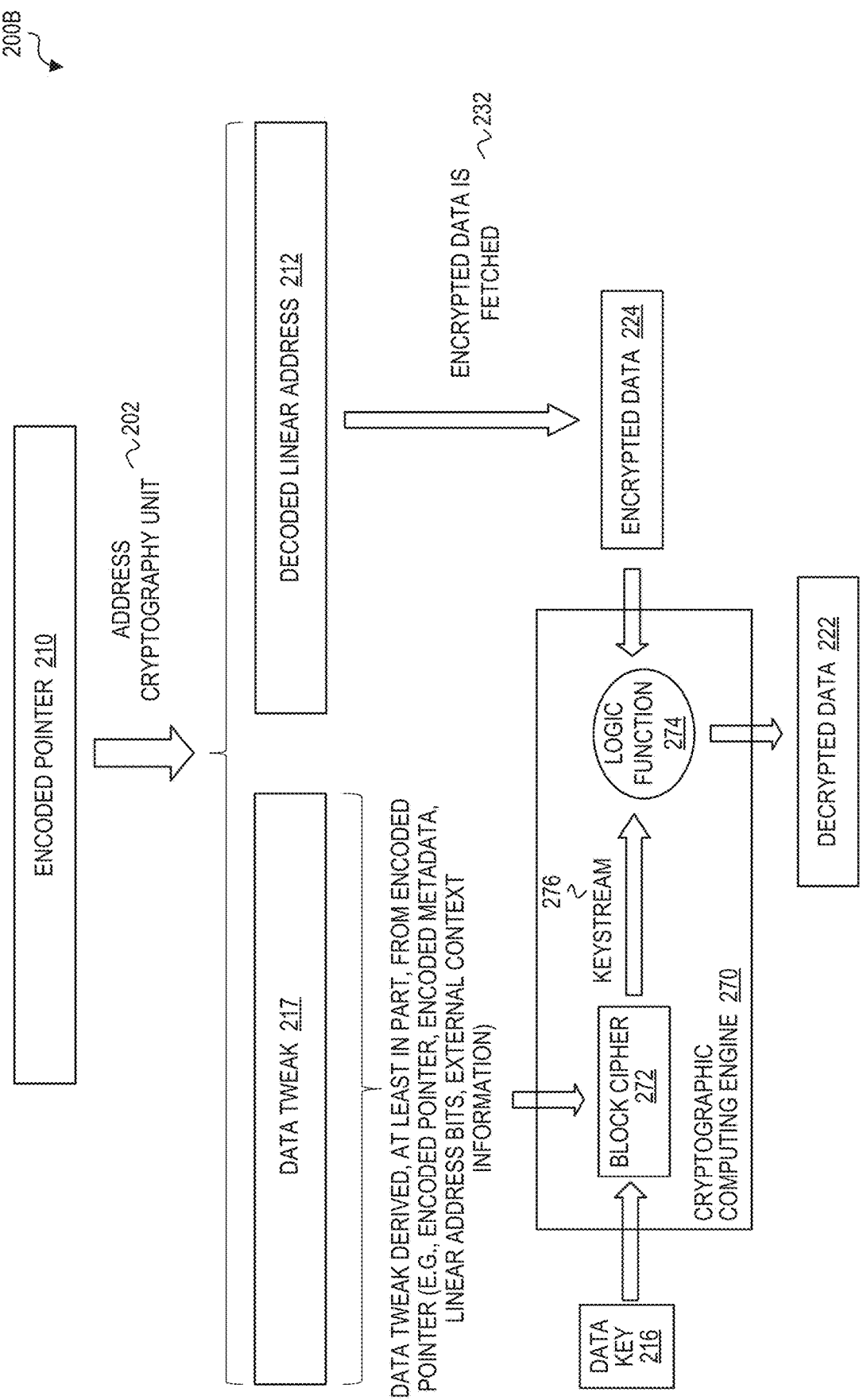
FIG. 2B is flow diagram illustrating a process of decrypting data bound to a generalized encoded pointer according to at least one embodiment of the present disclosure.

FIG. 2B is a simplified flow diagram illustrating a general process 200B of cryptographic computing based on embodiments of encoded pointer 210. Process 200B illustrates obtaining (e.g., reading, loading, fetching) data stored in a memory region at a memory address that is referenced by encoded pointer 210, where encryption and decryption of the data is bound to the contents of the pointer according to at least one embodiment. At least some portions of process 200B may be executed by hardware, firmware, and/or software of the computing device 100.

Generally, process 200B illustrates a cryptographic computing flow in which the encoded pointer 210 is used to obtain a memory address for a memory region of memory 220 where encrypted data is stored and, once the encrypted data is fetched from the memory region, to decrypt the encrypted data based, at least in part, on a tweak derived from the encoded pointer 210. First, address cryptography unit 202 decodes the encoded pointer 210 to obtain the decoded linear address 212, which is used to fetch the encrypted data 224 from memory, as indicated at 232. Data tweak 217 is derived, at least in part, from the encoded pointer 210. In this process 200B for loading/reading data from memory, the data tweak 217 is derived in the same manner as in the converse process 200A for storing/writing data to memory.

Once the tweak 217 has been derived from encoded pointer 210, the cryptographic computing engine 270 can compute decrypted (or unencrypted) data 222 by decrypting encrypted data 224 based on the data key 216 and the data tweak 217. As previously described, in this example, the cryptographic computing engine 270 includes an encryption algorithm such as a keystream generator embodied as AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce keystream 276 and then a cryptographic operation (e.g., the logic function 274 such as an exclusive-or (XOR), or other more complex operations) can be performed on the encrypted data 224 and the keystream 276 in order to generate decrypted (or unencrypted) data 222. It should be noted that the generation of the keystream may commence while the encrypted data is being fetched at 232. Thus, the parallel operations may increase the efficiency of decrypting the encrypted data.

Enhanced Cryptographic Addresses

Figure 3:
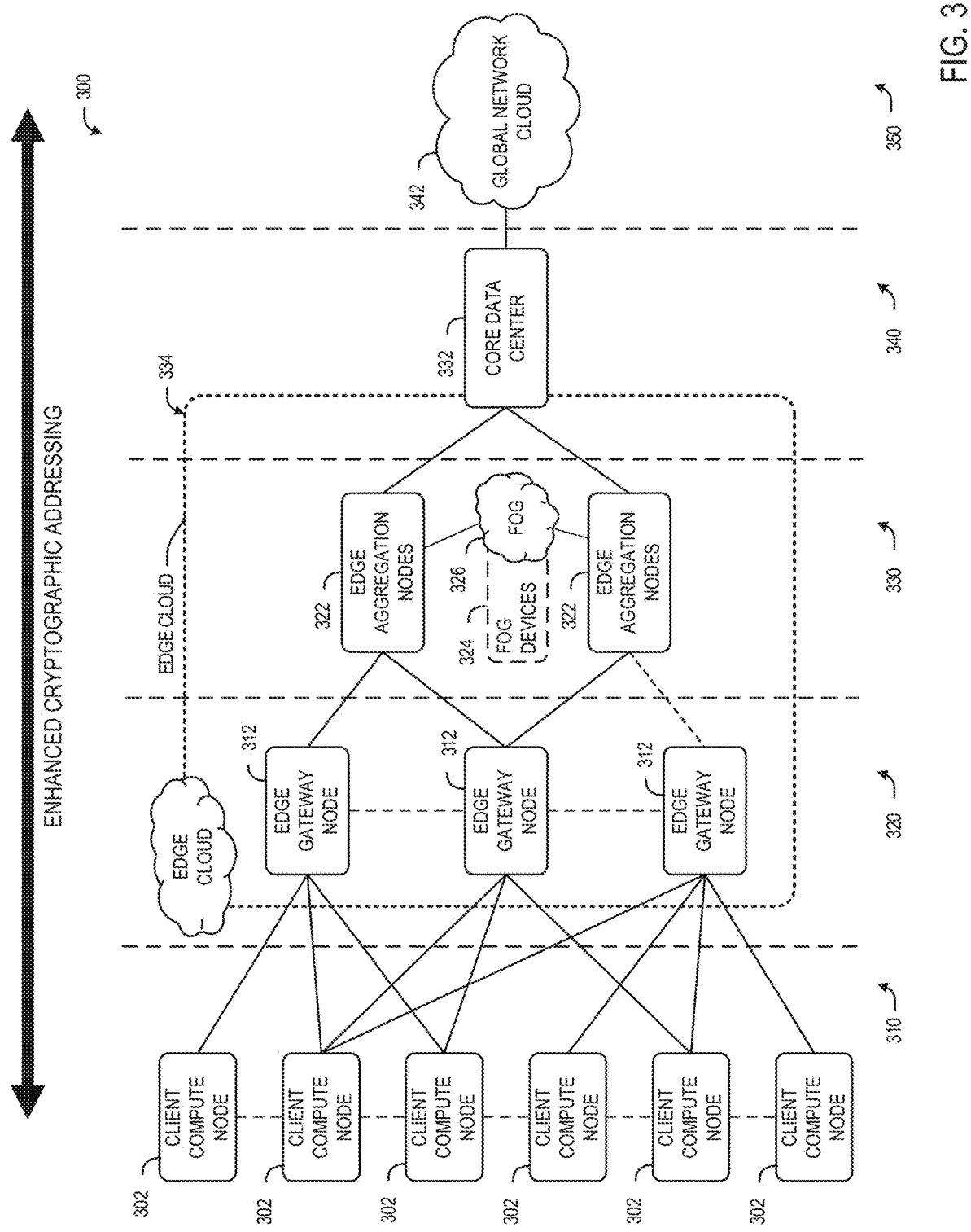
FIG. 3 depicts a computing network utilizing enhanced cryptographic addressing according to at least one embodiment of the present disclosure.

FIG. 3 depicts a distributed computing network 300 utilizing enhanced cryptographic addressing according to at least one embodiment of the present disclosure. The distributed computing network 300 may provide edge services and applications to various entities distributed among one or more client compute nodes 302, one or more edge gateway nodes 312, one or more edge aggregation nodes 322, one or more core data centers 332, and a global network cloud 342, as distributed across layers of the network 300. The implementation of the distributed computing network 300 may be provided by or on behalf of a telecommunication service provider ("telco", or "TSP"), internet-of-things service provider, cloud service provider (CSP), enterprise entity, or any other number of entities. FIG. 3 provides an abstracted overview of layers of distributed computing deployed among an edge computing environment for purposes of illustration.

Each node or device of the distributed computing network 300 is located at a particular layer corresponding to layers 310, 320, 330, 340, and 350. For example, the client compute nodes 302 are each located at an endpoint layer 310, while each of the edge gateway nodes 312 are located at an edge devices layer 320 (local level) of the network. Additionally, each of the edge aggregation nodes 322 (and/or fog devices 324, if arranged or operated with or among a fog networking configuration 326) are located at a network access layer 330 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations.

The core data center 332 is located at a core network layer 340 (e.g., a regional or geographically-central level), while the global network cloud 342 is located at a cloud data center layer 350 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 332 may be located within, at, or near an edge cloud 334.

Although an illustrative number of client compute nodes 302, edge gateway nodes 312, edge aggregation nodes 322, core data centers 332, global network clouds 342 are shown in FIG. 3, it should be appreciated that the computing network 300 may include more or fewer devices or systems at each layer (or a subset of the layers). Additionally, as shown in FIG. 3, the number of components of each layer 310, 320, 330, 340, 350 generally increases at each lower level (when moving closer to endpoints). As such, one edge gateway node 312 may service multiple client compute nodes 302, and one edge aggregation node 322 may service multiple edge gateway nodes 312.

Consistent with the examples provided herein, each client compute node 302 may be embodied as any type of end point component, device, appliance, or "thing" capable of communicating as a producer or consumer of data. Further, the label "node" or "device" as used in the network 300 does not necessarily mean that such node or device operates in a client or agent/minion/follower role; rather, any of the nodes or devices in the network 300 refer to individual entities, nodes, or subsystems which include discrete or connected hardware or software configurations to facilitate or use the edge cloud 334.

As such, the edge cloud 334 is formed from network components and functional features operated by and within the edge gateway nodes 312 and the edge aggregation nodes 322 of layers 320, 330, respectively. The edge cloud 334 may be embodied as any type of network that provides edge computing and/or storage resources which are proximately located to radio access network (RAN) capable endpoint devices (e.g., mobile computing devices, IoT devices, smart devices, etc.), which are shown in FIG. 3 as the client compute nodes 302. In other words, the edge cloud 334 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 334 may form a portion of or otherwise provide an ingress point into or across a fog networking configuration 326 (e.g., a network of fog devices 324, not shown in detail), which may be embodied as a system-level horizontal and distributed architecture that distributes resources and services to perform a specific function. For instance, a coordinated and distributed network of fog devices 324 may perform computing, storage, control, or networking aspects in the context of an IoT system arrangement. Other networked, aggregated, and distributed functions may exist in the edge cloud 334 between the cloud data center layer 350 and the client endpoints (e.g., client compute nodes 302).

The edge gateway nodes 312 and the edge aggregation nodes 322 cooperate to provide various edge services and security to the client compute nodes 302. Furthermore, because each client compute node 302 may be stationary or mobile, each edge gateway node 312 may cooperate with other edge gateway devices to propagate presently provided edge services and security as the corresponding client compute node 302 moves about a region. To do so, each of the edge gateway nodes 312 and/or edge aggregation nodes 322 may support multiple tenancy and multiple stakeholder configurations, in which services from (or hosted for) multiple service providers and multiple consumers may be supported and coordinated across a single or multiple compute devices.

Nodes of the network 300 (or other network) may be implemented by physical machines. For example, a physical machine may correspond to a node of the network, such as client compute node 302, edge gateway node 312, edge aggregation node 322, a node of core data center 332, or a node of global network cloud 342. In other embodiments, a physical machine could implement multiple nodes of network 300, or a single node of network 300 may be implemented by multiple physical machines.

In various embodiments, objects (e.g., data or code) that are distributed across physical machines of a network (such as 300) may be accessed by any authorized host through enhanced cryptographic addresses identifying the objects. In various embodiments, the enhanced cryptographic addresses may be used to uniquely identify objects within any suitable address space, where an address space may include the object addresses collectively used by any suitable group of physical machines networked together (from a small network up to the size of the entire Internet). A collection of networked physical machines with an address space utilizing enhanced cryptographic addresses for the objects of the address space may be referred to herein as a distributed computing domain. In some embodiments, each object has a unique enhanced cryptographic address within the relevant address space.

Figure 4:
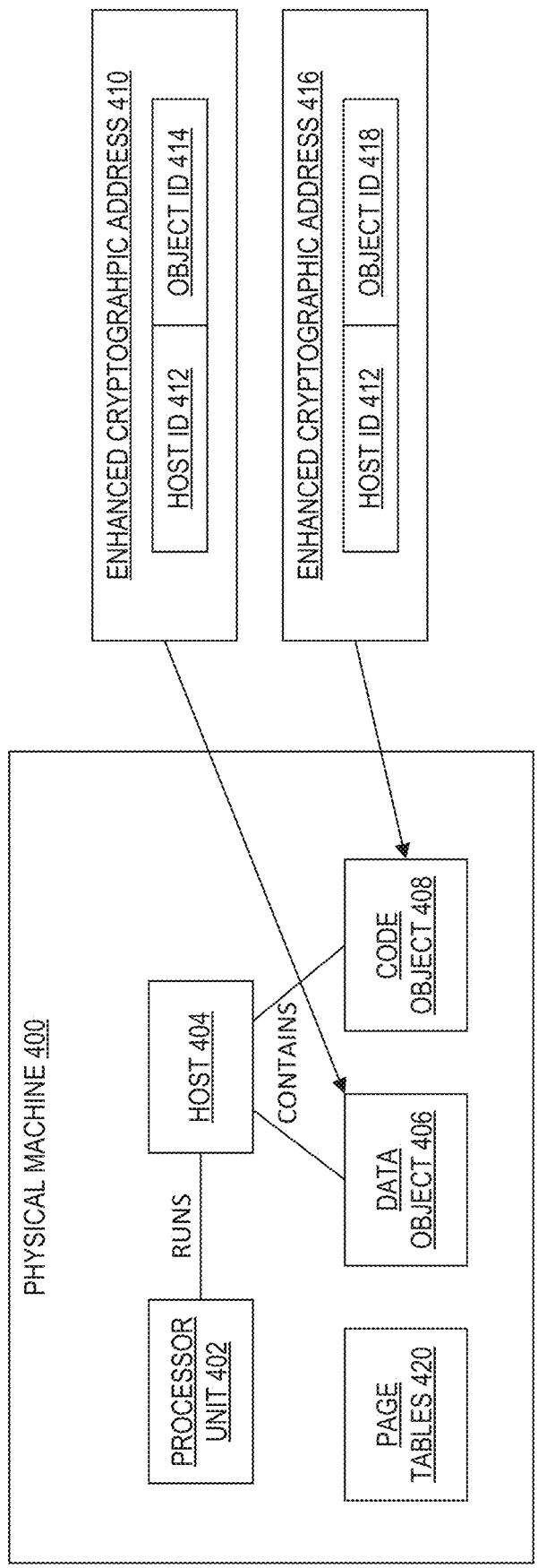
FIG. 4 depicts enhanced cryptographic addresses used to reference objects and stored by a physical machine according to at least one embodiment of the present disclosure.

FIG. 4 depicts enhanced cryptographic addresses 410 and 416 used to reference objects 406 and 408 stored by a physical machine 400. Physical machine 400 includes processor unit 402 which runs host 404 which contains data object 406 and code object 408. Physical machine 400 also includes page tables 420 to translate enhanced cryptographic addresses 410 and 416 to respective physical addresses.

Figure 43:
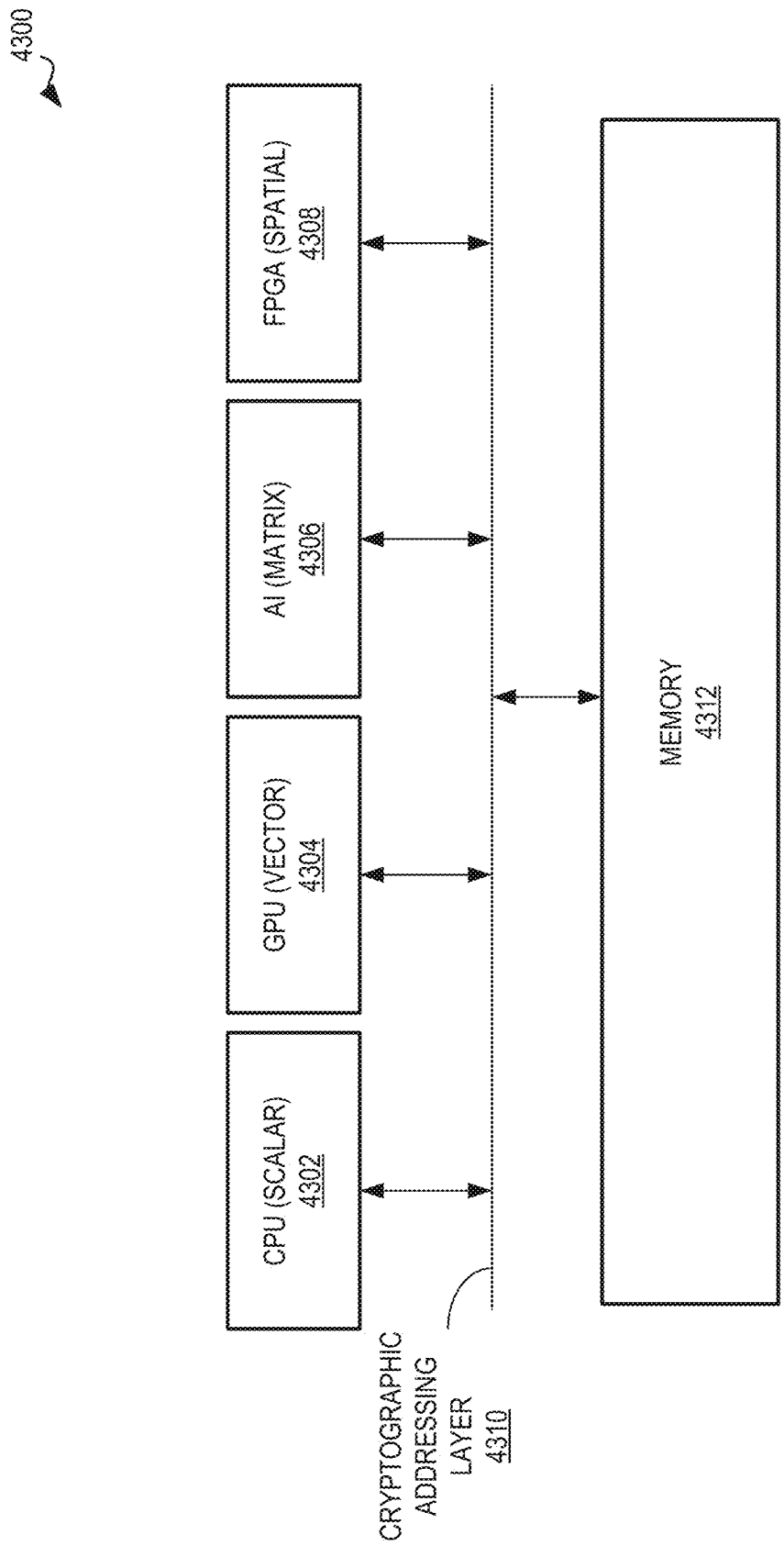
FIG. 43 is a block diagram illustrating an example cryptographic computing environment according to at least one embodiment.

In some embodiments, a processor unit may comprise any suitable logic to execute one or more hosts. The processor unit may run the host by providing (alone or in combination with other logic) the functionality needed by the host. Examples of processor units (which may also be referred to herein as processors) include, but are not limited to, a central processing unit, processor core, graphics processing unit, hardware accelerator, field programmable gate array, neural network processing unit, artificial intelligence processing unit, inference engine, data processing unit, infrastructure processing unit, network interface controller, controller of an I/O device (e.g., a peripheral device), a memory or storage device, among others. FIG. 43 includes examples of different types of processor units. Other figures herein describe various other components (e.g., processors, I/O devices, etc.) which may function as processor units.

A network host (e.g., 404) may comprise a logical entity that is identifiable by a unique address within a distributed computing domain. In some embodiments, the host may comprise an Internet Protocol (IP) host that is addressed using an IP address. In some embodiments, a host (e.g., 404) may function as a client and/or a server, wherein a client host may request resources (e.g., objects or remote execution of code) from one or more other hosts and a server host may provide resources to one or more other hosts.

A single physical machine 400 may include one or more processor units of one or more types. Some hosts may only support a single type of processor unit (e.g., the host may require an x86 CPU in order to run properly), while other hosts may support multiple types of processor units (e.g., the host could run on a NIC or a hardware accelerator). In some embodiments, a single processor unit may run multiple hosts concurrently. In various implementations, a single host may be run on multiple processor units.

Host 404 contains objects (data object 406 and code object 408). An object may include any suitable stored information. A data object (e.g., 406) may represent a value (e.g., a Boolean, a string, a constant, an integer, a floating point number), a set of values (e.g., an array, a heap, a linked list, a stack, a queue, a hash table, a tree, or other set of values), or other information (e.g., a structure including various types of values or other data). A code object (e.g., 408) may comprise executable code including one or more instructions.

A host that contains an object may be operable to provide that object upon request from another host. A host may be associated with the objects it contains in any suitable manner. For example, an object may be stored within memory of a processor unit that is running the host that contains the object. As another example, the object may be stored within memory coupled to the processor unit that runs the host that contains the object. In some examples, the host may manage the object (e.g., may control access to the object, may manage updates to the object that are initiated by other hosts in the distributed computing domain, or may otherwise manage the object).

Each object stored by the physical machine (and by the other physical machines of the distributed computing domain) may be identified by an enhanced cryptographic address that uniquely identifies the object within the distributed computing domain. For example, enhanced cryptographic address 410 may identify (and be used to access) data object 406 and enhanced cryptographic address 416 may identify code object 408.

An enhanced cryptographic address includes a host ID and an object ID. The host ID of the enhanced cryptographic address uniquely identifies the host (within the distributed computing domain or within a larger domain such as the Internet that includes the distributed computing domain) that contains the corresponding object. Thus, in the embodiment depicted, host ID 412 (which is used in both enhanced cryptographic address 410 and enhanced cryptographic address 416) identifies host 404.

The object ID uniquely identifies the object within the identified host. In the embodiment depicted, object ID 414 of address 410 identifies object 406 and object ID 418 of address 416 identifies object 408.

The enhanced cryptographic addresses (and their respective host IDs and object IDs) may have any suitable size. In one embodiment, an enhanced cryptographic address is 128 bits long, with its host ID being 64 bits long and its object ID being 64 bits long. In such an embodiment, the length of the enhanced cryptographic address matches the length of an IPv6 address as well as the block length of widely used cryptographic algorithms (e.g., AES128). Such an embodiment may facilitate routing of the enhanced cryptographic address as well as use of the address as a cryptographic key as will be described in greater detail below. In another embodiment, the enhanced cryptographic address is 64 bits long, with its host ID being 32 bits long and its object ID being 32 bits long. In another embodiment, the enhanced cryptographic address is longer than 128 bits. The bits of the enhanced cryptographic address may be split evenly between the host ID and the object ID, or one of the host or object IDs may be longer (e.g., represented by more bits) than the other ID.

In various implementations, enhanced cryptographic addresses proposed herein may enable objects to be securely shared between network hosts. The objects may be accessible by a single enhanced cryptographic address, regardless of an object's location within the network (as opposed to being accessed locally, e.g., within the physical machine storing the object, by a first linear address and remotely by a different linear address). Thus, the enhanced cryptographic address may be recognized and operated upon by a network infrastructure that sits between a client host requesting an object and the server host providing the object. The enhanced cryptographic address may also be recognized and operated upon by the hardware and/or software of the physical machines that run the client host and the server host (e.g., the ISA of the physical machine may accept the entire enhanced cryptographic address or the object ID as an operand to one or more instructions). Thus, the same address that is processed by the networking infrastructure for routing purposes (e.g., routers, firewalls, switches, servers, load-balancers, domain name servers, etc.) may also be used as a memory operand in instructions executed by the physical machines that run the hosts (e.g., a processor unit of the physical machine may accept the address as a memory access instruction operand or the processing element may emulate performance of an instruction in which the address is included as a memory access instruction operand). In particular embodiments, enhanced cryptographic addresses may be directly translated into physical addresses by the physical machines (as opposed to a linear address or content ID supplied by a requesting node being translated to a linear address of a node storing the object and then being translated into a physical address before being returned by the node storing the object). Thus, the linear address that refers to an object is not only defined within the context of the particular physical machine storing the object, but rather is the same throughout the entire distributed computing domain. Thus, a host on any physical machine in the distributed computing domain (including the physical machine that includes the object) may access the object using the same enhanced cryptographic address.

Use of enhanced cryptographic addresses may be used to provide a unified cryptographic addressing layer across a distributed computing domain (including the entire Internet in some embodiments). In some embodiments, this addressing layer may be used to replace legacy isolation concepts (e.g., processes, virtual machines (VMs), compartments, etc.) by providing each isolated entity running on a physical machine or processor unit its own host ID. This may reduce the complexity of supporting multiple different types of isolation, thus improving security hardening of the platform.

In various embodiments, an enhanced cryptographic address may conform to a hybrid information-centric networking (hICN) architecture. The host ID of the address may be used by the networking infrastructure to route a request from the client host to the server host. In at least one embodiment, the host ID may be plaintext (such that a cryptographic secret does not need to be shared by the networking infrastructure), though embodiments are not limited thereto.

In various embodiments, all or a portion of the object ID may be encrypted (e.g., by the client host or by another logical entity on behalf of the client host) so that it is protected during transit through a network and/or within the physical machines. The encryption may be implemented in a manner that renders the object ID (and thus the enhanced cryptographic address) unforgeable. For example, the client host (or other logical entity associated with the client host) may utilize keyed hash functions to generate information (e.g., message authentication codes) to be sent along with the enhanced cryptographic addresses (or embedded within the enhanced cryptographic addresses) or other methodologies to provide integrity and authentication for the object ID of the enhanced cryptographic address.

In various embodiments, at least a portion of the enhanced cryptographic address may be used to encrypt or decrypt the object addressed by the enhanced cryptographic address. In one embodiment, the entire enhanced cryptographic address is used as a cryptographic key to encrypt and decrypt the object. For example, the enhanced cryptographic address may be 128 bits long and may be used as a cryptographic key in a 128-bit block cipher algorithm. In other embodiments, a portion of the enhanced cryptographic address (e.g., context information embedded within or referenced by the object ID) may be used in a tweak in conjunction with a cryptographic data key to encrypt and decrypt the object. Examples of context information have been previously described and additional examples and usage of such information in cryptographic operations is described in further detail below.

In various embodiments, page tables 420 of a physical machine 400 of the distributed computing domain support direct translation of the enhanced cryptographic addresses to physical addresses. Page tables 420 may include data structures used (e.g., by a computer operating system or other software) to store mappings between linear addresses (e.g., enhanced cryptographic addresses or object IDs of enhanced cryptographic addresses) and physical addresses (e.g., locations on physical memory which store the underlying data). In some embodiments, a physical address represents the address of a page of data residing in memory. Linear addresses may also be referred to as virtual addresses or logical addresses.

In one embodiment, a page table may directly map a 128-bit linear address (e.g., the encrypted or decrypted form of an enhanced cryptographic address including a host ID and an object ID) to a physical address of the memory of the physical machine. The length of the physical address could also be 128 bits, or it could be a different bit length, such as 32 bits or 64 bits, depending on the addressing scheme used by the memory in the physical machine. In another embodiment, a page table may directly map a 64-bit linear address (e.g., an encrypted or decrypted object ID of an enhanced cryptographic address) to a physical address. In other embodiments, a page table may directly map an encrypted or decrypted object ID or the entire encrypted or decrypted form of an enhanced cryptographic address of any suitable length to a physical address.

In some embodiments, page tables 420 may include per-host page tables in which a discrete set of page tables is maintained for a respective host. For example, a first set of page tables are maintained for a first host (identified by a first host ID), a second set of page tables are maintained for a second host (identified by a second host ID), and so on. A per-host page table may directly translate a virtual address (e.g., an object ID) to a physical address. In some embodiments, a per-host page table may directly translate a 64-bit object ID to a physical address. When per-host page tables are utilized, the host ID may be used to identify the relevant set of page tables to be walked responsive to a translation request. The page tables may then be walked based on the object ID. Thus, when a host accesses data from another host it may temporarily switch to usage of the page tables corresponding to the host ID of the host whose data is being accessed.

Figure 5:
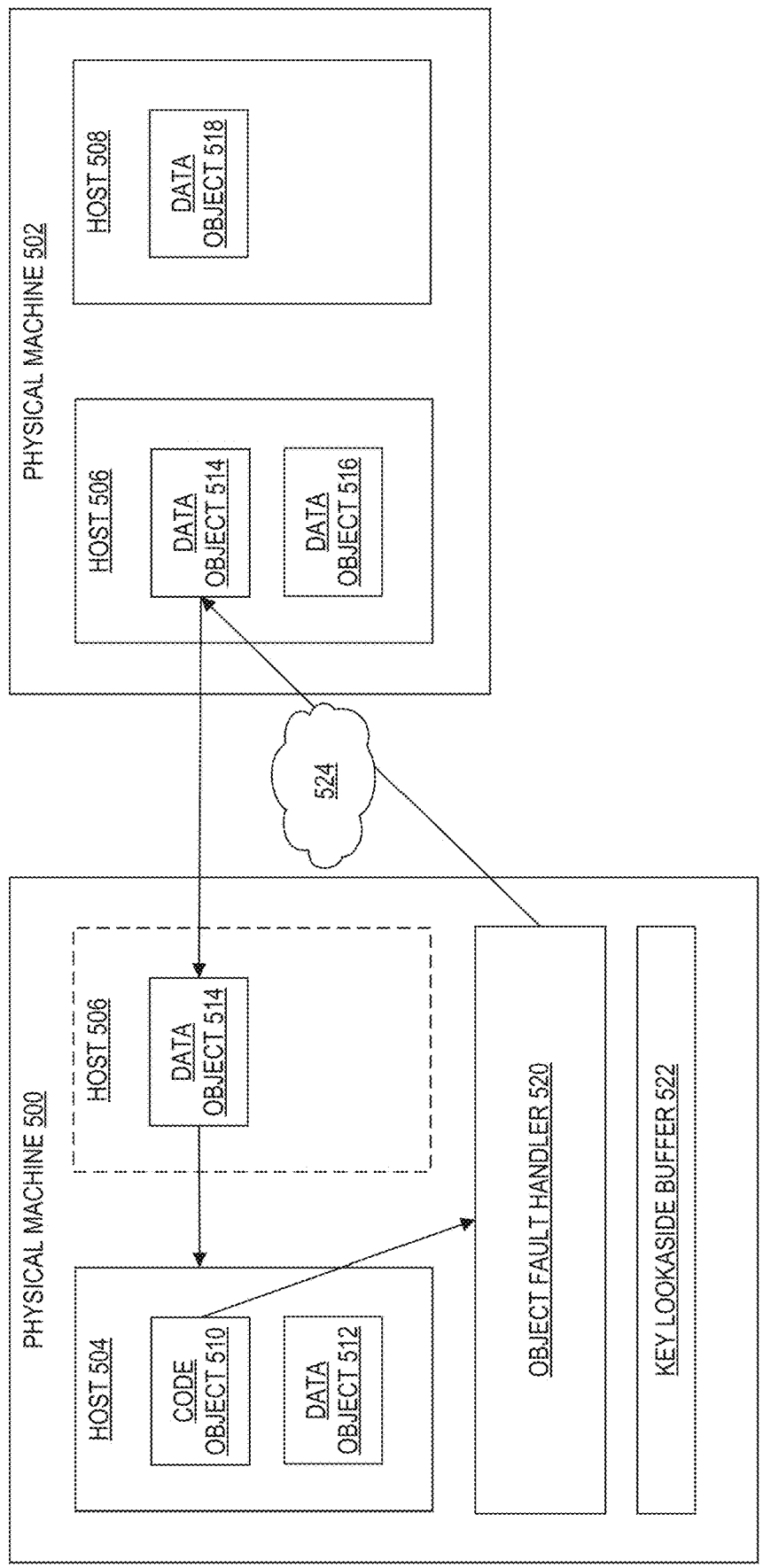
FIG. 5 depicts communication of an object between physical machines according to at least one embodiment of the present disclosure.

FIG. 5 depicts communication of an object between physical machines 500 and 502 in accordance with certain embodiments. In the embodiment depicted, physical machines 500 and 502 are discrete physical machines (e.g., different computing systems connected over a network 524), although a similar flow could be performed for different hosts running on the same physical machine (e.g., on different processor units). In the embodiment depicted, at an initial point in time, host 504 is running on physical machine 500 and hosts 506 and 508 are running on physical machine 502. Host 504 contains code object 510 and data object 512, host 506 contains data object 514 and data object 516, and host 508 contains data object 518.

Host 504 is executing code object 510 (e.g., a series of instructions). The code object 510 may reference data object 514, which is part of host 506. The reference to object 514 may be made, e.g., as an enhanced cryptographic address in a memory operand as part of a memory access instruction submitted to the processor unit running the host 504. The processor unit may access a page table (e.g., 420) in an attempt to obtain the physical address of data object 514. However, because data object 514 is located on a different physical machine, a virtual-to-physical memory mapping for data object 514 is not included in the page table. Accordingly, the page table may generate a fault. The fault is handled by object fault handler 520.

Object fault handler 520, which may comprise any suitable handler implemented in hardware and/or software. In at least some embodiments, data objects and code objects are handled similarly by object fault handler 520. An object fault may be generated when the physical machine executing the code that issues the access request does not currently have a mapping (to a physical address) for the specified address. In general, the object fault handler 520 will locate the requested object, store the object in memory of the physical machine, and create a mapping for it. The object may already be available on the requesting physical machine in non-memory storage, e.g., swapped out to a solid state drive (SSD) or other storage device, or the object may be stored in a different physical machine and may be retrieved over the network 524.

The object fault handler 520 may receive the enhanced cryptographic address referencing data object 514 and, in response, invoke a protocol to identify where the data object 514 is located within the network. Equivalently, the object fault handler may be invoked for a request to invoke a code object. The object fault handler may determine that the requested object is available in storage locally available to the physical machine issuing the request, e.g., in a swap file stored on a solid state drive (SSD) or other storage device. In this instance, the object fault handler 520 may simply copy the requested object to memory, map its enhanced cryptographic address to a physical address of the memory, and retry the access request. If the object is not in storage locally available to the physical machine, the object fault handler 520 may invoke a network protocol (e.g., a Hybrid Information-Centric Networking protocol) to determine where the data object 514 is located.

Once the object fault handler 520 has determined that the data object 514 is located on a different physical machine 502, it initiates generation of a request comprising the enhanced cryptographic address and the request is sent over the network 524 to physical machine 502. Physical machine 502 will then retrieve the data object 514 and send it over the network to physical machine 500.

The transfer of the data over the network 524 may be based on any suitable protocol(s), such as hICN and the underlying IPv6 layer. In some embodiments, the request specifies the boundaries of the object so that the physical machine 502 responding to the network request knows which data to send back over the network 524. For example, a pointer encoding specifying a power-of-two slot size (also referred to herein as power size) containing the object may be included in the enhanced cryptographic address. In some situations, the slot size may include one or more other objects or portions of other objects. In one embodiment, the responding physical machine 502 may send the entire contents of the specified slot. Because some slots are very large, in various embodiments only a particular amount of data (e.g., a 4 KB page) is sent in response to each request. The responding physical machine 502 may establish a remote direct memory access (RDMA) session for repeated requests to different portions of a large object. Furthermore, in some situations, not all pages within a slot are even associated with data, in which case regions mapping such associations cannot be sent to the requestor. The responding physical machine 502 may determine when a requested region of memory is associated with data even if the page tables on the responding machine do not currently map that data, e.g., due to the data being swapped out from memory to storage. For example, a network server on the responding machine may issue a request for a linear address to an OS running on the responding physical machine 502 to prompt it to map the requested data. The responding physical machine 502 may encrypt the data to protect it while in transit (or to provide defense in depth if it is separately protected with an encrypted tunnel) and to avoid triggering integrity violations when accessing other objects that overlap with the requested object within the requested slot.

In some embodiments, the bounds of each object may be precisely specified in the request sent to the physical machine 502. The exact length of the object may be specified or the length may be specified with more precision than a power-of-two slot size. As one example, bounds and other metadata may be placed at the midpoint of each slot corresponding to the allocation that crosses the slot midpoint. If such an approach is in use, the responding physical machine 502 may use the bounds metadata to only send back the data for the desired allocation. In such a case, the memory image reconstructed by the requesting physical machine 500 may be incomplete within a particular page, so even if data has been retrieved for a certain part of the page, that does not mean that requests to any other portions of the page can be satisfied. Thus, the requesting physical machine 500 may be capable of responding to faults generated as a result of accessing a partially-populated page, e.g., due to a linear inline metadata mismatch by issuing additional requests for the missing data.

In various embodiments, the data object 514 may be encrypted when it is stored in memory of physical machine 502, and this encryption may be maintained as the data object 514 is communicated over network 524 to the physical machine 500. In other embodiments, when the data object 514 is communicated over the network 524 to physical machine 500, the data object 514 may be decrypted by physical machine 502 and then encrypted using any suitable encryption protocol (e.g., as defined in hICN) to protect the data object 514 during the transfer.

In some embodiments, when the data object 514 is received, the physical machine 500 may implement at least a portion of the state of host 506 within itself (as depicted by the dotted lines around host 506 of physical machine 500. This may include, for example, storing the data object 514 in physical memory of the physical machine 500 and creating a page table entry mapping the enhanced cryptographic address to the data object 514 to the physical address at which the data object is stored. This may also include the operating system on the physical machine 500 establishing data structures representing the identity and state of the host 506 specifically as it is instantiated in physical machine 500. For example, this information may include the host address for host 506, the associated memory mappings, and the execution state (e.g., register values) of functions that are running or scheduled to run within the context of host 506.

In some embodiments, a smart NIC of physical machine 500 may handle the request from the object fault handler 520 and may provide the data object 514 to the requesting host once it is received from the physical machine 502, without the physical machine 500 implementing a portion of the host 506 within itself. A subsequent request by the host 504 (or by another host running on the physical machine 500) may result in another fault handled by object fault handler 520, and if the data object 514 is still within a buffer of the smart NIC, it may be provided to the client host without sending another request over the network 524. In alternative embodiments, a smart NIC of physical machine 500 may implement all or a portion of the object fault handler 520 in implementing a portion of the host 506 within the physical machine 500. Symmetrically, in some embodiments, a smart NIC of physical machine 502 may implement all or a portion of the logic to send data object 514 to physical machine 500.

In some embodiments, object fault handler 520 may include an object prefetcher to request objects from a remote physical machine (e.g., 502) before those objects are explicitly requested by a host running on the physical machine 500. For example, the prefetcher may observe a pattern of requests for objects and may predict objects likely to be accessed and may preemptively request the objects from the physical machine 500 and then cache them for quicker access by one or more hosts of physical machine 500. In other embodiments, objects are only brought over to the physical machine 500 upon request.

In order to access the data object 514 (which is now stored locally on physical machine 500), host 504 may need to negotiate access to a cryptographic key to decrypt the data object. Such access could be done at any suitable time, such as before the data object 514 is requested by the host 504, in conjunction with the request for the data object by the host 504, or after the data object is received and stored by the physical machine 500.

If the enhanced cryptographic address itself is the cryptographic key needed to decrypt the data object 514, then the host 504 would have received authorization to access the object prior to the request (such that it could generate the enhanced cryptographic address) and the host 504 may simply use the enhanced cryptographic address to decrypt the data object. If a separate key is needed to decrypt the data object, then access to that key may be negotiated at any suitable time.

In one embodiment, an attribute based encryption protocol (e.g., as defined by an hICN key management protocol) may be invoked to cause a first host (e.g., 504) to verify to another host (e.g., 506) that it is authorized to access the key before the key may be used by the first host. Attribute based encryption is a scheme that allows attributes to be defined for nodes (e.g., hosts), and then limits keys to only be accessed by nodes having those attributes (where the attributes may be any suitable characteristics that can be verified by the node granting authorization, such as identity of users, locations of devices, capabilities of platforms, etc.). In some embodiments, the client host does not communicate with the server host providing the data for the purpose of retrieving the key, but rather a separate set of hosts may be entrusted with generating private keys in the attribute based encryption scheme on behalf of one or both of the client host or server host.

In some embodiments, upon verification that an entity is authorized for access, a structure that contains various pointers may be provided to the requesting entity by providing the requesting entity with a top level pointer to the structure. The requesting entity could then traverse pointers within the structure to obtain access to multiple keys or pointers. In such a manner, a single top level pointer may provide access to a hierarchy of objects. Other embodiments contemplate any suitable manner of providing authorization to hosts for the objects they can access.

In the embodiment depicted, physical machine 500 includes a key lookaside buffer 522. The key lookaside buffer 522 may operate in a manner similar to a translation lookaside buffer which caches linear address to physical address translations to reduce latency by avoiding page walks for translations that are cached. The key lookaside buffer 522 may cache mappings between host IDs and corresponding data keys so that authorization (e.g., via an attribute based encryption protocol) does not need to be performed each time data is accessed from a particular host. The key lookaside buffer 522 may receive a host ID as input and may return a cryptographic key (or a top level pointer to a structure comprising cryptographic keys for the host or some other reference to a key) as output, where the cryptographic key(s) may be used to decrypt one or more objects of the host. Processor instructions could be used to manage the key lookaside buffer 522 (where the instructions may be similar to and/or adapted from existing instructions used to manage a translation lookaside buffer).

Since a host is free to directly access data belonging to other hosts once the host has successfully negotiated access to the cryptographic keys for the other hosts, in some embodiments, a current host ID register (such as the register described above in connection with the MAKROUTPTR instruction) of physical machine 500 may be mapped to a set of authorized host IDs for the current host that is being executed, where the current host is allowed to access the cryptographic keys of the hosts corresponding to the authorized host IDs. In some embodiments, a value stored in the current host ID register (e.g., the host ID of the currently executing host) may be mapped to any suitable memory comprising the authorized host IDs. When a client host executes an instruction requesting an object from a server host, the current host ID register may be checked to determine whether the client host is authorized to access data from the server host. If it is not, a fault may be issued and the request may be denied. If the client host is authorized to access the object, the requested object may be provided (or additional checks to determine whether the host is authorized to access the particular requested object may be performed before access to the requested object is granted). In one embodiment, responsive to a determination that the client host is authorized to access data of the server host, the key lookaside buffer 522 may be accessed to obtain a cryptographic key to be used to decrypt the requested object.

In various embodiments, the objects of a host that are available for access by other hosts may be immutable, thus alleviating the need for a coherency protocol. In other embodiments, the objects may alternatively or additionally include objects that can be edited by the host containing the object or by other hosts. In such embodiments, a coherency protocol (e.g., using distributed hash tables) may manage edits and accesses to the objects in order to keep the objects synchronized across the distributed computing domain and prevent access to objects that are being updated.

In one embodiment, a call instruction for a processor unit is introduced that may accept, as an operand, an enhanced cryptographic address referencing a code object that may be stored locally (e.g., on the same physical machine that is executing the call instruction) or remotely (e.g., on a different physical machine). In various embodiments, the processor unit that is executing the call instruction may determine whether to execute the function (e.g., by performing a local procedure call by using parameters on the stack and executing the code at the address referenced in the call instruction) or to offload execution of the function via a remote procedure call to a different physical machine. In a remote procedure call, the parameters for the call may be sent to the physical machine executing the code object.

The decision of whether to execute the code object locally or to offload the execution of the code object may be based on any suitable factors, such as the configuration of the processor unit running the host (e.g., whether the processor unit is capable of executing the code object or whether the processor unit is suitable for executing the code object relative to the suitability of a different processor unit), the availability of resources of the processor unit (e.g., as affected by the current load on the processor unit), latency requirements associated with the request, or other suitable factors. In this manner, the processor unit may load balance the execution of code objects. Because the enhanced cryptographic addresses are routable across a network (e.g., the Internet), the remote host can use the same address (the enhanced cryptographic address) as would have been used locally to access the code object and data routing may occur without substantial additional overhead, thus avoiding disruption in data or function access.

In one embodiment, a processor unit of a physical machine (e.g., 400) may implement an instruction MKROUTPTR to generate an enhanced cryptographic pointer. In one embodiment, the instruction may accept a first operand specifying a destination register for the enhanced cryptographic address and a second operand specifying a register storing a local pointer (e.g., an object ID). The instruction may combine (e.g., concatenate) the current host ID (which may be stored in an implicit register accessed each time the instruction is issued) with the local pointer (e.g., object ID) to generate an enhanced cryptographic pointer. In one embodiment, the local pointer is a 64-bit pointer, the host ID is a 64-bit ID, and the generated enhanced cryptographic address is a 128-bit pointer. Other embodiments contemplate any suitable variation of the MKROUTPTR including other types of operands (e.g., immediate values for any of the inputs, specification of a register storing the host ID, etc.).

In some embodiments, the MKROUTPTR instruction may accept an operand that includes a reference to a host ID. Execution of the instruction may generate an enhanced cryptographic address comprising a concatenation of the referenced host ID with an object ID (which may be specified via a different operand). Flows utilizing this instruction are described below.

In one embodiment, the MKROUTPTR instruction may accept an enhanced cryptographic address or an object ID as a first operand and a host ID as a second operand. The object ID (whether included in the enhanced cryptographic address or provided as the operand) may include a ciphertext portion that is encrypted using a local pointer encryption key (e.g., a key that is specific to the host issuing the instruction). The execution of the instruction may include decrypting the ciphertext of the object ID based on the local pointer encryption key (which could be supplied as an operand in the instruction or could be an implicit operand) and then encrypting the resulting plaintext using a pointer encryption key associated with the host ID supplied as an operand. The resulting ciphertext is included within a new object ID (which refers to the same object to which the object ID supplied as an operand referred to) which is included within an enhanced cryptographic address (including the host ID at which the object is located) output as a result of the instruction. In some embodiments, a host (or the physical machine on which the host resides) may maintain a table of host IDs and corresponding pointer encryption keys. In other embodiments, the second operand of the MKROUTPTR instruction may include a direct reference to the key to be used to encrypt the object ID (rather than a host ID that is associated with the key). In some embodiments, these pointer encryption keys may be shared keys between the host executing the instruction and another host, or between the host containing the referenced object and another host being granted access to the referenced object. In this manner, the MKROUTPTR instruction may allow creation of enhanced cryptographic addresses including pointers encrypted based on shared keys, which may result in enhanced security relative to only using pointers encrypted according to the local pointer encryption key. A few use cases for such embodiments are described below.

Figure 6:
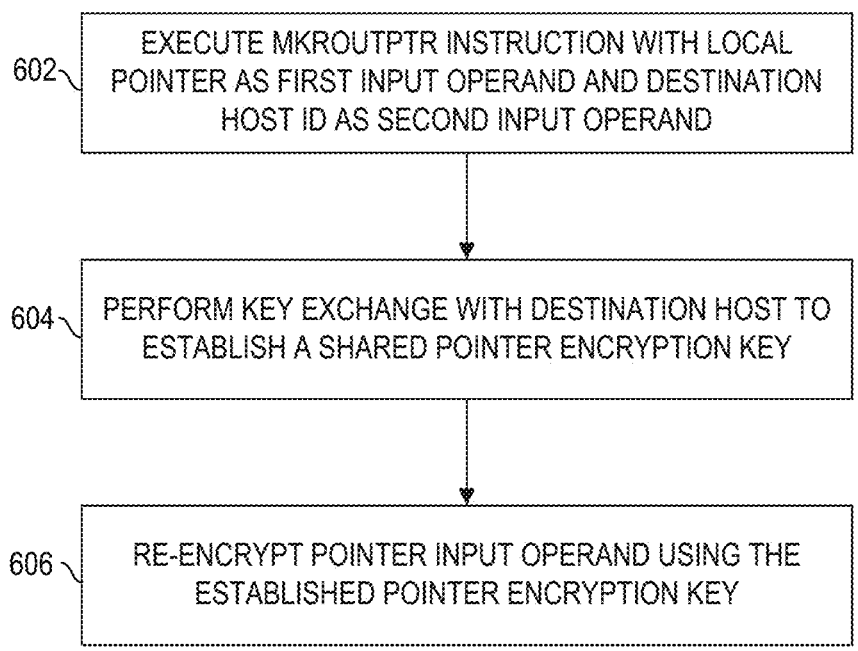
FIG. 6 depicts a flow for generating an enhanced cryptographic address based on a shared key according to at least one embodiment of the present disclosure.

FIG. 6 depicts a flow for generating an enhanced cryptographic address based on a shared key according to at least one embodiment of the present disclosure. At 602, the MKROUTPTR instruction is executed with a local pointer (e.g., a 64-bit pointer such as an object ID) as a first input operand and a destination host ID as a second input operand.

At 604, a key exchange is performed (for example, by a host that issued the MKROUTPTR instruction) with the destination host to establish a shared pointer encryption key. At 606, the original pointer input operand is decrypted using the local pointer encryption key and then re-encrypted using the shared pointer encryption key to generate an enhanced cryptographic address that may be used by the destination host to access the underlying object.

Figure 7:
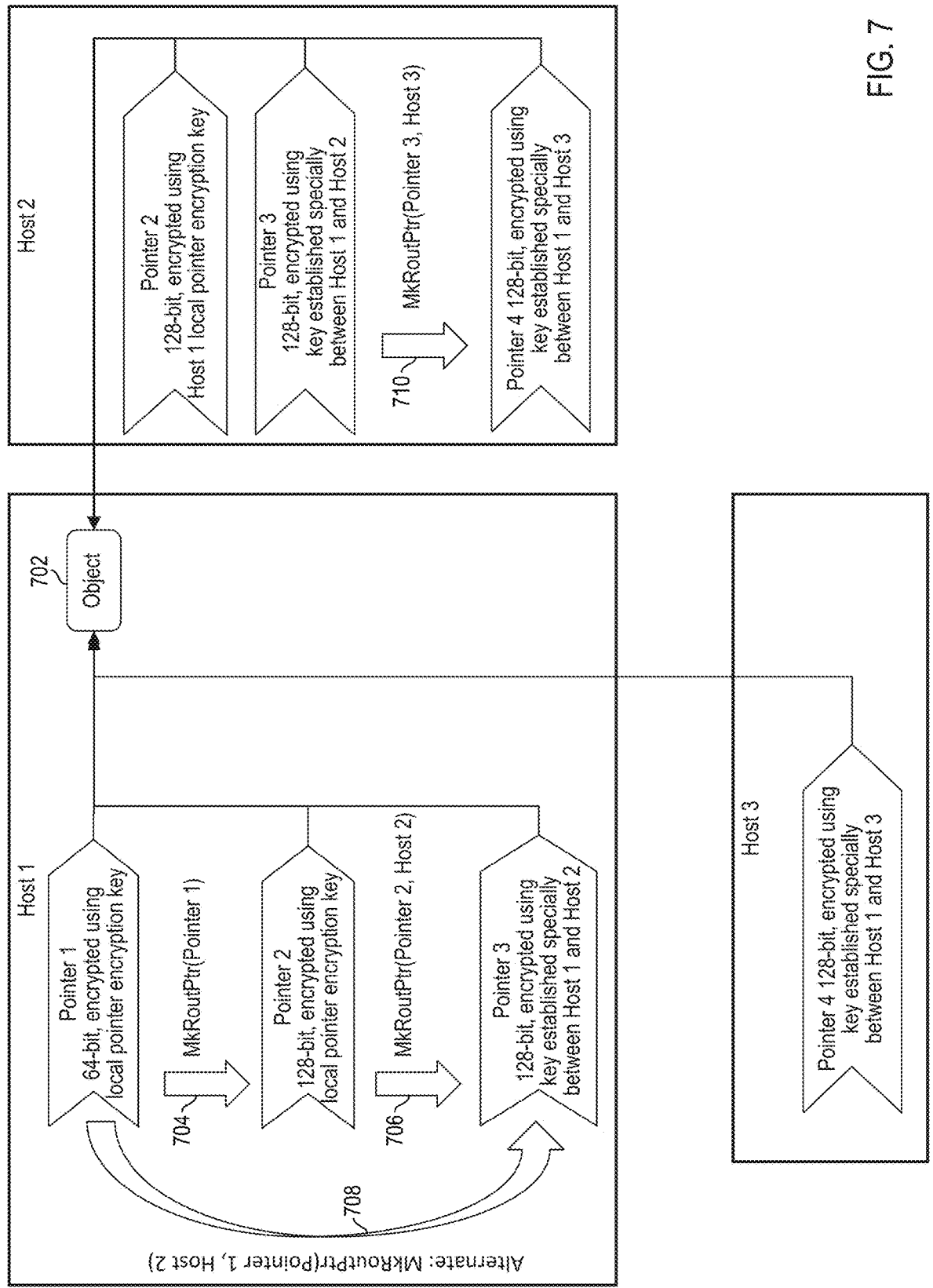
FIG. 7 depicts a flow for sharing an object according to at least one embodiment of the present disclosure.

FIG. 7 depicts a flow for sharing an object according to at least one embodiment of the present disclosure. FIG. 7 may utilize the flow of FIG. 6 to share the object 702 among multiple hosts (host 1, host 2, and host 3, which may reside on the same or different physical machines). In this flow, host 1 includes object 702. Through various uses of the MKROUTPTR instruction and via exchange of keys established between hosts 1, 2, and 3, each host is enabled to access the object through enhanced cryptographic addresses that identify the object 702. In the embodiment depicted, pointers 3 and 4 are encrypted using keys that are established between pairs of hosts to more effectively resist pointer forgery.

Pointer 1 represents an object ID that is fully or partially encrypted using a local pointer encryption key. At 704, a MKROUTPTR instruction is executed with Pointer 1 as an input operand to generate Pointer 2 which includes the host ID of Host 1 and the encrypted object ID. At 706, a MKROUTPTR instruction is executed with Pointer 2 (or the encrypted object ID portion of Pointer 2) as an operand and a host ID of Host 2 as a second operand. Execution of the instruction may include decrypting the object ID of Pointer 2 based on the local pointer encryption key and then encrypting the object ID using a shared key established between Host 1 and Host 2. The resulting Pointer 3 includes the host ID of Host 1 and the encrypted object ID of object 702. As an alternative, Pointer 3 may be generated directly at 708 by calling the MKROUTPTR instruction with Pointer 1 as a first input operand and the host ID of Host 2 as a second operand. Execution of the instruction may include decrypting the object ID of Pointer 1 based on the local pointer encryption key and then encrypting the object ID using a shared key established between Host 1 and Host 2.

As shown, Host 2 could use Pointer 2 or Pointer 3 to access the object 702 from Host 1. In implementation, it is likely that Host 2 would only have access to Pointer 2 or Pointer 3, but some embodiments contemplate Host 2 having both pointers and being able to use either pointer to access the object 702. Use of Pointer 3 (which is encrypted using the shared key) may provide security benefits over use of Pointer 2 due to the usage of the shared key rather than the local pointer encryption key.

In some embodiments, Host 2 could also create Pointers to the object 702 to share with other hosts. For example, at 710, Pointer 4 may be generated by calling the MKROUTPTR instruction with Pointer 3 as a first input operand and the host ID of Host 3 as a second operand. Execution of the instruction may include decrypting the object ID of Pointer 3 based on the key shared between Host 1 and Host 2 and then encrypting the object ID using a shared key established between Host 1 and Host 3. The resulting Pointer 4 includes the host ID of Host 1 and the encrypted object ID of object 702. Host 3 may use this pointer to access the object 702. Although not shown, Host 2 could additionally or alternatively provide Pointer 2 to Host 3 to allow Host 3 to access the object 702. In the manner described above, the pointers may function as unforgeable tokens providing access to the object 702.

A processor (e.g., executing a host that includes an object being requested) may include any suitable logic for determining which key to use when decrypting an enhanced cryptographic address (e.g., Pointer 2, Pointer 3, Pointer 4) supplied in a memory operand. In some embodiments, the encoding of each pointer may include a bit indicating whether the local pointer encryption key or a shared key should be used for the decryption (and if a shared key is used for the decryption, the processor may utilize the host ID of the currently executing host as well as the host ID in the pointer to identify the shared key to be used for decryption. In an alternative embodiment, different encodings of a memory access instruction may indicate which key is to be used (e.g., a first variation of a MOV instruction may specify that the local pointer encryption key should be used while a second variation may specify that a shared key is to be used).

In various embodiments, the local pointer encryption key and the shared keys may be synchronized among hosts that are authorized to access such keys in order to maintain correct pointers. For example, if Host 2 is authorized to generate keys to object 702, then Host 2 executing on some physical machine should be able to determine whether a key was ever previously established between Host 1 and Host 3, even if that occurred on a different physical machine in response to a key request issued by a different host. Host 2 should also be able to obtain that key so that it can generate Pointer 4 (otherwise if Host 3 were to use Pointer 4 on a physical machine that has a different shared key between Host 1 and Host 3 than the one that Host 2 used to generate Pointer 4, then Pointer 4 would not decrypt properly). Any suitable mechanisms (e.g., distributed hash tables) may be used to maintain key synchronization. Access to the keys used to generate the various pointers may be based on trust established using, e.g., an attestation protocol.

EXAMPLES

Additional examples of the presently described enhanced privacy embodiments include the following, non-limiting implementations. Each of the following non-limiting examples may stand on its own or may be combined in any permutation or combination with any one or more of the other examples provided below or throughout the present disclosure.

Example AA1 relates to an apparatus. The apparatus comprises a processor unit comprising circuitry to generate, for a first network host, a request for an object of a second network host, wherein the request comprises an address comprising a routable host ID of the second network host and an at least partially encrypted object ID, wherein the address uniquely identifies the object within a distributed computing domain; and a memory element to store at least a portion of the object.

Example AA2 includes the subject matter of Example AA1, wherein the partially encrypted object ID is unforgeable.

Example AA3 includes the subject matter of Example AA1, wherein the circuitry is to further execute a memory access instruction having an operand that references the address.

Example AA4 includes the subject matter of any previous Example AA, wherein the object ID includes context information for a cryptographic operation associated with the object.

Example AA5 includes the subject matter of any previous Example AA, wherein the address comprises at least 128 bits.

Example AA6 includes the subject matter of any previous Example AA, wherein the routable host ID is 64 bits long and the object ID is 64 bits long.

Example AA7 includes the subject matter of any previous Example AA, wherein the circuitry is to use the address as a cryptographic key to decrypt the object.

Example AA8 includes the subject matter of any previous Example AA, wherein the distributed computing domain comprises the entire Internet.

Example AA9 includes the subject matter of any previous Example AA, wherein the circuitry is to generate the request responsive to a call instruction referencing the address and a determination to offload execution of a code object based on a current load of a processor unit running the first network host.

Example AA10 includes the subject matter of any previous Example AA, wherein the circuitry is to generate the request responsive to a determination that a page table does not include a mapping of the object ID to a physical address.

Example AA11 includes the subject matter of any previous Example AA, further comprising a key lookaside buffer to associate the host ID with a key to decrypt the object.

Example AA12 includes the subject matter of Example AA10, wherein the circuitry is to invoke an authorization protocol to obtain the key responsive to a miss in the key lookaside buffer.

Example AB1 relates to a method. The method comprises generating, by a first network host, a request for an object of a second network host, wherein the request comprises an address comprising a routable host ID of the second computing host and an at least partially encrypted object ID, wherein the address uniquely identifies the object within a distributed computing domain; and accessing the object.

Example AB2 includes the subject matter of Example AB1, wherein the partially encrypted object ID is unforgeable.

Example AB3 includes the subject matter of any previous Example AB, further comprising executing, by the first network host, a memory access instruction having an operand that references the address.

Example AB4 includes the subject matter of any previous Example AB, wherein the object ID includes context information for a cryptographic operation associated with the object.

Example AB5 includes the subject matter of any previous Example AB, wherein the address comprises at least 128 bits.

Example AB6 includes the subject matter of any previous Example AB, wherein the routable host ID is 64 bits long and the object ID is 64 bits long.

Example AB7 includes the subject matter of any previous Example AB, further comprising using the address as a cryptographic key to decrypt the object.

Example AB8 includes the subject matter of any previous Example AB, wherein the distributed computing domain comprises the entire Internet.

Example AB9 includes the subject matter of any previous Example AB, wherein the request is generated responsive to a call instruction referencing the address and a determination to offload execution of a code object based on a current load of a processor unit running the first network host.

Example AB10 includes the subject matter of any previous Example AB, further comprising generating the request responsive to a determination that a page table does not include a mapping of the object ID to a physical address.

Example AB11 includes the subject matter of any previous Example AB, further comprising searching a key lookaside buffer using the routable host ID for a key to decrypt the object.

Example AB12 includes the subject matter of Example AB11, further comprising invoking an authorization protocol to obtain the key to decrypt the object responsive to a miss in the key lookaside buffer.

Example AC1 includes an apparatus comprising means to perform one or more elements of a method of any one of Examples AB1-AB12.

Example AD1 includes one or more non-transitory computer-readable media comprising instructions to cause an electronic device, upon execution of the instructions by one or more processors of the electronic device, to perform one or more elements of a method of any one of Examples AB1-AB12.

Example AE1 includes machine-readable storage including machine-readable instructions which, when executed, implement the method of any one of Examples AB1-AB12.

Example AF1 includes an apparatus comprising: one or more processors and one or more computer-readable media comprising instructions that, when executed by the one or more processors, cause the one or more processors to perform the method of any one of Examples AB1-AB12.

Pointer Override Instructions

Figure 8:
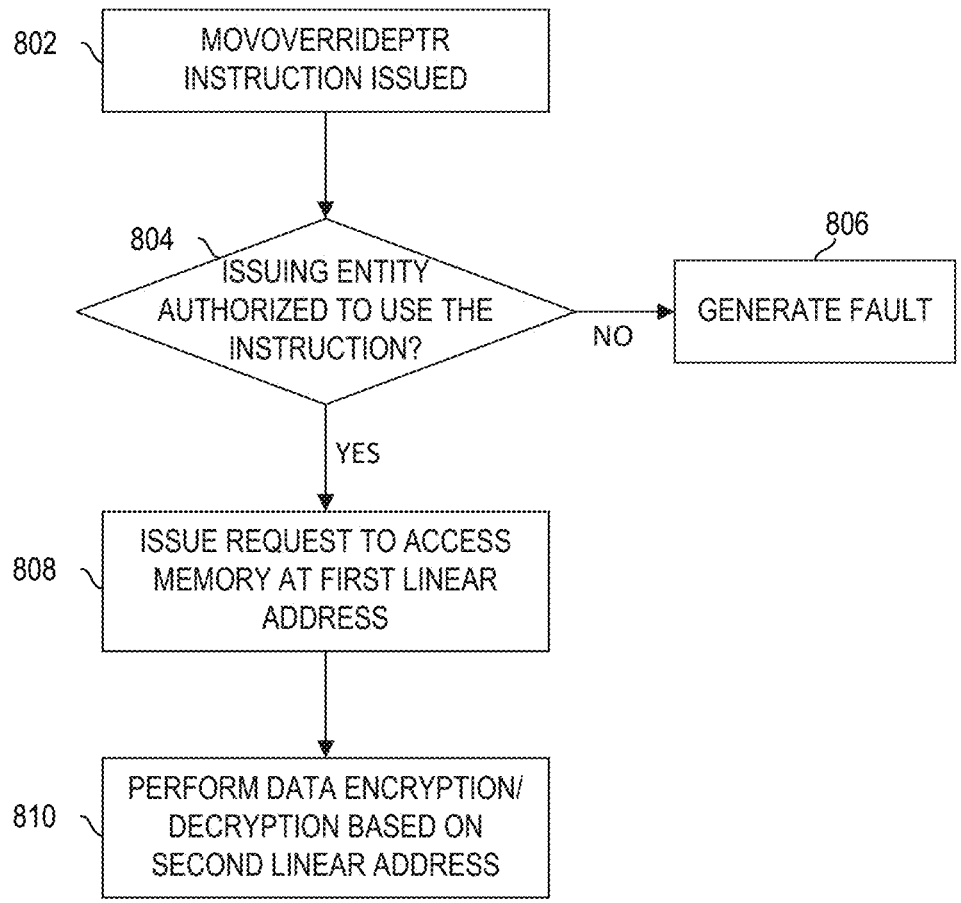
FIG. 8 depicts a flow for a memory access instruction that specifies different linear addresses for moving data to or from memory according to at least one embodiment of the present disclosure.

FIG. 8 depicts a flow 800 for a memory access instruction that specifies separate linear addresses for moving data to or from memory in accordance with certain embodiments. During operation of a computing system (e.g., a physical machine 400 or other computing system described herein), a software entity (e.g., a virtual machine monitor (VMM) or some other process) that performs 10 on behalf of another software entity (e.g., virtual machine, process, thread, etc.) may need to access plaintext contents of memory. However, some embodiments utilizing cryptographic computing may bind data encryption to linear addresses. That is, the data stored at a particular physical address may be encrypted based on at least a portion of a linear address that maps to that physical address. However, software entities that access the same physical memory may use different linear addresses to access the same physical address. For example, a first software entity may access a physical address using a first linear address and a second software entity may access the physical address using a second linear address. Thus, the software entity performing the access on another software entity's behalf may use a linear address that is different from the one that was used to encrypt the data at the underlying physical address (e.g., as part of a memory access instruction issued by the other software entity). If this different linear address is used as a basis for cryptographic operations on the data, the data could be decrypted or encrypted improperly.

As one example, a VMM (which may, e.g., be a privileged process) may need to access memory of a guest to perform an operation. For example, the VMM may access guest memory to emulate a software instruction. In such a case, the VMM may access the guest memory as if it were the guest and decrypt the accessed data in order to emulate an instruction. The VMM may also re-encrypt the accessed data (e.g., if modified) and store the data back to memory.

As another example, a process such as a microkernel (which in one example could be an unprivileged process) used for networking may exchange network packets between client processes and a networking process via shared memory. The networking process may coordinate networking among multiple client processes (e.g., by forwarding data between the client processes, by using a network interface to send data to other devices that aren't connected directly to the instance of the network process, among others). In operation, the network process may have its own linear address space that is separate from the linear address space of a client process (e.g., the same physical address may be mapped to a first linear address in the network process's address space and to a second linear address in the client process's address space).

Various embodiments provide a memory access instruction MOVOVERRIDEPTR that accepts a destination operand specifying a location to which data is to be moved, a source operand specifying a location at which data is stored, and a third operand specifying a linear address to use in a cryptographic operation on the data. When the MOVOVERRIDEPTR instruction specifies movement of data from memory to a register, the source operand may specify a linear address of the memory that is different from the linear address to be used in the cryptographic operation (e.g., a decryption of the data accessed from the memory). When the MOVOVERRIDEPTR instruction specifies movement of data from a register to memory (or movement of an immediate value to memory), the destination operand may specify a linear address of the memory that is different from the linear address to be used in the cryptographic operation (e.g., encryption of the data to be stored in the memory).

During execution of the instruction, the linear address in the source operand or the destination operand (depending on whether the instruction retrieves data from or moves data to the memory) may be mapped to a physical address of the memory (e.g., via a page table or a TLB) and the other linear address is used as a cryptographic key or tweak to encrypt or decrypt the data (depending on whether the move is to or from memory) that is stored to or retrieved from the physical address.

In one embodiment, the instruction may be specified as MOVOVERRIDEPTR r64, m64, r128 when data is retrieved from memory into a register and as MOVOVERRIDEPTR m64, r64, r128 when data is moved from a register into memory, where r64 specifies a 64-bit register that is to store the data (prior to being stored in memory or after being retrieved from memory) m64 specifies a 64-bit linear address (the linear address in the address space of the entity that issues the instruction), and r128 specifies a register that includes the linear address to be used in the cryptographic operation. In some embodiments, the linear address used in the cryptographic operation may be any suitable pointer described herein, such as an enhanced cryptographic address as described above or other cryptographic pointer. In other embodiments, the lengths of the linear addresses may be any suitable length (and the linear address identifying the data location and the linear address used in the cryptographic operation may have the same length or may have different lengths).

In various embodiments, either of the two linear addresses supplied by the MOVOVERRIDEPTR instruction may be encrypted or unencrypted. In one embodiment, the linear address used for addressing is unencrypted, while the linear address used for cryptography is encrypted. Execution of the instruction may include decryption of either or both linear addresses prior to mapping the first linear address to a physical address or using the second linear address in a cryptographic operation).

This instruction may allow authorized software to separately supply addresses for data encryption binding and address translation. Thus, the MOVOVERRIDEPTR may be issued by an OS, VMM, a different process, or other authorized software entity to perform a memory access using a linear address defined in the current address space, but encrypted or decrypted using a different linear address as the key or tweak (e.g., a linear address used by another software entity used for both address translation and to encrypt the data).

The software entities using this instruction may obtain the linear address to be used in the cryptographic operation in any suitable manner. Referring back to the examples above, if a VMM is emulating a memory access, in one example the VMM may obtain the linear address (to be used in the cryptographic operation) from the software being emulated via a register. In the network process example above, the client process can communicate the linear address to snap microkernel so the microkernel can supply it in an instruction.

In the embodiment depicted, the flow begins at 802 where a software entity issues a MOVOVERRIDEPTR instruction. At 804, a determination is made as to whether the software entity issuing the instruction is authorized to use the MOVOVERRIDEPTR instruction. Use of the MOVOVERRIDEPTR instruction may be restricted to certain software entities to reduce the security risk associated with the instruction. The processor unit executing the instruction may perform any suitable check to see if the software entity is authorized to execute MOVOVERRIDEPTR instructions. In one embodiment, the processor unit may check a model specific register (MSR) that stores information indicating whether the software entity is authorized to use the instruction. In some embodiments, privileged software (e.g., an OS or VMM) may have access rights to the MSR in order to specify which processes are able to use the MOVOVERRIDEPTR instruction. In one embodiment, the determination of whether a process is allowed to use the MOVOVERRIDEPTR may be based on a privilege level of the software (e.g., ring 0 software may automatically be allowed to use the MOVOVERRIDEPTR instruction, while other software may be prevented from using the instruction or the system may have to be specially configured, e.g., by privileged software, to be allowed to use the instruction). The check may be done at a per process granularity (e.g., if a process is allowed to use the instruction, then any portion of that process may use the instruction) or at a finer granularity (e.g., on a page by page basis for the code executing the process). In some embodiments, usage of the instruction may be restricted to certain address ranges or with certain keys. For example, a given process may be allowed to use multiple keys, e.g., selectable via a slice of bits within the pointer. In some embodiments, the use of this instruction is only allowed on a subset of those keys. Continuing the example above, the network microkernel process may only be allowed to use this instruction on the keys corresponding to memory shared with other processes, but not its own private memory in order to enhance its resistance to threats against that private memory. The authorization check may be done by any suitable portion of the processor unit. For example, the check may be performed by an instruction decode unit (responsive to recognizing that the MOVOVERRIDEPTR instruction has been issued) or by an execution unit.

If the issuing software entity is not authorized to use the instruction, a fault is generated at 806 (e.g., in a manner similar to when a privileged instruction is executed outside of a privileged mode of operation). If the issuing software entity is authorized to use the instruction, then at 808 the processor unit may issue a request (e.g., to a memory execution unit/controller which could be part of the processor unit or coupled to the processor unit) to access the memory at a first linear address specified in the instruction. The first linear address may be a valid reference to the data in the current address space (the address space of the software entity issuing the instruction). At 810, data encryption or decryption is performed on the data at the first linear address based on a second linear address specified by the instruction. The order of operations may be dependent on whether the MOVOVERRIDEPTR is moving data from a register to memory (in which case the encryption may be performed first followed by the memory access) or moving data from the memory to a register (In which case the memory access may occur first followed by the decryption of the data). In various embodiments, the second linear address may be supplied in the instruction in an encrypted form and may be used in that form to encrypt or decrypt the data as part of the execution of the instruction.

Context Information Table

Figure 9:
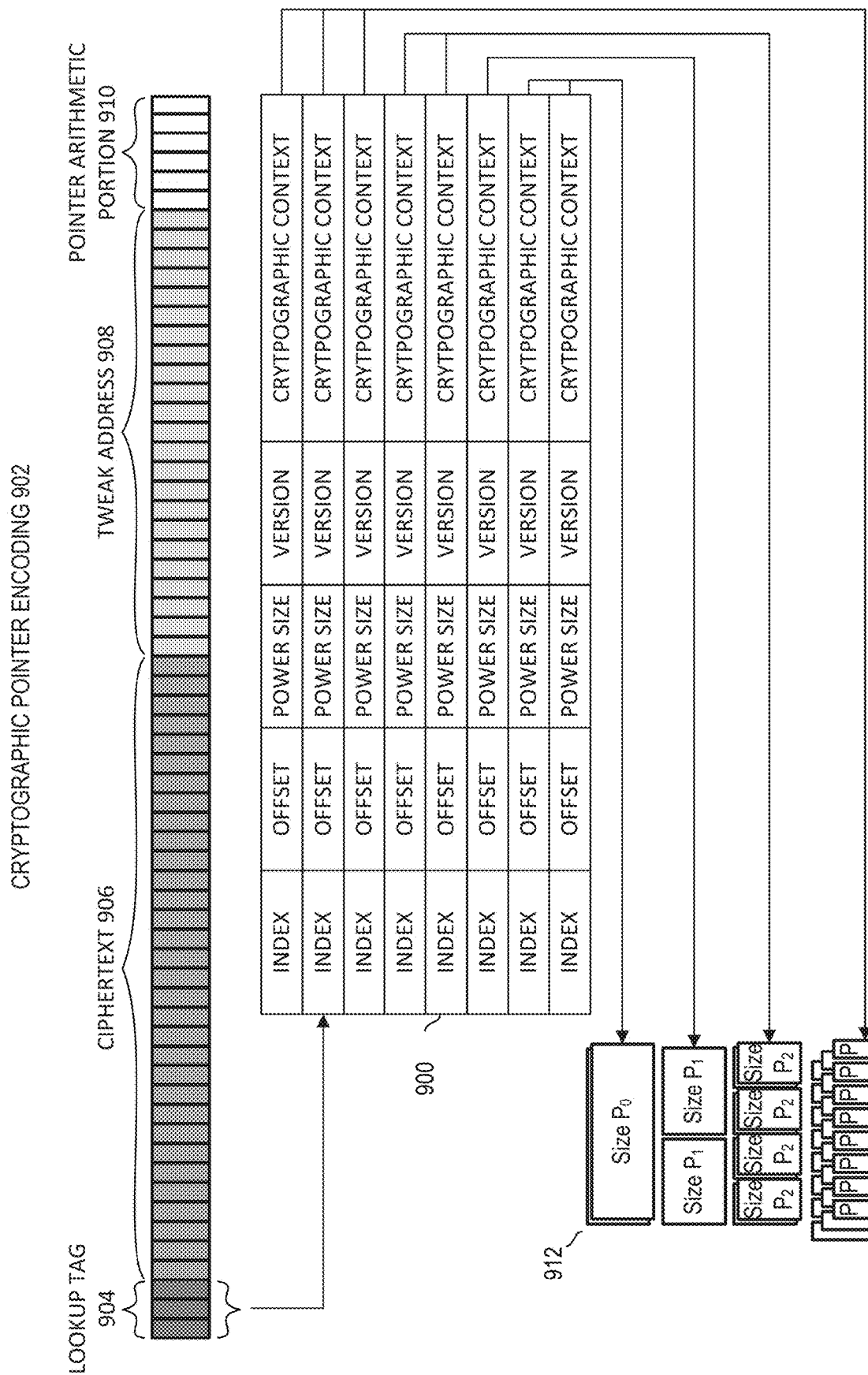
FIG. 9 depicts a table comprising context information and a cryptographic pointer encoding according to at least one embodiment of the present disclosure.

FIG. 9 depicts a table 900 comprising context information and a cryptographic pointer encoding 902 in accordance with certain embodiments. The cryptographic pointer encoding 902 may represent, e.g., a linear address that is supplied in an instruction for a memory access (e.g., a MOVOVERRIDEPTR instruction, a standard MOV instruction, other memory access instruction described herein, or any other suitable memory access instruction).

In the embodiment depicted, the cryptographic pointer encoding 902 includes a lookup tag 904, ciphertext 906, tweak address 908, and pointer arithmetic portion 910. Although the portions of encoding 902 depict particular bit lengths, other embodiments may include any suitable number of bits for each portion. When a linear address having such an encoding is utilized in a memory access instruction, the lookup tag 904 may be used to index into table 900 to obtain additional context information (beyond any context information embedded in the linear address itself). Such embodiments may allow for additional context information to be used without using up bits in the encoding of the linear address and may be especially useful to provide information that may be common among many linear addresses, e.g., in the same application. In the embodiment depicted, the size of the lookup tag 904 is 3 bits and the lookup tag indexes into a table having 8 entries, although other embodiments may utilize other lookup tag and table sizes.

The table 900 may be implemented using any suitable memory, such as a pool of registers. In one embodiment, the registers are MSRs managed by an operating system (or other privileged component). In another embodiment, the registers may be user mode control registers configurable via specialized instructions. Authorization to configure the table may be provided in any suitable manner (e.g., a page table for instruction code may include a bit indicating whether the code is authorized to modify the table). User space or other software may dynamically change the contents of the table 900 or the lookup tag values in supplied linear addresses in order to reference the desired context information.

In the embodiment depicted, an entry of the table 900 is associated with an index (which could be explicitly stored in the table or could be implicit based on an entry's location within the table 900) and includes context field types including a power size, offset, version, and cryptographic context. In other embodiments, table 900 may include other context field types or any suitable subset of one or more context field types.

The offset value may be a value that is added to a plaintext linear address value produced by decrypting an encrypted input pointer (such as a linear address encoded according to encoding 902). The resulting sum may then be used as the linear address that can be mapped to the physical address of the data while using the encrypted input pointer as a key or tweak for encrypting or decrypting the data. Thus, in conjunction with the offset value, a single cryptographic pointer may be used to map to the physical address of the data to be accessed as well as for cryptographic operations on the data. Thus, referring again to the examples above, a VMM, networking process, or other suitable software entity could utilize the offset to translate between an address space utilized by the software entity (a current address space) and an address space utilized by another software entity such as a guest machine or client process (where the address space utilized by the other software entity may include the linear addresses used to encrypt data referred to by the address space). Thus, the software entity may correctly decrypt data encrypted using a linear address from another software entity's linear address space.

As an alternative to using a table 900 to obtain an offset, some embodiments may store an offset in a register. This offset could then be added to a plaintext linear address produced by decrypting an encrypted pointer specified in a memory access instruction prior to translating the linear address to a physical address, while using the encrypted pointer as a data tweak for cryptographic operations on the data stored at the plaintext linear address.

In other embodiments, partial homomorphic encryption may be used to add an offset to a linear address in an at least partially encrypted pointer to reduce exposure of the plaintext address. In such an embodiment, the offset may be encrypted and the resulting ciphertext may be added to corresponding ciphertext of the at least partially encrypted pointer. By adding the two ciphertexts, the plaintext offset is effectively added to the underlying plaintext linear address. The result may be decrypted and translated to obtain the physical address of the data, while the original encrypted pointer is used as a data tweak for cryptographic operations on the data. Other embodiments could alternatively utilize full homomorphic encryption to perform this operation, although additional logic may be required to implement full homomorphic encryption relative to partial homomorphic encryption.

In some embodiments, the power size value may specify the number of bits in the tweak address 908 (and thus implicitly the number of bits in the pointer arithmetic portion 910 and the size (or rough size) of an allocation in memory). The version may represent a particular version of an allocation associated with the power size. A version number can be a deterministically different value such as a sequential number that determines current ownership of the referenced allocated memory in time. The sequential number can be incremented by a predetermined amount each time an indirect address is created for newly allocated memory.

In the embodiment depicted, allocations 912 include various allocations. Allocations 912 include two different versions (with each version associated with a different version value) having a power size of $P_0$ with the same base address, two different allocations with power size of $P_1$ (at different base addresses), 8 different allocations with power sizes of $P_2$ (with a set of four of these having a first version value and the other set of four having a second version value), and 24 allocations having a power size of $P_3$ (with each set of 8 having its own respective version value). In this example, the power size Pi increases with decreasing I (although in embodiments in which the power size is specified in the pointer an increasing value for the power size may correspond to increasing allocation size). Each row in the table 900 may be associated with a particular allocation or set of allocations (and any of the context information in the row may be used to encrypt data of the respective allocation (s)).

The cryptographic context may include a cryptographic data key, random number, tweak value, or other information that may be utilized in the cryptographic operation on the data. In one embodiment, the cryptographic context may be combined with other information from the table, such as the version value or power size value, to produce a value that may be used in the cryptographic operation.

In some embodiments, the table 900 may be used with multi-tenant scenarios where multiple compartments within a process each have their own cryptographic data key (and thus may use a different lookup tag 904 to reference the key, e.g., withing the cryptographic context field, in the table 900). The compartments could also have a shared memory region that may be accessed using a common cryptographic key (this key could also be in the table 900 and could be accessed by multiple compartments using the same lookup tag 904).

Garbage Collection

Figure 10:
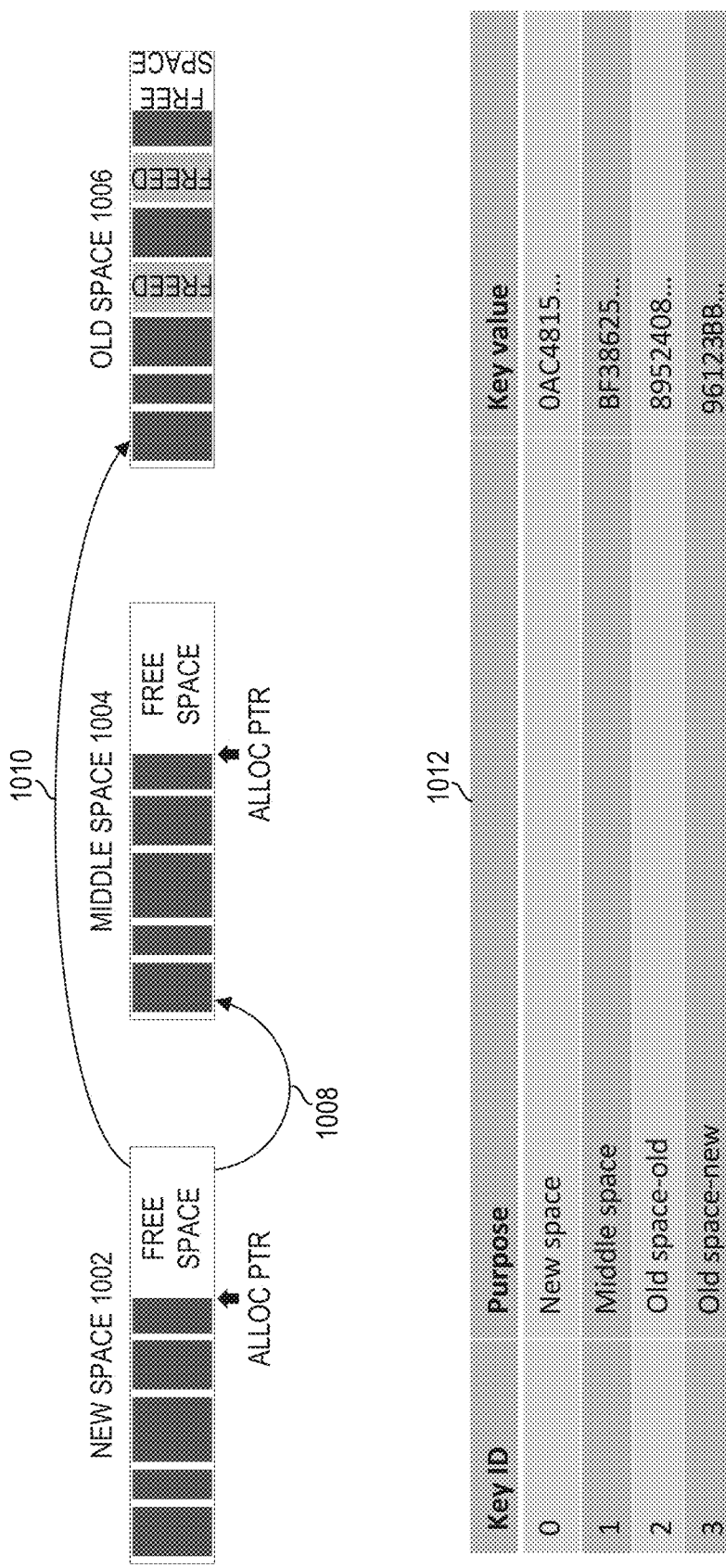
FIG. 10 depicts various memory spaces and a table of cryptographic keys used in used in conjunction with garbage collection operations according to at least one embodiment of the present disclosure.

FIG. 10 depicts various memory spaces and a table of cryptographic keys used in conjunction with garbage collection operations in accordance with certain embodiments. Many programming languages utilize automatic memory management that may utilize a procedure commonly referred to as garbage collection. The garbage collection procedure may track how memory is being referenced within an application and detect when active references to memory have been eliminated or have expired (e.g., by detecting orphan objects that are no longer referenced from stack memory, global variables, or registers, whether directly or indirectly). The underlying memory may then be reclaimed and used for other purposes. In at least some embodiments, the garbage collection operates on a heap in memory in which objects or dynamic data is stored.

In the embodiment depicted, three memory spaces are shown: a new space 1002, a middle space 1004, and an old space 1006. The new space 1002 may be used for new memory allocations, the middle space 1004 may be used in conjunction with the new space during garbage collection and may also store new memory allocations, and the old space 1006 may be used for older allocations. In some languages, the new space 1002 may be referred to as the "from-space" and the middle space 1004 may be referred to as the "to-space". Each space may include allocations of various sizes as well as free space. When allocation for a new object in a space is reserved, the allocation pointer (alloc ptr) for that space may be incremented according to the allocation size. Once the allocation pointer reaches the end of the space being filled, a garbage collection pass may be triggered to move allocations from that space into one or more of the other spaces in order to compact the memory.

In various embodiments, the garbage collector may check the spaces for unused objects at intervals, which could be different for different spaces. For example, newly allocated objects may have a relatively high likelihood of being reclaimed, so garbage collection may be run more often on the new space 1002 and the middle space 1004 than on the old space 1006 (once a memory allocation survives a few garbage collection passes, then the probability that it will go unused in the near term drops significantly, thus the old space 1006 is not checked as often as the new space 1002).

Once the new space 1002 is filled with memory allocations (as indicated by the position of the allocation pointer), a garbage collection pass may be performed on the new space. If an allocation is no longer alive, the allocation is freed. If an allocation is alive, it may be moved into the middle space in operation 1008 or the old space in operation 1010 (e.g., newer allocations may be moved into the middle space 1004 while older allocations, such as allocations that have survived a threshold number (e.g., 2) of garbage collection passes, may be moved from the new space 1002 to the old space 1006). The allocations moved into the middle space 1004 may be placed in a contiguous manner to maximize the size of the area of the free space within the middle space 1004. After the garbage collection pass is completed, the new space 1002 is cleared and the middle space 1004 and the new space 1002 swap roles. New memory allocations are placed in the free space of the middle space 1004 until the allocation pointer of the middle space 1004 reaches the end of the middle space 1004 and then garbage collection is run on the middle space 1004 (with newer allocations being written in a contiguous manner to the new space 1002 and older allocations being written to the old space 1006). The new space 1002 and the middle space 1004 swap roles again and the procedure may continue in this manner any number of times.

Garbage collection may be run less frequently on the old space (e.g., at regular intervals or responsive to a trigger such as a determination that the amount of available old space is less than a threshold). The garbage collector iterates through the allocations in the old space and if an allocation is no longer alive, then the collector marks the allocation to be freed. The garbage collector may also compact the memory in the old space by rearranging the objects in the old space.

In embodiments of the present disclosure, cryptographic keys used to encrypt or decrypt data stored in the various spaces may be refreshed at certain intervals in order to amplify the security of the heap (as the longer a key is used the more vulnerable the key becomes). In one embodiment, a different cryptographic key is used for each space and when an object is moved from one space to another it is decrypted based on the key for the space it is being moved from and then encrypted based on the key for the space it is moving to. The cryptographic key for a particular space may be associated with that space in any suitable manner. For example, the keys may be mapped with the respective spaces using range registers or protection keys (e.g., IDs of the keys that are stored in page table entries).

In some embodiments, a key for a space may be refreshed in conjunction with the garbage collection procedure. For example, prior to compacting the objects of the new space 1002 into the middle space 1004, a new cryptographic key is selected for the middle space and this cryptographic key is used to encrypt the objects for storage in the middle space. Thus, when an object is moved from the new space 1002 into the middle space 1004, the object may be decrypted using the key defined for the new space 1002 and then encrypted using the new key defined for the middle space 1004. Once the garbage collection pass on the new space 1002 is completed, the key for the new space 1002 may be deleted, marked as inactive, or may be overwritten by a new key. In the next garbage collection pass (performed on the middle space 1004), prior to compacting the objects of the middle space 1004 into the new space 1002, a new cryptographic key is selected for the new space and this cryptographic key is used to encrypt the objects for storage in the new space (after being decrypted using the key defined for the middle space).

As another example, prior to compacting the old space 1006 via a garbage collection pass, a new key is selected for new data storage (e.g., for objects copied from the new space 1002 or middle space 1004 into the old space 1006 or for objects copied from one location of the old space into another location of the old space during defragmentation of the old space). The key that was previously used for the old space 1006 may then become the "old key." Because the old space 1006 may include objects encrypted using different keys (e.g., the new key and the old key), a processor unit may support a memory access instruction that may specify the key to be used (e.g., the old key) when reading an old allocation to be compacted during garbage collection. The same memory access instruction could then be used to specify the new key to encrypt that same data and move it to a different portion of the old space 1006.

In order to facilitate the use of multiple keys among the different spaces (or multiple keys within one of the spaces), various embodiments provide a memory access instruction MOVOVERRIDEKEY that accepts a destination operand specifying a location to which data is to be moved, a source operand specifying a location at which data is stored, and a third operand identifying a key to use in a cryptographic operation on the data. When the MOVOVERRIDEKEY instruction specifies movement of data from memory to a register, the source operand may specify a linear address of memory while the destination operand specifies a register into which the data is to be moved (after being decrypted according to the key specified by the third operand). When the MOVOVERRIDEKEY instruction specifies movement of data from a register to memory, the destination operand may specify a linear address of the memory to which the data is to be stored (after being encrypted according to the key specified by the third operand) and the source operand may specify a register storing the data.

In one embodiment, the instruction may be specified as MOVOVERRIDEKEY r64, m64, imm16 when data is retrieved from memory into a register and as MOVOVERRIDEKEY m64, r64, imm16 when data is moved from a register into memory, where r64 specifies a 64-bit register that is to store the data (prior to being stored in memory or after being retrieved from memory) m64 specifies a 64-bit linear address of memory that is to store the data (after being moved from a register or prior to being moved to a register) and imm16 specifies an immediate value that identifies the key to use in the cryptographic operation (e.g., the immediate value may be an index into a table 1012 of cryptographic keys). In various embodiments, the operands of the MOVOVERRIDEKEY may take any suitable format (e.g., immediate value, register, memory address, etc.) and may have any suitable lengths or refer to parameters having any suitable lengths. For example, instead of the third operand being an immediate value, it could be a register storing the key (or a reference to the key) to be used.

Table 1012 is an example set of keys that may be indexed using an operand (e.g., an immediate operand) of the MOVOVERRIDEKEY instruction. In the embodiment depicted, the table includes a first key for the new space, a second key for the middle space, and two keys for the old space (an "old" key and a "new" key).

In some embodiments, rather than using an instruction that can specify one of multiple available keys, the old space 1006 may be aliased with both new and old keys, and the appropriate alias may be used for each access to select the key to be used (for an encryption or decryption operation). For example, the old space 1006 may be aliased to have multiple linear address to physical address memory mappings (e.g., one memory mapping using the new key and one memory mapping using the old key) to the same physical memory. Thus, different linear addresses (one for each alias) may map to the same physical address. Software performing the garbage collection may then select the appropriate alias (and thus the appropriate linear address) depending on which key should be used to access data at the corresponding physical address.

In some embodiments, each application may have its own heap with its respective spaces (such as those shown or variants thereof) used for garbage collection. In some embodiments, multiple heaps (each having respective spaces such as those shown or variants thereof) may be used within the same process (e.g., each script may have a different heap and each heap would have its own new space, middle space, and old space). The keys for different heaps could be identified with different keyIDs (thus the table 1012 could include entries for multiple different heaps). In some embodiments, a runtime (e.g., a JavaScript runtime) may be authorized to update the table 1012 in conjunction with switching between different heaps (e.g., to include keys specific to the heap(s) to be accessed). For example, the table could be implemented in user mode control registers the contents of which may be modified by the runtime.

Pointer Compression

Figure 11:
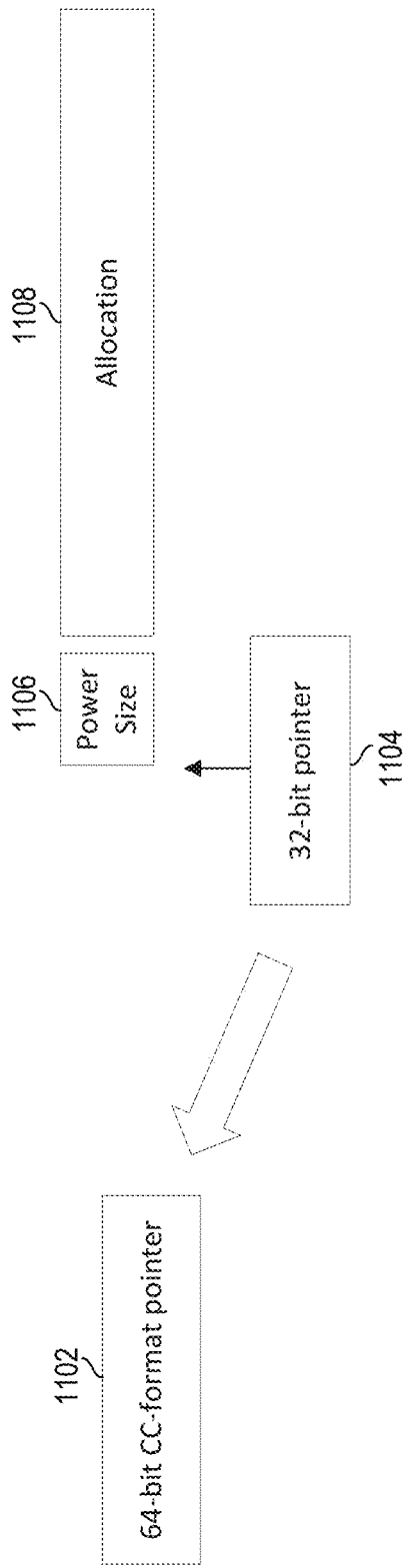
FIG. 11 depicts a compressed pointer for an allocation associated with context information according to at least one embodiment of the present disclosure.

FIG. 11 illustrates a compressed pointer 1104 for an allocation associated with context information in accordance with certain embodiments. In examples below, compression of a 64-bit pointer to a 32-bit pointer and corresponding decompression is discussed. In other embodiments, pointers of any suitable length may be compressed or decompressed into pointers of any other suitable length. Thus, similar operations to those described herein may be performed for any suitable length pointers. For example, 128-bit pointers may be compressed into 32-bit pointers or 64-bit pointers.

In some programming languages (e.g., JavaScript, Java, etc.), a pointer having a first length may be compressed to a shorter length to reduce the space required for pointers stored in memory. Compression of the pointers may reduce the amount of context information that may be included within the stored pointer (or necessitate leaving the context information out of the compressed pointer altogether in some instances). Various embodiments of the present disclosure allow for the preservation of context information for use in binding encrypted data even when compressed pointers are utilized (e.g., by storing the context information in association with the allocation corresponding to the compressed pointer).

In one embodiment, context information (e.g., power size 1106) associated with a compressed pointer 1104 (e.g., that does not fit in the compressed pointer) may be stored just prior to the allocation 1108 in memory. In at least some engines (e.g., the V8 JavaScript engine), when a pointer is stored in memory, the pointer refers to the base of the allocation, so storing the context information immediately prior to the allocation may allow for simple access to the context information (despite the context information being stored separately from the compressed pointer (as the compressed pointer, or multiple instances of the compressed pointer, could be stored in a part of the memory that is separate from the allocation 1108 to which the compressed pointer addresses). In various embodiments of the present disclosure, decompression of the 32-bit pointer 1104 may involve placing the context information (e.g., 1106) as well as the base address of the allocation 1108 (which could refer to the actual address of the start of the first word of the allocation 1108 or to the start of the context information itself) into the decompressed 64-bit pointer 1102. The decompressed pointer 1102 may have any suitable format, such as any of the formats for pointers described herein and may include any suitable context information (e.g., power size, version info, type info, allocation length, or other suitable information used in cryptographic operations on the data of the allocation 1108). Various embodiments may be utilized to maintain secure isolation between different objects of a heap even without storing all of the context information within the compressed 32-bit pointer 1104.

In the embodiment depicted, the context information comprises a power size 1106, which may indicate, e.g., which power of two slot size best fits the size of allocation 1108. When the compressed pointer 1104 is decompressed, the power size 1106 may be placed into the 64-bit pointer 1102. When the 64-bit pointer is used to store data to the allocation, the encryption of the data may be based on the power size 1106 and when the 64-bit pointer is used to access data from the allocation, the power size 1106 may be used to decrypt the data (e.g., the power size may be used within a cryptographic key or tweak). Accordingly, if a buffer overflow affecting the object that the pointer 1102 references were to occur, the allocation that is overflowed into may be protected as it would be encrypted differently (because it may be encrypted based on a different power size that is specific to that allocation).

The context information (or a portion thereof) stored in association with the allocation may be encrypted in some embodiments. In one embodiment, the context information may be encrypted using the same key as the data of the allocation 1108. In another embodiment, a different key may be used to encrypt the context information. In some embodiments, the location at which the context information is stored (or the location of the allocation) may be used as a tweak for the encryption. A cipher with diffusion for the context information encryption may be useful for mitigating attempts to selectively flip bits in the context information.

Figure 12:
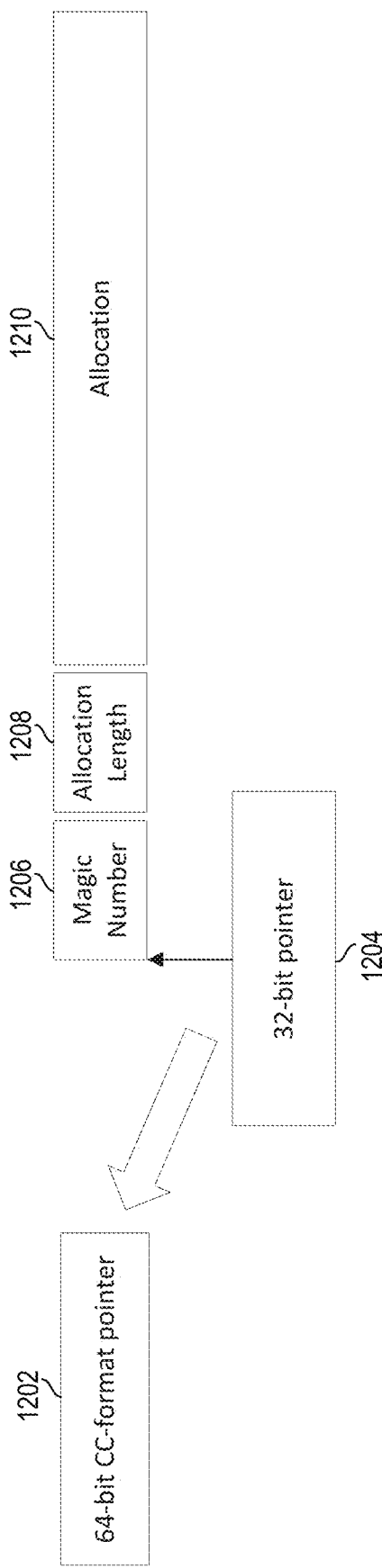
FIG. 12 depicts a compressed pointer for an allocation associated with context information including a magic number and an allocation length according to at least one embodiment of the present disclosure.

FIG. 12 illustrates a compressed pointer 1204 for an allocation 1210 associated with context information including a magic number 1206 and an allocation length 1208 in accordance with certain embodiments. The magic number 1206 may be any suitable number and may be used to protect integrity of the context information stored in association with the allocation 1210. The magic number 1206 can further strengthen the security for the allocation 1210 by operating like an authentication code. It is used to verify that the plaintext for the stored context information matches an expected format as defined by the expected magic number. If any context information has been corrupted, then it is highly likely that the plaintext magic number will also be corrupted assuming the cryptographic algorithm used has sufficient diffusion. This may facilitate early detection of a corrupted pointer value and may help with debugging or identifying malicious software.

The allocation length 1208 may be a precise length (e.g., as opposed to the rough estimate provided by the power size)

of the allocation 1210, and the allocation length 1208 may be included within the decompressed pointer 1202. Assuming sufficiently large allocations, the inclusion of the allocation length may provide additional security protection when used in the cryptography associated with the allocation. For example, the allocation length may be used as a tweak or within a key used when the allocation is accessed.

The allocation length may additionally or alternatively be used to perform bounds checking (to ensure that a pointer value requesting data from the allocation 1210 references a location within a range defined by the base address and the allocation length). For example, a check may be made to determine whether an offset specified by a pointer is smaller than the allocation length 1208. For example, certain formats of memory operands specify both a base register and a separate scaled index and/or displacement from the address in the base register. The processor unit may interpret the base register as referencing the beginning of the allocation and the sum of the scaled index and/or displacement as an offset within the allocation. The processor unit may then check that the entire requested access is within the bounds of the allocation. Alternatively, if a sufficiently large (e.g., 128-bit) uncompressed pointer representation is used, then the base, bound, and offset may all fit within the decompressed pointer so that a bounds check can be performed regardless of the format of the memory operand.

In some embodiments, encryption of data stored within an allocation (e.g., 1108, 1210) may be tweaked with all or a portion of the address of the memory location at which the context information is stored in association with the allocation (e.g., the allocation base address). If an adversary tries to copy out that encrypted context information and place it in front of another allocation to try to manipulate accesses to that other allocation, the attempt would be foiled because the other allocation begins at a different storage location and thus would have a different tweak value.

Temporal safety may be facilitated by quarantining allocation base addresses. In such embodiments, all memory may be reused, but allocations are placed at different base addresses. The quarantine may last for any suitable amount of time. In some embodiments (e.g., embodiments that incorporate the allocation base address and the allocation length in the encryption), the quarantining may be based on the allocation base addresses and the allocation lengths (such that unique allocation base address and allocation length pairs are quarantined). Thus, an allocation base address could be reused with different allocation lengths, or an allocation length could be reused with different allocation base addresses without being quarantined.

Figure 13:
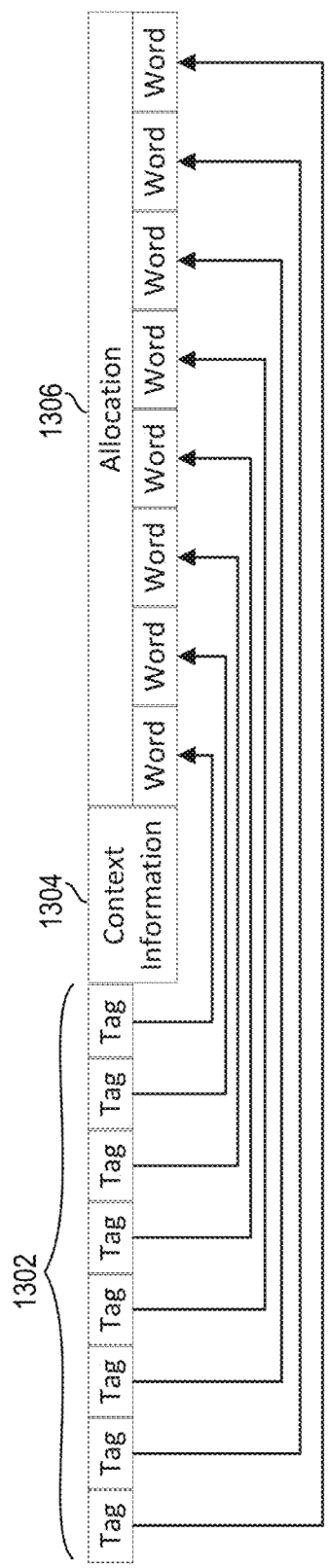
FIG. 13 depicts tag bits and context information stored in association with an allocation according to at least one embodiment of the present disclosure.

FIG. 13 depicts pointer tag bits 1302 and context information 1304 stored in association with an allocation 1306 in accordance with certain embodiments. Applications such as browsers may use pointer tag bits 1302 to distinguish between data (e.g., integers) and pointers (when pointers are being stored in memory). A pointer tag bit 1301 may indicate whether a corresponding word in the allocation 1306 contains a pointer or non-pointer data.

In some embodiments, pointer tag bits 1302 may be stored separately from, but alongside each word of in an allocation 1306 (e.g., in a pointer tag bitmap such as a binary value stored immediately prior to context information 1304 or allocation 1306, or immediately after allocation 1306). In various embodiments, use after free (UAF) attacks may be deterministically mitigated by maintaining the tag bitmap inline with the allocation (as depicted in the embodiment) or with external pointer tag bits. Deterministic UAF mitigation can be enforced by scanning all pointers in memory (e.g. starting from registers and descending recursively) and ensuring that all pointers to a freed allocation have been deleted prior to allowing the memory for that allocation to be reallocated.

In some systems, an ordinary memory access instruction wouldn't access the pointer tag bits (e.g., a pointer tag may be accessed implicitly by the processor unit in order to protect the pointers). An application such as a browser may drop one of the bits in the 32-bit representation of a compressed pointer and replace that bit with a tag of a different sort than the tag bits 1302. The purpose of this sort of tag is rather to distinguish between words of memory that contain pointers as compared to words of memory that contain data values. Compatibility with this approach may be maintained by encrypting the other 31 bits of pointer and leaving the tag bit unencrypted. If data is stored within the memory word rather than a pointer, it may be stored in its plaintext format.

In some memory accesses, the lower address bits of a pointer may be unencrypted so that pointer arithmetic may be performed to index into an allocation. However, in some applications such as browsers, compressed pointers may reference the base of an object and thus pointer arithmetic on the compressed pointers is not necessary (rather pointer arithmetic may be performed after the pointer is decompressed). Thus, in some embodiments, the entire compressed pointer (e.g., 1104, 1204, or variant thereof) may be encrypted. In other embodiments, the compressed pointer may be encrypted with the exception of the tag bit (thus 31 bits of a 32 bit compressed pointer may be encrypted and the tag bit may remain unencrypted).

Figure 14:
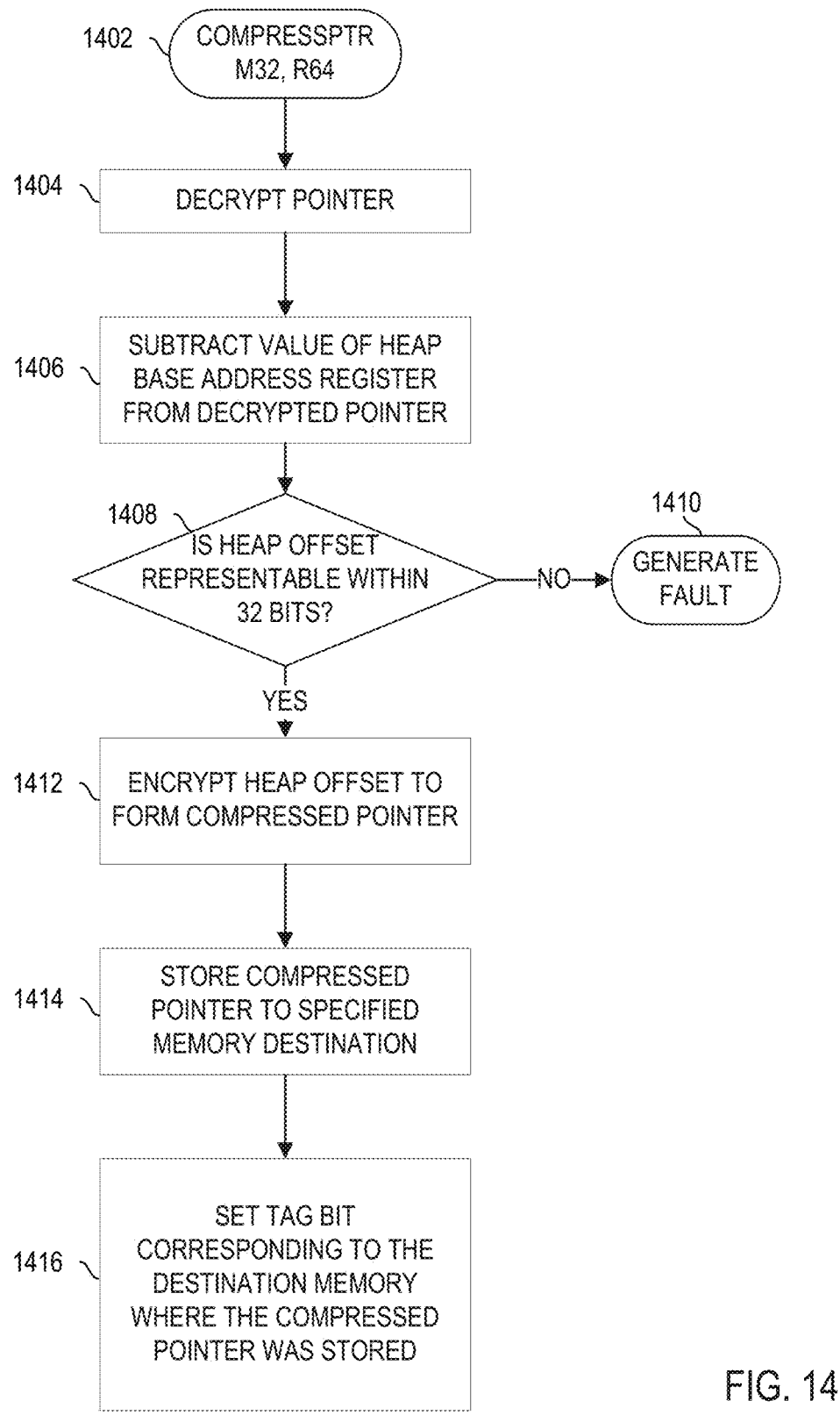
FIG. 14 depicts a flow for compressing a pointer according to at least one embodiment of the present disclosure.

FIG. 14 depicts a flow for compressing a pointer in accordance with certain embodiments. The flow begins with the issuance of a pointer compression instruction COMPRESSPTR at 1402. In the embodiment depicted, the COMPRESSPTR instruction accepts as a first operand a memory address at which a 32-bit compressed pointer is to be stored and a second operand identifying a register storing a 64-bit uncompressed pointer. In other embodiments, the compressed pointer and uncompressed pointer may be any other suitable lengths. For example, the uncompressed pointer may have a bit length of 128 and the compressed pointer may have a bit length of 32 or 64.

At 1404, the uncompressed pointer is accessed and decrypted (the uncompressed pointer referenced by the COMPRESSPTR instruction may be partly or wholly encrypted).

At 1406, a value of a heap base address register is subtracted from the decrypted pointer to generate a heap offset. Because a single process may utilize multiple heaps, in order to prevent false aliasing between the 32-bit pointers (in which the wrong heap may be referenced), a different base address for each heap may be utilized. The heap base address register may store the address of the current heap being accessed. Analogously, pointer compression could be applied to other regions besides the heap, e.g., the stack and global variables. If pointers to more than one region are compressed, then the software would inform the processor unit of which region is referenced for each compressed pointer, and additional base address registers for non-heap regions could be defined. For example, one or more bits within the compressed pointer could identify the region. Alternatively or in addition, an instruction could be executed to update the heap base address register prior to corresponding memory accesses. The heap base address register may equivalently be used as a stack base address register, globals base address register, etc.

In one embodiment, a register dedicated to storing the heap (or stack, globals, etc.) base address is included in the processor unit. This register may free up the general purpose registers (which in some runtimes are used to store the heap base address) for other purposes. Use of such a register may also simplify the COMPRESSPTR instruction as the register is implicitly used for the instruction and a register does not need to be included as an operand in the instruction. In other embodiments, the COMPRESSPTR instruction could accept an operand specifying a register that includes the heap base address.

At 1408, a determination is made as to whether the heap offset is representable within 32 bits. If it is not, a fault is generated at 1410 (as this may indicate that the decompressed pointer or the heap base address is corrupt). If the heap offset is representable within 32 bits, the flow moves to 1412.

At 1412, the heap offset is encrypted to form a compressed pointer and at 1414 the compressed pointer is stored at the specified memory destination. In various embodiments, the compressed pointer is encrypted according to any of the encryption schemes described herein (e.g., the encryption may be based on context information included in the uncompressed pointer and/or a data encryption key associated with the allocation into which the compressed pointer is stored).

In embodiments utilizing pointer tag bits (e.g., as shown in FIG. 13), at 1416 a pointer tag bit corresponding to the destination memory location (e.g., the word) in which the compressed pointer is stored is set. The tag bit may indicate that the memory location stores a pointer.

Figure 15:
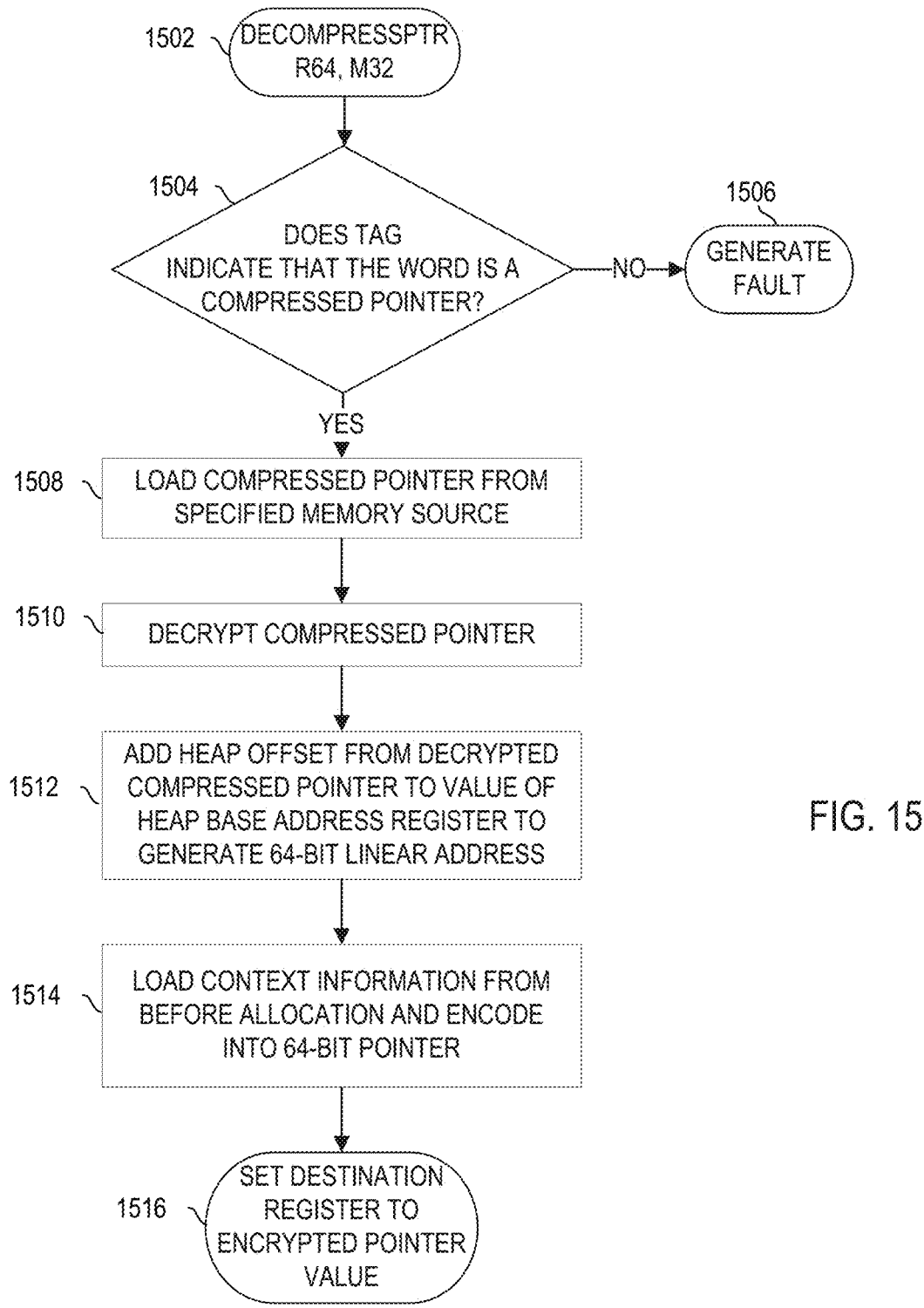
FIG. 15 depicts a flow for decompressing a pointer according to at least one embodiment of the present disclosure.

FIG. 15 depicts a flow for decompressing a pointer in accordance with certain embodiments. The flow begins with the issuance of a pointer decompression instruction DECOMPRESSPTR at 1502. In the embodiment depicted, the DECOMPRESSPTR instruction accepts as a first operand a register to store a 64-bit uncompressed pointer and as a second operand a memory address at which a 32-bit compressed pointer is stored. In other embodiments, the compressed pointer and uncompressed pointer may be any other suitable lengths. For example, the uncompressed pointer may have a bit length of 128 and the compressed pointer may have a bit length of 32 or 64.

At 1504, in some embodiments (e.g., embodiments that utilize pointer tags), a check is made as to whether the pointer tag indicates that the word referred to by the second operand is a compressed pointer. If the pointer tag indicates that the word is not a compressed pointer, then a fault is generated at 1506 and the instruction is not performed. If the tag indicates that the word is a compressed pointer, the flow moves to 1508.

At 1508, the compressed pointer is loaded from the memory source indicated by the instruction. The compressed pointer is then decrypted at 1510. In various embodiments, context information that is stored in association with the allocation at which the compressed pointer is stored is used in the decryption. In various embodiments, the decryption utilizes diffusion sufficient to facilitate detection of tampering with the compressed pointer.

At 1512, the heap offset from the decrypted compressed pointer is added to a value of the heap base address register (which could be a dedicated register 2840 as described above or a register specified in the instruction) to generate a 64-bit linear address.

At 1514, the context information that is stored in association with the allocation may be loaded from a space prior to the allocation and encoded within the 64-bit linear address to generate a 64-bit pointer. In various embodiments, all or a portion of the 64-bit pointer may be encrypted. At 1516, the resulting encrypted pointer value is placed in the destination register specified by the instruction.

Figure 16:
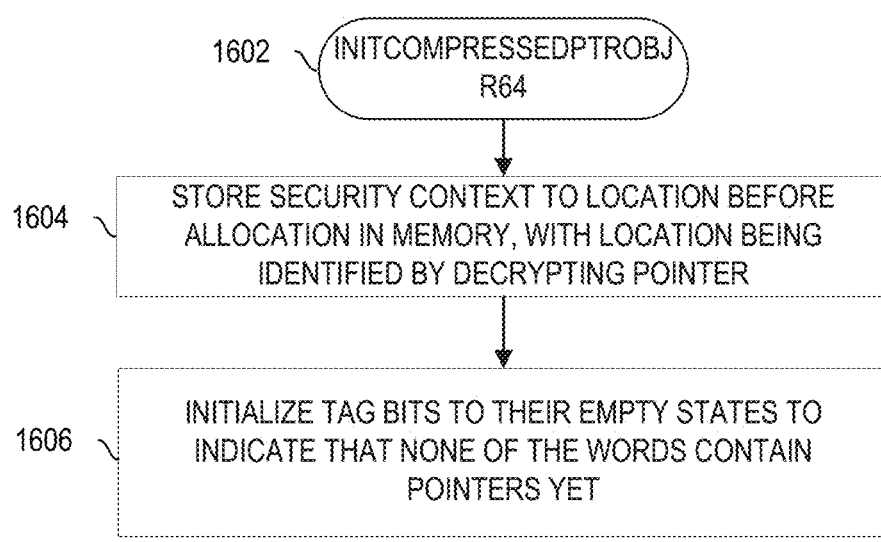
FIG. 16 depicts a flow for storing context information in association with an allocation in memory according to at least one embodiment of the present disclosure.

FIG. 16 depicts a flow for storing context information in association with an allocation in memory in accordance with certain embodiments. At 1602, an initialization instruction INITCOMPRESSEDPTROBJ is issued. In the embodiment depicted, the initialization instruction accepts a first operand specifying a register containing an uncompressed pointer to the allocation. In one embodiment, the uncompressed pointer may include context information. In some embodiments, the initialization instruction may accept one or more additional operands including or referencing context information.

At 1604, the context information specified in the uncompressed pointer and/or the additional operand(s) is stored to a location before the allocation referred to by the uncompressed pointer. In various embodiments, the uncompressed pointer specified by the instruction may be encrypted and execution of the instruction may include decrypting the uncompressed pointer to obtain the location of the allocation in memory. Once the context information is stored in memory, it may be obtained via a DECOMPRESSPTR instruction as described above.

At 1606, in embodiments utilizing pointer tag bits, the pointer tag bits may be initialized to indicate that none of the words in the allocation include pointers.

EXAMPLES

Example BA1 relates to a method. The method comprises executing a memory access instruction comprising a first operand referencing a pointer comprising a first linear address, wherein executing the memory access instruction comprises translating a second linear address to a physical address, accessing data at the physical address, and performing a cryptographic operation on the data based on the pointer.

Example BA2 includes the subject matter of Example BA1, wherein the memory access instruction comprises a second operand referencing the second linear address.

Example BA3 includes the subject matter of any previous Example BA, wherein executing the memory access instruction comprises adding an offset to the first linear address to generate the second linear address.

Example BA4 includes the subject matter of Example BA3, wherein executing the memory access instruction comprises using a lookup tag embedded in the pointer to index into a table to obtain the offset.

Example BA5 includes the subject matter of Example BA3, wherein executing the memory access instruction comprises accessing the offset from a register.

Example BA6 includes the subject matter of Example BA3, wherein adding an offset to the first linear address comprises using partial homomorphic encryption to add the offset in an encrypted form to the first linear address in an encrypted form.

Example BB1 relates to an apparatus. The apparatus comprises a memory element to store data and circuitry to execute a memory access instruction comprising a first operand referencing a pointer comprising a first linear address, wherein executing the memory access instruction comprises translating a second linear address to a physical address, accessing data at the physical address, and performing a cryptographic operation on the data based on the pointer.

Example BB2 includes the subject matter of Example BB1, wherein the memory access instruction comprises a second operand referencing the second linear address.

Example BB3 includes the subject matter of Example BB1, wherein executing the memory access instruction comprises adding an offset to the first linear address to generate the second linear address.

Example BB4 includes the subject matter of Example BB3, wherein executing the memory access instruction comprises using a lookup tag embedded in the pointer to index into a table to obtain the offset.

Example BB5 includes the subject matter of Example BB3, wherein executing the memory access instruction comprises accessing the offset from a register.

Example BB6 includes the subject matter of Example BB3, wherein adding an offset to the first linear address comprises using partial homomorphic encryption to add the offset in an encrypted form to the first linear address in an encrypted form.

Example BC1 relates to a method. The method comprises executing a memory access instruction comprising a first operand referencing a pointer comprising a first linear address, wherein executing the memory access instruction comprises accessing a lookup tag embedded in the pointer; indexing into a table based on the lookup tag to obtain context information; and performing a cryptographic operation on accessed data based on the context information.

Example BC2 includes the subject matter of Example BC1, wherein the context information includes an address offset.

Example BC3 includes the subject matter of any previous Example BC, wherein the context information includes a power size.

Example BC4 includes the subject matter of any previous Example BC, wherein the context information includes a version.

Example BC5 includes the subject matter of any previous Example BC, wherein the context information includes a cryptographic key.

Example BC6 includes the subject matter of any previous Example BC, wherein the context information includes a cryptographic tweak.

Example BD1 relates to an apparatus. The apparatus comprises a memory element to store data and circuitry to execute a memory access instruction comprising a first operand referencing a pointer comprising a first linear address, wherein executing the memory access instruction comprises accessing a lookup tag embedded in the pointer; indexing into a table based on the lookup tag to obtain context information; and performing a cryptographic operation on accessed data based on the context information.

Example BD2 includes the subject matter of Example BD1, wherein the context information includes an address offset.

Example BD3 includes the subject matter of any previous Example BD, wherein the context information includes a power size.

Example BD4 includes the subject matter of any previous Example BD, wherein the context information includes a version.

Example BD5 includes the subject matter of any previous Example BD, wherein the context information includes a cryptographic key.

Example BD6 includes the subject matter of any previous Example BD, wherein the context information includes a cryptographic tweak.

Example BE1 relates to a method. The method comprises assigning a first data encryption key to a first memory space and a second data encryption key to a second memory space; and performing a garbage collection pass on the first memory space by freeing one or more memory allocations of the first memory space that are no longer alive and moving other memory allocations of the first memory space into the second memory space.

Example BE2 includes the subject matter of Example BE1, further comprising assigning the second data encryption key to the second memory space responsive to initiating the garbage collection pass on the first memory space.

Example BE3 includes the subject matter of any previous Example BE, further comprising executing a memory access instruction during the garbage collection pass, wherein the memory access instruction includes a first operand specifying a location within the second memory space and a second operand specifying the second data encryption key.

Example BE4 includes the subject matter of any previous Example BE, wherein performing the garbage collection pass of the first memory space further comprises moving at least one memory allocation of the first memory space into a third memory space, wherein the third memory space comprises first allocations encrypted according to a third encryption key and second allocations encrypted according to a fourth encryption key.

Example BE5 includes the subject matter of Example BE4, further comprising maintaining a first linear address space to map to the third space and a second linear address space to map to the third space, wherein the first linear address space is associated with the third cryptographic key and the second linear address space is associated with the fourth cryptographic key.

Example BF1 relates to an apparatus. The apparatus comprises a first memory element to store a first data encryption key, a second memory element to store a data encryption key, and circuitry to assign a first data encryption key to a first memory space and a second data encryption key to a second memory space; and perform a garbage collection pass on the first memory space by freeing one or more memory allocations of the first memory space that are no longer alive and moving other memory allocations of the first memory space into the second memory space.

Example BF2 includes the subject matter of Example BF1, the circuitry to assign the second data encryption key to the second memory space responsive to initiating the garbage collection pass on the first memory space.

Example BF3 includes the subject matter of any previous Example BF, the circuitry to execute a memory access instruction during the garbage collection pass, wherein the memory access instruction includes a first operand specifying a location within the second memory space and a second operand specifying the second data encryption key.

Example BF4 includes the subject matter of any previous Example BF, wherein performing the garbage collection pass of the first memory space further comprises moving at least one memory allocation of the first memory space into a third memory space, wherein the third memory space comprises first allocations encrypted according to a third encryption key and second allocations encrypted according to a fourth encryption key.

Example BF5 includes the subject matter of Example BF4, the circuitry to maintain a first linear address space to map to the third space and a second linear address space to map to the third space, wherein the first linear address space is associated with the third cryptographic key and the second linear address space is associated with the fourth cryptographic key.

Example BG1 includes a method. The method comprises reserving an allocation in memory; storing context information associated with the allocation adjacent to the allocation; generating a decompressed pointer including an encoding of the context information; and using the decompressed pointer to access data in the allocation, wherein the access comprises performance of a cryptographic operation based on the context information.

Example BG2 includes the subject matter of Example BG1, wherein decompression of the pointer comprises adding an offset to a compressed pointer.

Example BG3 includes the subject matter of any previous Example BG, wherein the context information comprises a power size.

Example BG4 includes the subject matter of any previous Example BG, wherein the context information comprises a length of the allocation.

Example BG5 includes the subject matter of any previous Example BG, wherein the context information comprises a number to be checked to verify integrity of another portion of the context information.

Example BG6 includes the subject matter of any previous Example BG, further comprising storing a plurality of pointer tags adjacent to the context information or the allocation, wherein a respective pointer tag indicates whether a corresponding portion of the allocation stores a pointer or non-pointer data.

Example BG7 includes the subject matter of any previous Example BG, wherein generating a decompressed pointer includes decompressing a 32-bit pointer into a 64-bit pointer.

Example BH1 includes an apparatus. The apparatus comprises a memory element to store data and circuitry to reserve an allocation in memory; store context information associated with the allocation adjacent to the allocation; generate a decompressed pointer including an encoding of the context information; and use the decompressed pointer to access the data in the allocation, wherein the access comprises performance of a cryptographic operation based on the context information.

Example BH2 includes the subject matter of Example BH1, wherein decompression of the pointer comprises adding an offset to a compressed pointer.

Example BH3 includes the subject matter of any previous Example BH, wherein the context information comprises a power size.

Example BH4 includes the subject matter of any previous Example BH, wherein the context information comprises a length of the allocation.

Example BH5 includes the subject matter of any previous Example BH, wherein the context information comprises a number to be checked to verify integrity of another portion of the context information.

Example BH6 includes the subject matter of any previous Example BH, the circuitry to store a plurality of pointer tags adjacent to the context information or the allocation, wherein a respective pointer tag indicates whether a corresponding portion of the allocation stores a pointer or non-pointer data.

Example BH7 includes the subject matter of any previous Example BH, wherein generating a decompressed pointer includes decompressing a 32-bit pointer into a 64-bit pointer.

Example BI1 includes an apparatus comprising means to perform one or more elements of a method of any one of Examples BA1-BA6, BC1-BC6, BE1-BE5, or BG1-BG7.

Example BJ1 includes one or more non-transitory computer-readable media comprising instructions to cause an electronic device, upon execution of the instructions by one or more processors of the electronic device, to perform one or more elements of a method of any one of Examples BA1-BA6, BC1-BC6, BE1-BE5, or BG1-BG7.

Example BK1 includes machine-readable storage including machine-readable instructions which, when executed, implement the method of any one of Examples BA1-BA6, BC1-BC6, BE1-BE5, or BG1-BG7.

Example BL1 includes an apparatus comprising: one or more processors and one or more computer-readable media comprising instructions that, when executed by the one or more processors, cause the one or more processors to perform the method of any one of Examples BA1-BA6, BC1-BC6, BE1-BE5, or BG1-BG7.

By implementing 128-bit pointers as described herein, addressing and cryptographic protections based on such addressing (which may be referred to as cryptographic computing (CC)) may be extended outside of the core and memory hierarchy of a device to other devices connected to the core and memory hierarchy via an input/output (I/O or IO) interconnect. Similar to CC-based object granular memory protection for accesses from the core side, memory accesses from different device contexts on an IO side may require analogous protection to truly secure the system. Importance of IO security is increasing by the day as devices and accelerators (which may be generically referred to as XPUs, which may include central processing units (CPUs), graphical processing units (GPUs), and other types of processing units) are increasingly being considered as first-class compute elements in computing environments, such as cloud platforms.

Embodiments of the present disclosure provide key novelties around enhancements to the system-on-chip (SoC) IO subsystem, including devices as well as the associated software stack to support and extend CC-based protection semantics to the IO side. We enumerate these hardware and software changes as applicable in detail from the aspect of different IO threat boundaries/protection granularities, starting from coarse grained towards increasingly fine-grained protection akin to that on core side. When referring to the "IO", "IO subsystem", or "IO side" etc., the present description may refer to device interconnects and associated protocols, such as, for example, Peripheral Component Interconnect Express (PCIe)-based and/or Compute Express Link (CXL)-based interconnects and compatible devices (which may be referred to herein as "IO devices") and accelerators on the same system/platform (e.g., 8 socket server platforms).

Implementation 1

In this initial example, the threat boundary includes any potential untrustworthy IO side accesses to outside the direct memory access (DMA) buffers allocated to the IO device (e.g., to critical non-IO code, data structures of the context, assuming a common case such as Ring 3 application as context) to which device is assigned. Although IO side page tables do enforce access control, there are certain IO programming models like Shared Virtual Memory (SVM) where the IA page tables are shared between CPU and IO device, thereby allowing advantages of pointer sharing, unpinned IO buffers etc., but at the same time giving IO devices unfettered access to app/context memory (from virtual address space). Even some IO virtualization programming models like nested/two level page tables with pinned app pages are used to protect operating system (OS) critical memory structures but allow device full access to app (Guest Virtual Address) GVA space. In such use case scenarios, with the help of CC semantics on the core side along with some simple extensions to the software stack, one can protect non-IO code and data structures of the application memory from any untrustworthy IO side accesses (e.g., malicious device, drivers, etc.).

Figure 17:
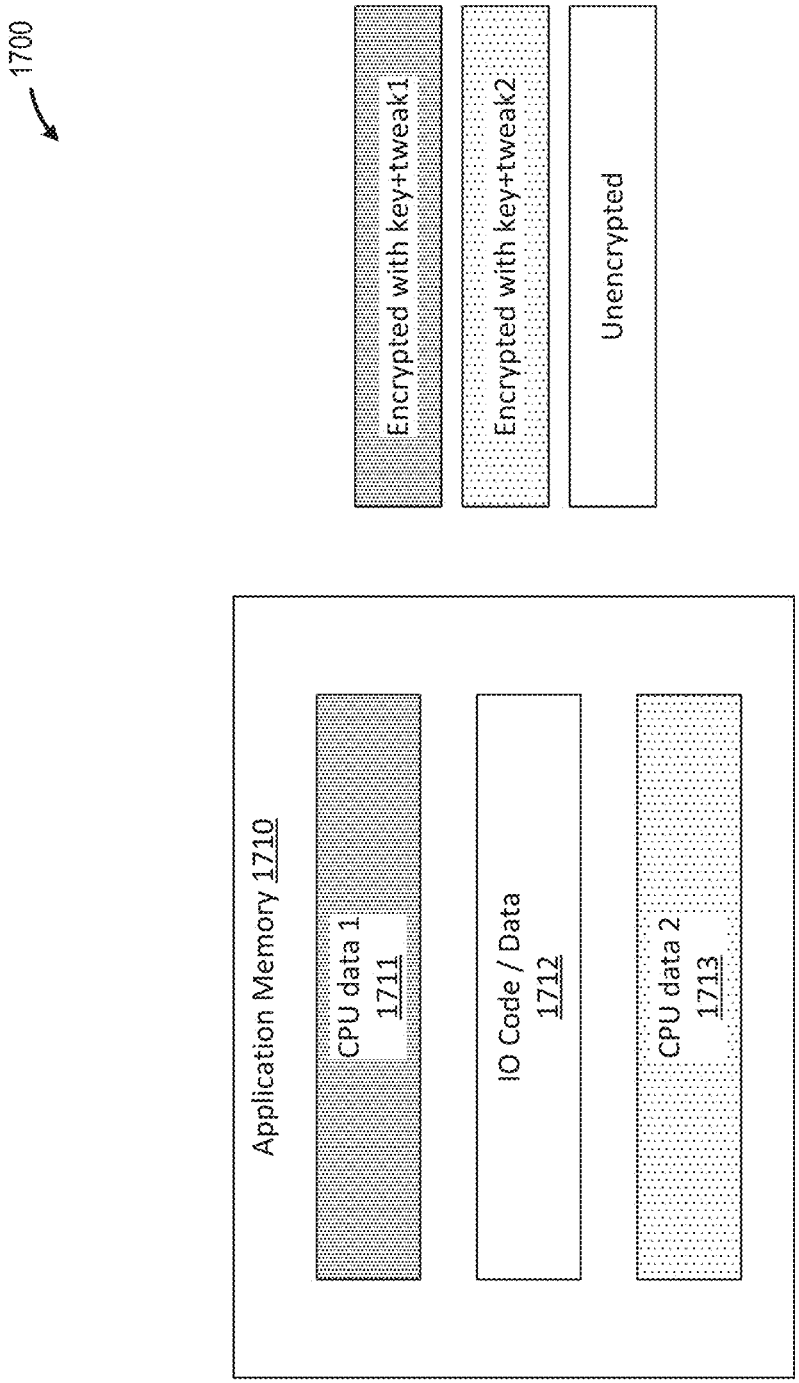
FIG. 17 illustrates a simplified block diagram of an application and data associated with various XPUs executing aspects of the application according to at least one embodiment.

FIG. 17 illustrates a simplified block diagram 1700 of application memory 1710 and data 1711, 1712, 1713 associated with various XPUs executing aspects of the application. In the example shown, the data 1711, 1713 are associated with a CPU of a host device, while the data 1712 is associated with code or data of an IO device connected to the host device. As shown, the data 1711, 1713 are encrypted when in memory 1710, with each being encrypted with different key/tweak pairs (e.g., with context-specific pointer tweaks/keys) as shown. The encryption may be performed in accordance with cryptographic computing embodiments disclosed herein (e.g., with respect to FIGS. 2A-2B above) and in U.S. Pat. No. 9,436,847 (entitled "Cryptographic pointer address encoding") and/or U.S. Patent Application Publication No. 2020/0125501 (entitled "Pointer Based Data Encryption"). Further, the IO code/data 1712 is unencrypted. The protection offered by the example shown may be referred to as being relatively "coarse-grained" when compared with other embodiments disclosed herein. For example, using an application memory separation as shown in FIG. 17, if a malicious IO device accesses non-IO side memory (e.g., data 1711, 1713 of FIG. 17), the encrypted CPU data/code would lead to reads returning garbage and writes effectively writing garbage (with CPU side reads then leading to garbage).

The example shown in FIG. 17 may allow legacy devices without knowledge of CC semantics to operate in conjunction with a host SoC that implements CC. For instance, the example shown may entail minimal changes to the IO software stack, as CPU side allocations would normally use enlightened glibc with CC wrappers, but for the specific IO programming models mentioned above (e.g., SVM), the IO mem allocators, may use legacy glibc without CC wrappers. This could be achieved using parameterized "knobs" to disable CC protection in the respective libraries for applicable functions e.g., clCreateBuffer. IO side programming models already ensuring page table-based protections to protect IO from non-IO can continue to use unmodified glibc (no CC awareness). Overall, this coarse grained (IO vs. non-IO) protection use case does not require any SoC hardware or IO device changes at all.

This intrinsic cryptography and CC-aware allocation-based IO/non-IO separation would also enable sharing between CPU and IO device buffers on the same page at an object granular level. This would potentially allow for memory overhead and bandwidth savings (e.g., cache line sharing across IO/non-IO objects), and could be increasingly important in fine-granular, scalable Function-As-A Service (FaaS) use models.

Furthermore, with encrypted pointers on the CPU side (and unencrypted on IO side), IO buffer map/unmap processes could be enhanced with deferred input/output translation lookaside buffer (IOTLB)/device TLB (DevTLB), input-output memory management unit (IOMMU) cache invalidation, which typically incurs high performance cost on current platforms. One can re-use those allocations after IO unmapping with encrypted core side pointers and any IO side malicious accesses (e.g., from stale TLB/cache entries) would lead to unsuccessful information leakage/corruption as above. The operating system (OS) can have flexible CC-aware deferred IO invalidation policies, potentially increasing net system performance. The above two are generic use cases enabled through CC extensions on the IO side and along with this example, are applicable to other fine-grained CC IO protections, such as those described further below.

Implementation 2

In progression from Implementation 1 above, CC semantics may be logically extended to protect IO memory as well, which may be particularly important for different IO programming models mentioned above, such as SVM.

Figure 18:
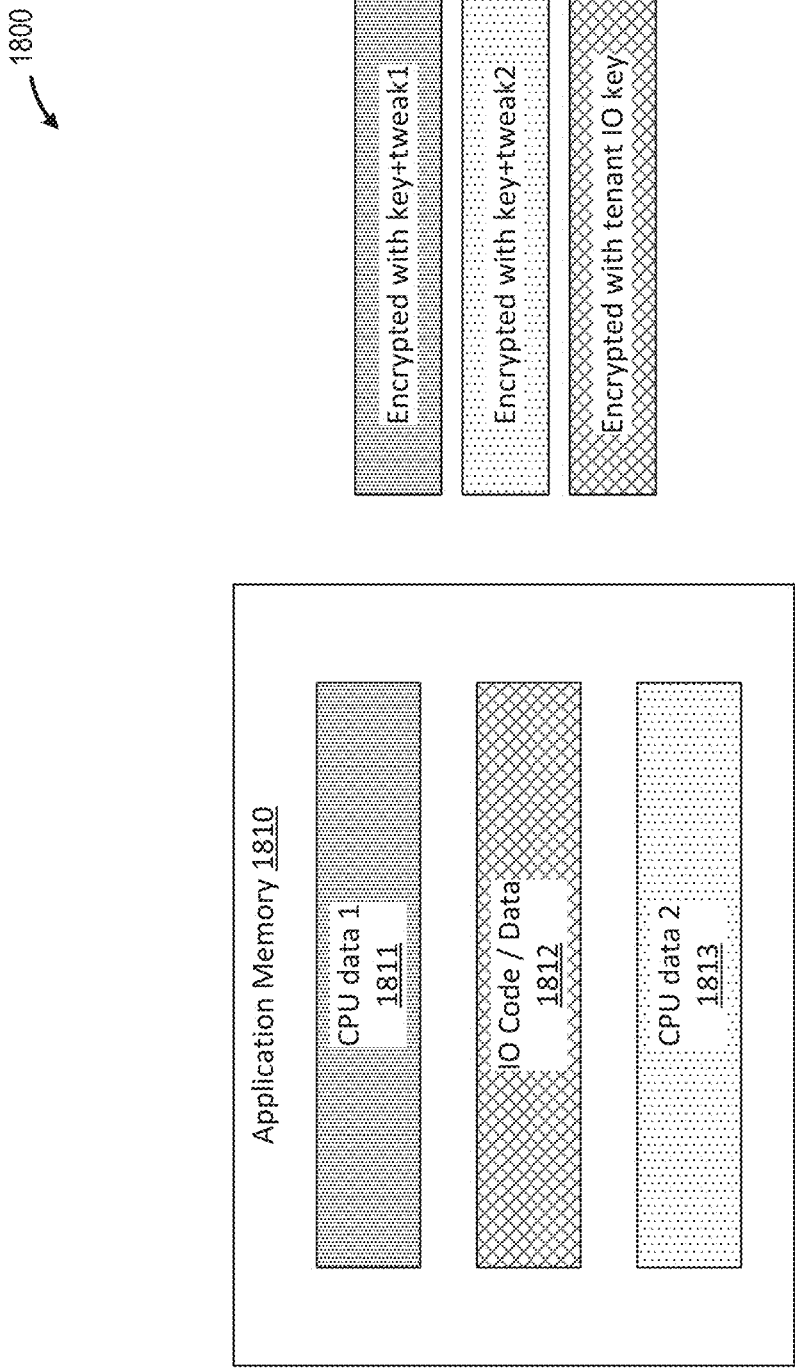
FIG. 18 illustrates another simplified block diagram of an application and data associated with various XPUs executing aspects of the application according to at least one embodiment.

FIG. 18 illustrates another simplified block diagram 1800 of application memory 1810 and data 1811, 1812, 1813 associated with various XPUs executing aspects of the application. In the example shown, the data 1811, 1813 are associated with a CPU of a host device, while the data 2012 is associated with code or data of an IO device connected to the host device. As shown, each of the data 1811, 1813 are encrypted when in memory 1810, with each being encrypted with different key/tweak pairs (e.g., with context-specific pointer tweaks/keys) as shown. The encryption of data 1811, 1813 may be performed in accordance with cryptographic computing embodiments disclosed herein (e.g., with respect to FIGS. 2A-2B above) and in in U.S. Pat. No. 9,436,847 (entitled "Cryptographic pointer address encoding") and/or U.S. Patent Application Publication No. 2020/0125501 (entitled "Pointer Based Data Encryption"). The data 1812 is also encrypted when stored in memory 1810 using a tenant IO key. The tenant IO key may be different from the key(s) used by the CPU via CC enlightened libraries.

These encrypted pointers are sent to the IO device as part of control path operations and the corresponding memory may be initialized accordingly. The actual code/data encryption key (e.g., Gimli/GCM key) can stay the same. If malicious IO access attempts are made (e.g., through forged pointers) outside allowed allocations to CPU code/data structures, either faults would result from IOMMU page walks after pointer decryption or garbage returns/CC integrity failures will result from corresponding reads/writes as described above. In addition, untrustworthy CPU side accesses (e.g., from Jit code, 3rd party plugins, libraries, etc.) to IO code/data would be unsuccessful given the same cryptographic separation semantics as above. Accordingly, IO side protections are provided from malicious/vulnerable CPU side accesses.

Note that in this example, no size/type/version-based tweaks for encryption of these IO pointers (and actual data) are used and thereby there is no protection between different IO allocations in the same address space (this is described further below with respect to Implementation 3). Moreover, if different tenants are sharing the same address space (e.g., browsers, databases, other compartmentalization use cases etc.), inter-tenant isolation can be achieved with tenant specific IO pointer encryption keys.

Figure 19:
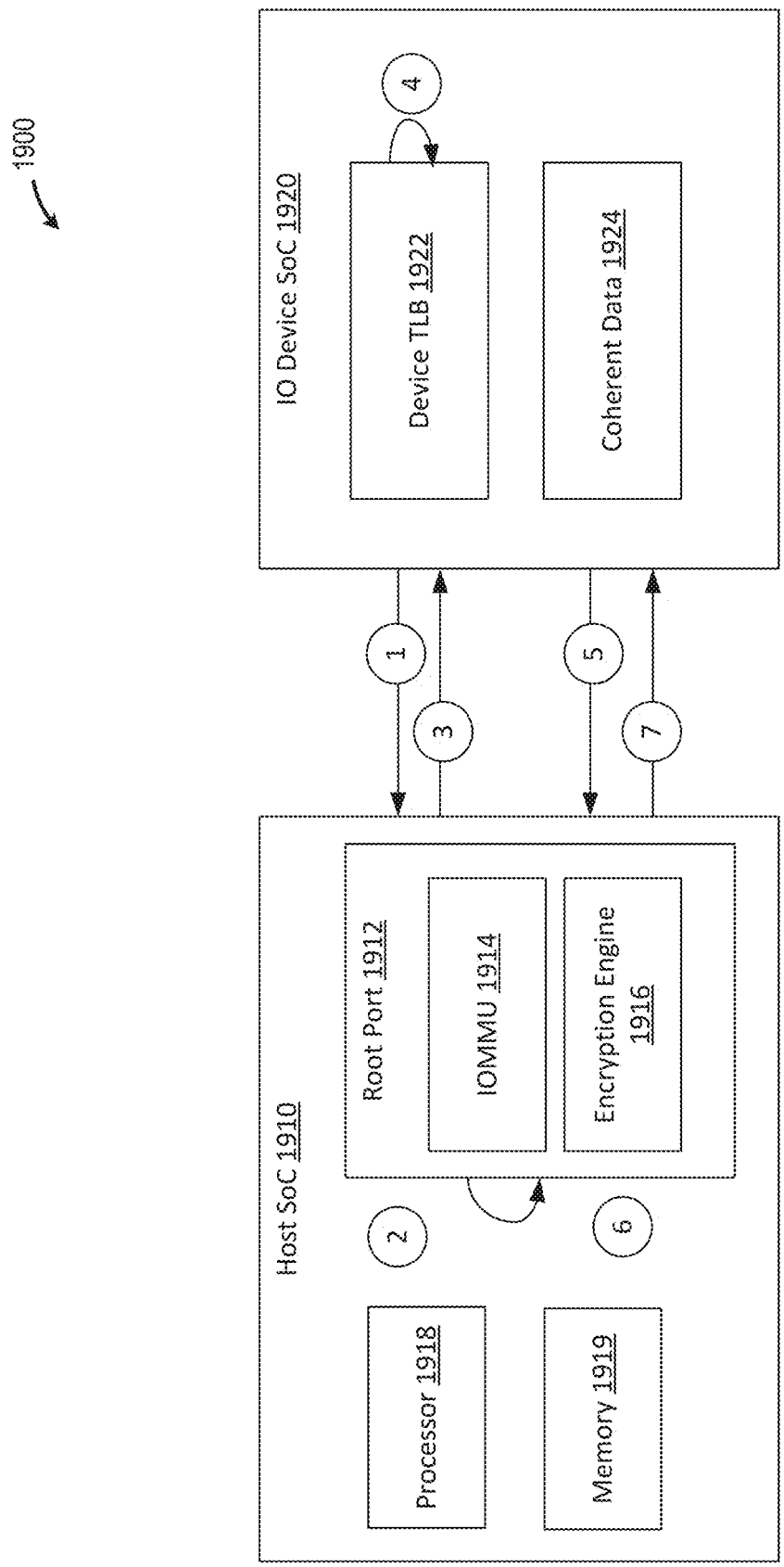
FIG. 19 illustrates a simplified block diagram of an example hardware configuration for providing IO device data encryption according to at least one embodiment.

FIG. 19 illustrates a simplified block diagram of an example hardware configuration 1900 for providing IO device data encryption in accordance with certain embodiments. In the example hardware configuration 1900, a host SoC 1910 is coupled to an IO Device SoC 1920 over an interconnect, such as a PCIe- or CXL-based interconnect. The host SoC 1910 also includes a processor 1918 and memory 1919 (in which CPU data and/or IO data may be stored, e.g., as shown in FIG. 18). Each SoC may include other components than those shown. The host SoC 1910 includes a root port 1912, which may function similar to a root port of a PCIe root complex. The root port 1912 includes an IOMMU 1914, which may include a memory management unit (MMU) that connects a direct memory access (DMA)-capable I/O bus to the memory 1919 of the host SoC 1910, and an encryption engine 1916, which may perform one or more encryption/decryption functions as described herein. For example, the encryption engine 1916 may encrypt/decrypt the encrypted IO code/data 1812 prior to storage/transmission (respectively) on the interconnect link between the host SoC 1910 and IO device SoC 1920. The IO Device SoC 1920 includes a device TLB 1922 and coherent data storage 1924.

The example shown in FIG. 19 also illustrates an example flow of operations for a coarse-grained CC extension to IO side memory accesses, e.g., for the SVM scenario. The example flow shown and described below refers to the CXL.cache protocol (hence using PCIe Address Translation Services (ATS) protocol), but it will be understood that the underlying concepts may be utilized in other interconnect protocols. First, as part of command submission in the IO control paths (e.g., via regular MMIO or specific ENQCMD instructions), an Encrypted Virtual Address (EVA) is sent to the IO device SoC 1920. The IO Device SoC 1920 sends back the same EVA it received as part of data path DMA operations.

At (1) in FIG. 19, the IO device SoC 1920 sends a translation request including the EVA via the PCIe ATS protocol to the root port 1912 of the host SoC 1910. The root port 1912 then at (2) decrypts the EVA to a GVA using the encryption engine 1916 (e.g., via a block cipher encryption/decryption scheme, such as the K-Cipher as disclosed in U.S. Patent Application Publication No. 2020/0145187 (entitled "Bit-Length Parameterizable Cipher") or another 32-bit lightweight block cipher). The root port 1912 then locates the GVA in the IOMMU 1914. In the case of a single IO pointer encryption key, the key may be securely generated on the CPU side and programmed on the IO side through memory mapped IO (MMIO) via new base address register (BAR) or even existing VT-d BAR (Virtualization Technology for Directed I/O). For multiple IO keys, e.g., per tenant or context keys, utilizing the existing device to context VT-d mapping, the IO key can be stored in a PASID (Process Address Space ID) table entry or referenced via a pointer in that entry (e.g., 1 per Domain ID). Before looking up IA page tables, a key may be obtained via the methods above and the pointer may be decrypted. A K-cipher-based pipe can be in the integrating IP as well (e.g., HIOP (host I/O processor)) and separate hardware microarchitecture may be are kept to store keys referenced by Requester ID (RID), PASID, exposed in dedicated BAR. For PCIe ATS, as part of the translation completion, the device may be extended to store the EVA+returned HPA in the Device TLB 1922 and the PCIe protocol may be extended on a translated path to send the EVA as part of same TLP payload using new or existing prefix bits to signify a valid EVA in the payload. This is because EVA is required for actual data encryption/decryption on the host side. Other VT-d extensions like storing EVAs in structures referenced from PASID table entries for pending translated (and thereby completed translations) requests can be done (indexed by GVA) and retrieved in translated path.

Next, the host physical address (HPA) is obtained on the host side, and at (3), the HPA is sent to the IO device SoC 1920. For example, in the DMA path, either untranslated (after EVA decryption) or translated (in case of PCIe ATS), the HPA may be obtained/checked normally via IOTLB access/page walks. At (4), the IO device SoC 1920 sends a read or write request using the obtained HPA. In response, the host SoC 1910 decrypts data stored in host memory via the encryption engine 1916 (e.g., via a block cipher, e.g., a 64-bit block cipher such as PRINCE, Galois/Counter Mode (GCM), or Gimli, or a bit-length parameterizable cipher such as the K-cipher), and transmits at (7) the decrypted data to the IO device SoC 1920. For writes, the EVA may be stored in the IO input buffer entries and the data may be encrypted via the encryption engine 1916 inline in IO path. For reads, the EVA may be additionally stored in an existing allocated completion buffer entry (with a unique tag carried through), which could be used in data decryption for completions. The same data encryption/decryption pipe may be shared on the read/write paths. The corresponding key can be shared with IO subsystem via secure MMIO.

In some embodiments, the encryption engine 1916 may perform an integrity check on the decrypted data prior to transmission to the IO device SoC 1920. For example, a message authentication code (MAC) or hash may be stored along with the encrypted data in memory. If the encrypted data is changed (e.g., by an adversary), the MAC will no longer match in an integrity check (e.g., via deterministic detection).

In the described embodiment, the IO device always receives/transmits unencrypted data over the interconnect, keeping device changes minimal (with changes only being made to EVA for PCIe ATS operations). Accessing memory attached to devices through the above path via peer-to-peer MMIO would work just as is, with encryption/decryption being performed on the DMA originating IO stack. The generic, scalable memory boundary extension to support any device attached system memory (e.g., CXL.mem protocol) without requiring SoC changes on every IO hardware stack.

Figure 20:
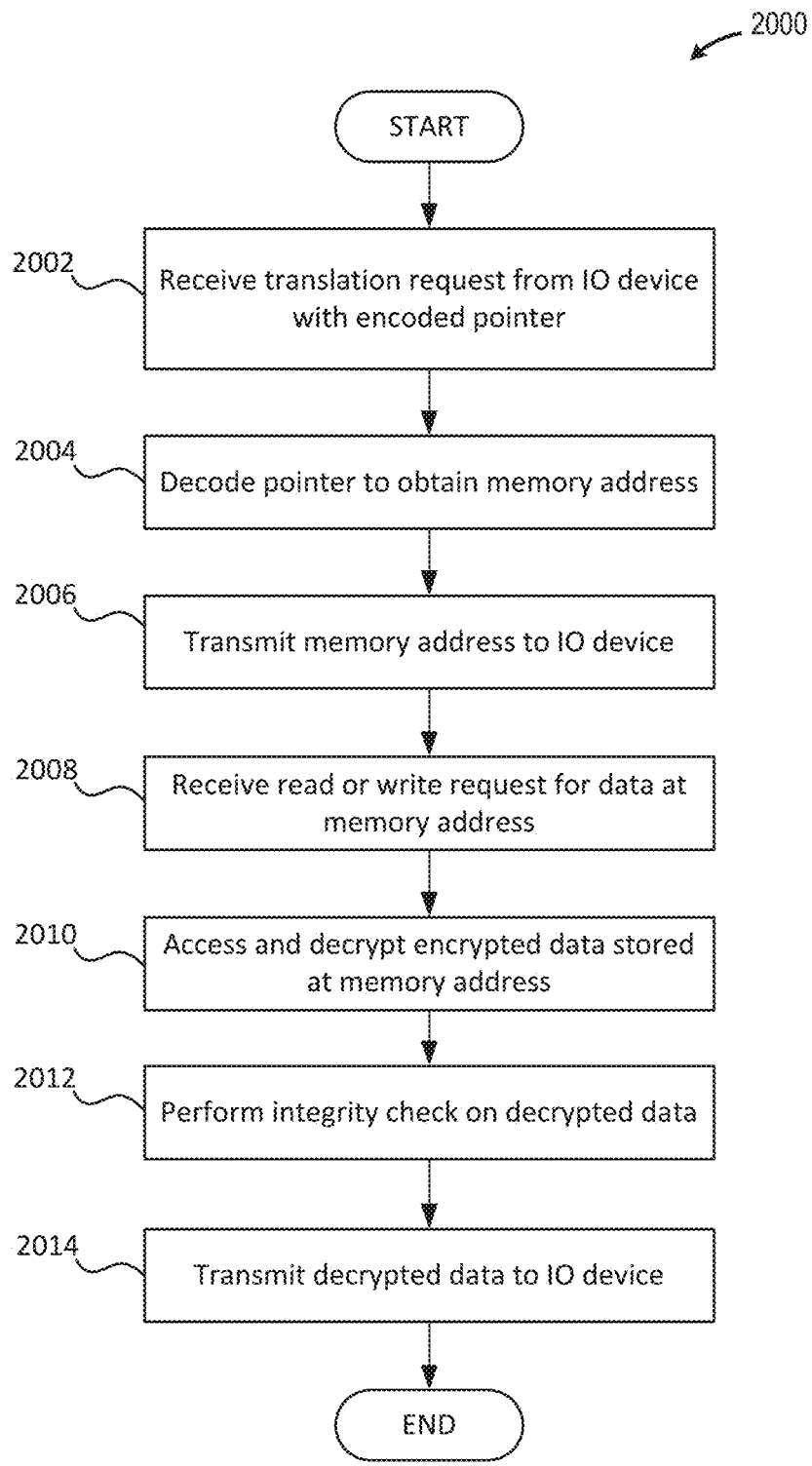
FIG. 20 illustrates a flow diagram of an example process for extending cryptographic computing to IO devices on an interconnect according to at least one embodiment.

FIG. 20 illustrates a flow diagram of an example process 2000 for extending cryptographic computing to IO devices on an interconnect. The example process may be implemented in software, firmware, hardware, or a combination thereof. For example, in some embodiments, operations in the example process shown in FIG. 20 may be performed by circuitry of a host device (e.g., circuitry in the host SoC 1910 of FIG. 19). In some embodiments, a computer-readable medium may be encoded with instructions that implement one or more of the operations in the example process below. The example process may include additional or different operations, and the operations may be performed in the order shown or in another order. In some cases, one or more of the operations shown in FIG. 20 are implemented as processes that include multiple operations, sub-processes, or other types of routines. In some cases, operations can be combined, performed in another order, performed in parallel, iterated, or otherwise repeated or performed another manner. It will be understood that some aspects of the process 2000 may be combined with aspects of the process 2300 described below, in some embodiments.

At 2002, the host device receives a translation request from an IO device over an interconnect (e.g., a PCIe- or CXL-based interconnect), where the translation request includes an encoded pointer. The encoded pointer may be an encrypted virtual address (EVA) as described herein. The translation request may be an address translation request of an interconnect protocol, such as PCIe ATS as described above. At 2004, the encoded pointer is decoded to obtain a memory address. The obtained memory address may be a host physical address (HPA). The HPA may be obtained as described above, e.g., via an IOMMU (e.g., IOMMU 1914 of FIG. 19). At 2006, the memory address (e.g., HPA) is transmitted to the IO device over the interconnect. At 2008, a read or write request is received for data at the memory address, and at 2010, the host device accesses and decrypts encrypted data stored at the memory address. The decryption may be based on a block cipher (e.g., a 64-bit block cipher such as PRINCE, Galois/Counter Mode (GCM), or Gimli, or a bit-length parameterizable cipher such as the K-cipher). At 2012, the host device performs an integrity check on the decrypted data, and at 2014 transmits the decrypted data to the IO device over the interconnect.

Implementation 3

In further progression from Implementation 2 above, the scope of Implementation 3 enforces intra-IO object memory access control with tweaks based on a size field, type field, version field, or another field in the pointer on corresponding buffer allocations. The corresponding IO allocation stack is enlightened with this tweak information, on top of tenant specific IO allocation keys as described within Implementation 2. As a result, memory safety issues like buffer overflow, dangling pointers/uses after free (UAFs) etc. within the IO code/kernels too (along with CPU side) are detected/prevented from causing exploits. If IO memory is allocated out of socket to attached DRAM, the same flow through enhanced SoC/IOMMU as described in Implementation 2 may also apply to Implementation 3.

Figure 21:
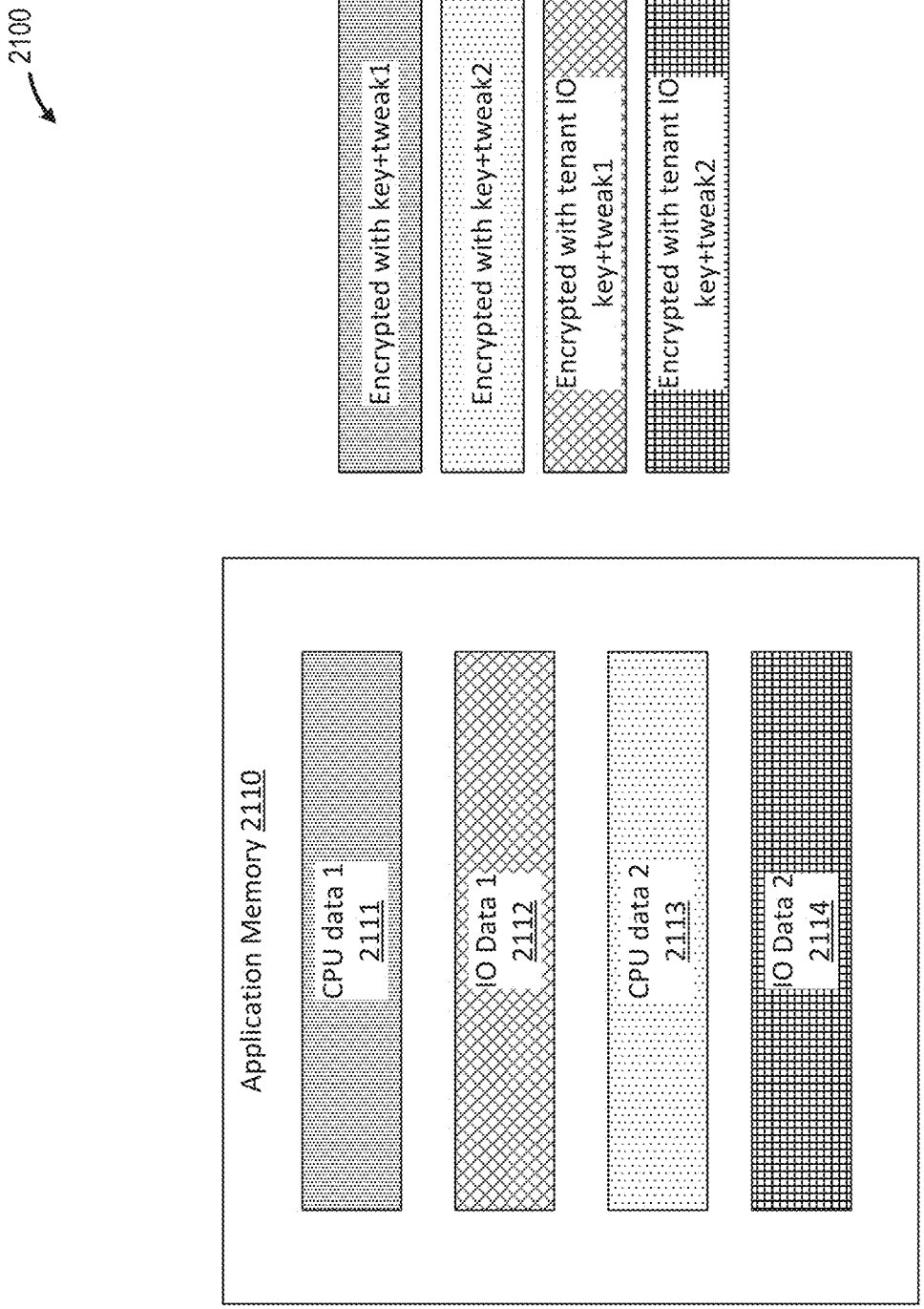
FIG. 21 illustrates yet another simplified block diagram of an application and data associated with various XPUs executing aspects of the application according to at least one embodiment.

FIG. 21 illustrates yet another simplified block diagram 2100 of application memory 2110 and data 2111, 2112, 2113, 2114 associated with various XPUs executing aspects of the application. In the example shown, the data 2111, 2113 are associated with a CPU of a host device, while the data 2112, 2114 are associated with code or data of an IO device connected to the host device. As shown, each of the data 2111, 2113 are encrypted when in memory 2110, with each being encrypted with different key/tweak pairs (e.g., with context-specific pointer tweaks/keys) as shown. The encryption of data 2111, 2113 may be performed in accordance with cryptographic computing embodiments disclosed herein (e.g., with respect to FIGS. 2A-2B above) and in U.S. Pat. No. 9,436,847 (entitled "Cryptographic pointer address encoding") and/or U.S. Patent Application Publication No. 2020/0125501 (entitled "Pointer Based Data Encryption"). The data 2112, 2114 are also encrypted when stored in memory 2110 using respective tenant IO key/tweak pairs. The tenant IO keys may be different from the key(s) used by the CPU via CC enlightened libraries.

Figure 22:
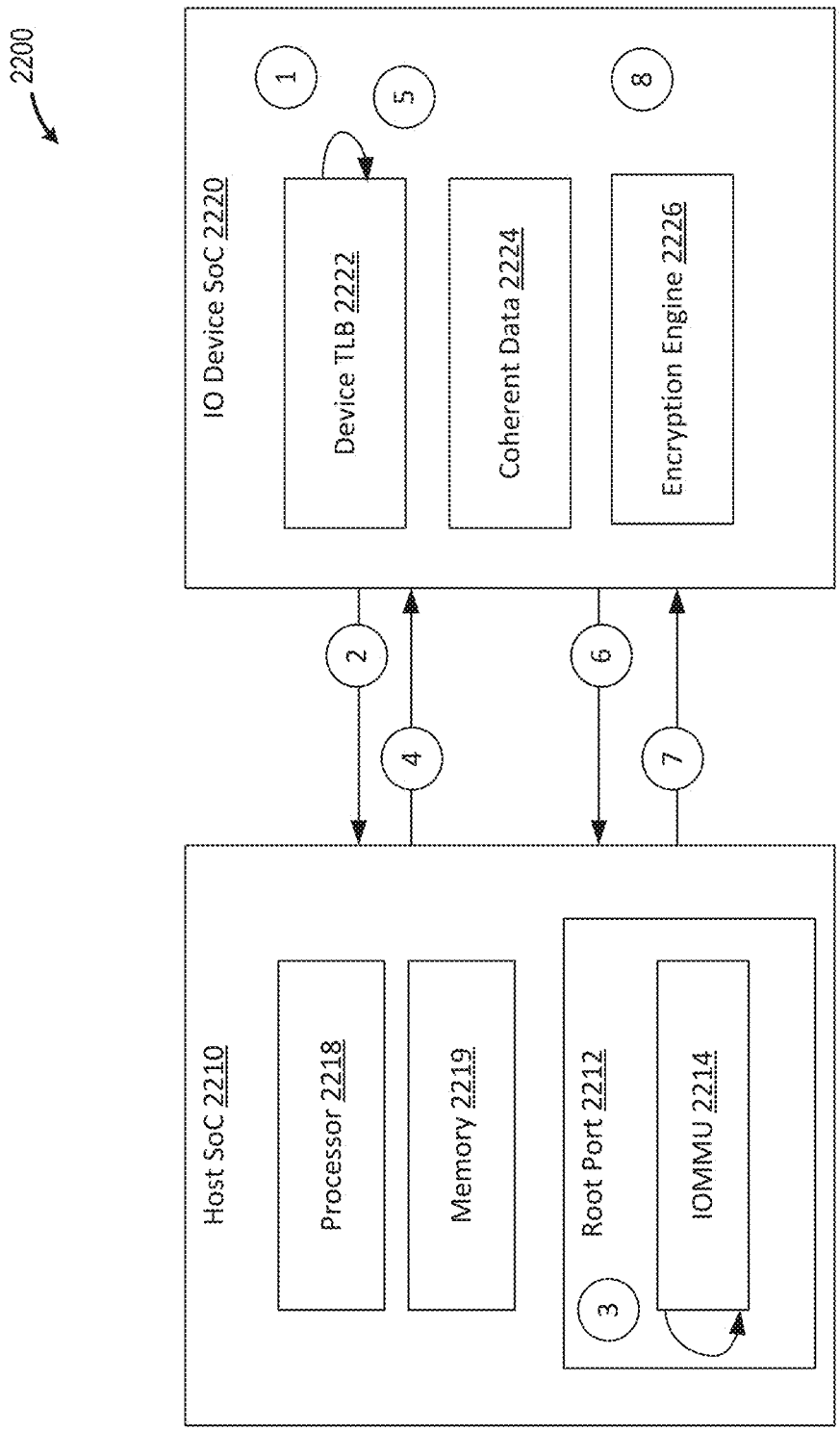
FIG. 22 illustrates a simplified block diagram of another example hardware configuration for providing IO device data encryption according to at least one embodiment.

FIG. 22 illustrates a simplified block diagram of another example hardware configuration 2200 for providing IO device data encryption in accordance with certain embodiments. In the example hardware configuration 2200, a host SoC 2210 is coupled to an IO Device SoC 2220 over an interconnect, such as a PCIe- or CXL-based interconnect. The host SoC 2210 also includes a processor 2218 and memory 2219 (in which CPU data and/or IO data may be stored, e.g., as shown in FIG. 21). Each SoC may include other components than those shown. The host SoC 2210 includes a root port 2212, which may function similar to a root port of a PCIe root complex. The root port 2212 includes an IOMMU 2214, which may include a memory management unit (MMU) that connects a direct memory access (DMA)-capable I/O bus to the memory 2219 of the host SoC 1910. Here, the IO device SoC 2220 includes an encryption engine 2216, which may perform one or more encryption/decryption functions as described herein. For example, the encryption engine 2216 may encrypt/decrypt the encrypted IO code/data (e.g., 2112, 2114) prior to transmission on the interconnect to the host SoC 2210. The IO Device SoC 1920 also includes a device TLB 2222 and coherent data storage 2224.

In comparison with Implementation 2, the encryption engine described above located on the SoC IO subsystem is absorbed within the IO device/accelerator. The most generic case of devices getting back HPA after PCIe ATS protocol and using that to access any system memory is shown in the above Fig. This device encompassed CC H/W enlightenments prevents the need of supporting hardware changes on every IO subsystem stack in the SoC (ideally no SoC changes). Here IO S/W stack sends Encrypted Virtual Address (EVA) to the device in the control path. The specific IO pointer encryption key/s are shared with the device via PCIe Secure Protocol & Data Model (SPDM) flows or via normal MMIO (links protected using PCIe/CXL IDE link encryption) in the command submission control path. For multiple keys, the control path host/guest S/W and device needs to follow some protocol to synchronize (e.g., share/notify key change for tenant change in submission path). This could be done via new messages in the Device Interface Management Protocol (DIMP), which is being standardized as part of trusted device requirements.

At (1) in FIG. 22, the IO device SoC 2220 decrypts an EVA to obtain a GVA, and may also store the original EVA tweak (e.g., a portion of the EVA, such as upper bits of the EVA, including one or more of a size field, version field, type field, etc.) in an entry of the Device TLB 2222. At (2), the IO device SoC 2220 sends a translation request with the GVA to the host SoC 2210. The host SoC 2210 obtains a HPA after translation through IOMMU 2214 in the root port 2212 (or via a device page walker in some instances) and sends the HPA back to the IO device SoC 2220 at (4). At (5), the IO device SoC 2220 stores the HPA, and at (6) the IO device SoC 2220 sends a read/write request to the host SoC 2210 using the HPA to access data in the memory 2219 (which may be in the host SoC 2210 as shown or coupled to the host SoC 2210 in another manner, e.g., through a device attached to the host SoC 2210, e.g., using a CXL.mem protocol).

For writes, the IO device SoC 2220 encrypts the data to be written using the encryption engine 2226. The encryption engine 2226 may encrypt the data with an EVA-based counter stream. For reads, the IO device SoC 2220 is responsible for IO data decryption (in contrast with Implementation 2 above). A key for encrypting/decrypting the IO data (e.g., a 64-bit cipher such as PRINCE, Galois/Counter Mode (GCM), or Gimli, or a bit-length parameterizable cipher such as the K-cipher) can also be shared with IO device SoC 2220 via a secure channel established, e.g., via PCIe/MCTP SPDM (Management Component Transport Protocol, Security Protocol and Data Model, respectively) 1.1 protocols. Thus, all CC cryptographic operations may be self-contained inside the IO device and will not depend on specific host SoC capabilities. From a device hardware architecture perspective, the IDE (Integrity and Data Encryption) PCIe/CXL link encryption engine 2226 could be extended to support the data path encryption/decryption in the IO device. Through this scalable extension, any system memory (e.g., on a platform, and may be accessed by CXL.mem protocols) can be supported with CC semantics for IO.

In some embodiments, aspects of Implementation 2 and Implementation 3 may be combined in a system. For instance, some IO devices might not have the configurations described with respect to Implementation 3 (e.g., an on-board encryption engine such as encryption engine 2226) and may utilize a host SoC encryption engine for CC operations, e.g., as described above with respect to Implementation 2. In such instances, VT-d tables may be extended to indicate requirements of system support for CC during page walks (in which a virtual address may be treated as an EVA). In some cases, the IO device can notify the host SoC of its CC capabilities/requirements in encoded TLP prefix bits (e.g., as described above with respect to Implementation 2). Other model-specific system level solutions can be adopted as well, such as the IOMMU having a microarchitecture table with a list of incoming devices/BDFs (Bus: Device.Function) where no need of additional CC operations as applicable.

Finally, for local memory attached to IO devices (e.g., not exposed in the system address space) and managed by the host SoC/device driver, analogous device side changes can be implemented to support fine-grained CC protections for all local allocations in that memory.

Figure 23:
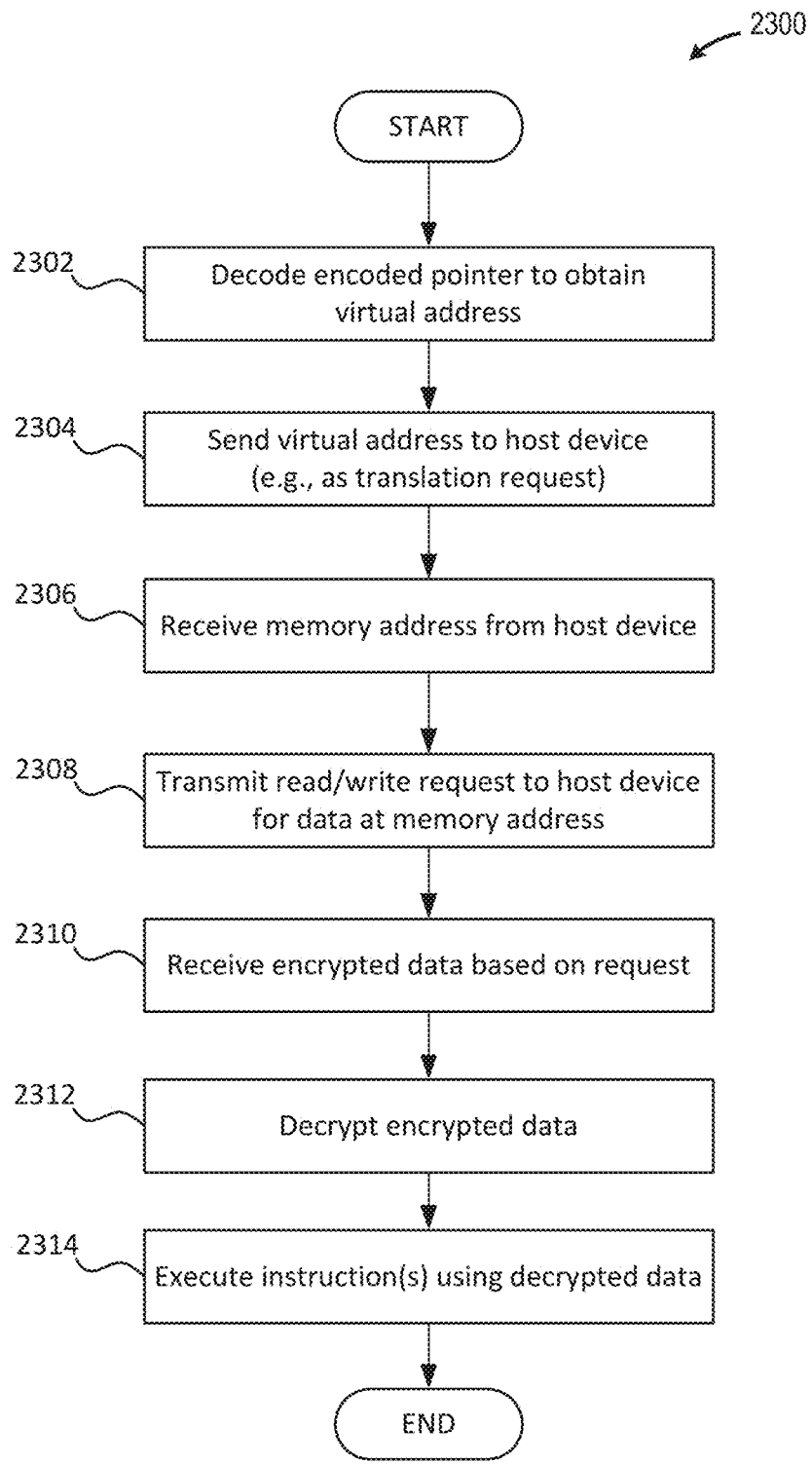
FIG. 23 illustrates a flow diagram of another example process for extending cryptographic computing to IO devices on an interconnect according to at least one embodiment.

FIG. 23 illustrates a flow diagram of another example process 2300 for extending cryptographic computing to IO devices on an interconnect. The example process may be implemented in software, firmware, hardware, or a combination thereof. For example, in some embodiments, operations in the example process shown in FIG. 23 may be performed by circuitry of an IO device (e.g., IO device SoC 2220 of FIG. 22). In some embodiments, a computer-readable medium may be encoded with instructions that implement one or more of the operations in the example process below. The example process may include additional or different operations, and the operations may be performed in the order shown or in another order. In some cases, one or more of the operations shown in FIG. 23 are implemented as processes that include multiple operations, sub-processes, or other types of routines. In some cases, operations can be combined, performed in another order, performed in parallel, iterated, or otherwise repeated or performed another manner. It will be understood that some aspects of the process 2300 may be combined with aspects of the process 2000 described above, in some embodiments.

At 2302, an encoded pointer (e.g., an EVA) is decoded to obtain a virtual address (e.g., a GVA). At 2304, the GVA is sent to a host device over an interconnect (e.g., a PCIe- or CXL-based interconnect). In some embodiments, the GVA may be sent as part of a translation request of an interconnect protocol, e.g., PCIe ATS. At 2306, the IO device receives a memory address (e.g., HPA) in return. At 2308, the IO device sends a read or write request to the host device for data at the memory address, and at 2310, the IO device receives encrypted data back from the host device based on the read/write request. At 2312, the IO device decrypts the data (e.g., using a 64-bit block cipher such as PRINCE, Galois/Counter Mode (GCM), or Gimli, or a bit-length parameterizable cipher such as the K-cipher), and at 2314, uses the decrypted data in execution of an instruction.

Figure 24:
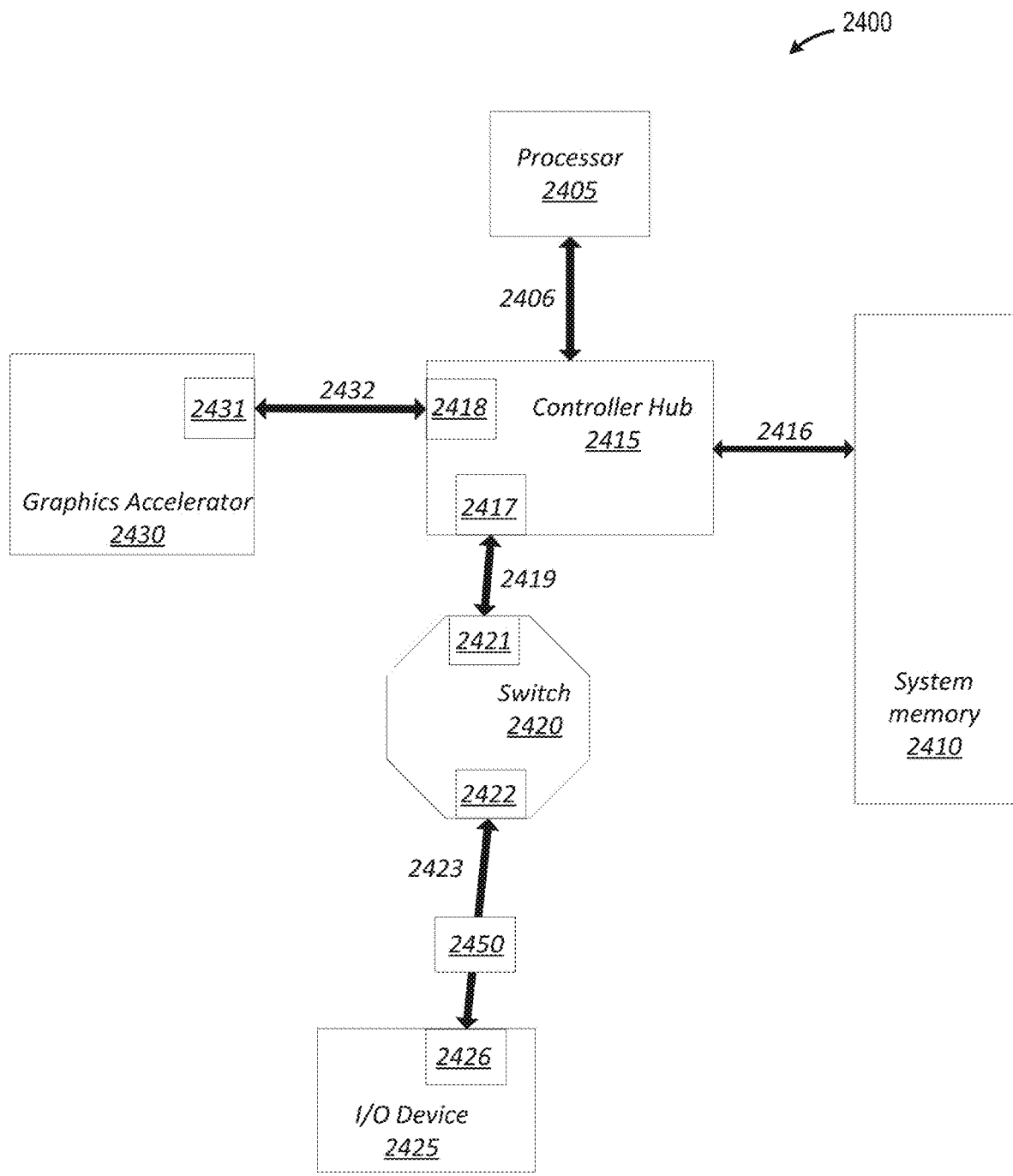
FIG. 24 illustrates an embodiment of a computing system including an interconnect architecture according to at least one embodiment.

FIGS. 24-27 illustrate example interconnect embodiments in which aspects of the present disclosure may be incorporated. Referring to FIG. 24, an embodiment of a fabric composed of point-to-point Links that interconnect a set of components is illustrated. System 2400 includes processor 2405 and system memory 2410 coupled to controller hub 2415. Processor 2405 includes any processing element, such as a microprocessor, a host processor, an embedded processor, a co-processor, or other processor. Processor 2405 is coupled to controller hub 2415 through front-side bus (FSB) 2406. In one embodiment, FSB 2406 is a serial point-to-point interconnect as described below. In another embodiment, FSB 2406 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 2410 includes any memory device, such as random access memory (RAM), non-volatile (NV) memory, or other memory accessible by devices in system 2400. System memory 2410 is coupled to controller hub 2415 through memory interface 2416. Examples of a memory interface include a double-data rate (DDR) memory interface, a dual-channel DDR memory interface, and a dynamic RAM (DRAM) memory interface.

In one embodiment, controller hub 2415 is a root hub, root complex, or root controller in a Peripheral Component Interconnect Express (PCIe or PCIE) interconnection hierarchy. Examples of controller hub 2415 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 2405, while controller 2415 is to communicate with I/O devices, in a similar manner as described below. In some embodiments, peer-to-peer routing is optionally supported through controller hub 2415.

Here, controller hub 2415 is coupled to switch/bridge 2420 through serial link 2419. Input/output modules 2417 and 2421, which may also be referred to as interfaces/ports 2417 and 2421, include/implement a layered protocol stack to provide communication between controller hub 2415 and switch 2420. In one embodiment, multiple devices are capable of being coupled to switch 2420.

Switch/bridge 2420 routes packets/messages from device 2425 upstream, e.g. up a hierarchy towards a root complex, to controller hub 2415 and downstream, e.g. down a hierarchy away from a root controller, from processor 2405 or system memory 2410 to device 2425. Switch 2420, in one embodiment, is referred to as a logical assembly of multiple virtual PCI-to-PCI bridge devices. Device 2425 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 2425 may include a PCIe to PCI/PCI-X bridge to support legacy or other version PCI devices. Endpoint devices in PCIe are often classified as legacy, PCIe, or root complex integrated endpoints.

Graphics accelerator 2430 is also coupled to controller hub 2415 through serial link 2432. In one embodiment, graphics accelerator 2430 is coupled to an MCH, which is coupled to an ICH. Switch 2420, and accordingly I/O device 2425, is then coupled to the ICH. I/O modules 2431 and 2418 are also to implement a layered protocol stack to communicate between graphics accelerator 2430 and controller hub 2415. Similar to the MCH discussion above, a graphics controller or the graphics accelerator 2430 itself may be integrated in processor 2405. Further, one or more links (e.g., 2423) of the system can include one or more extension devices (e.g., 2450), such as retimers, repeaters, etc.

Figure 25:
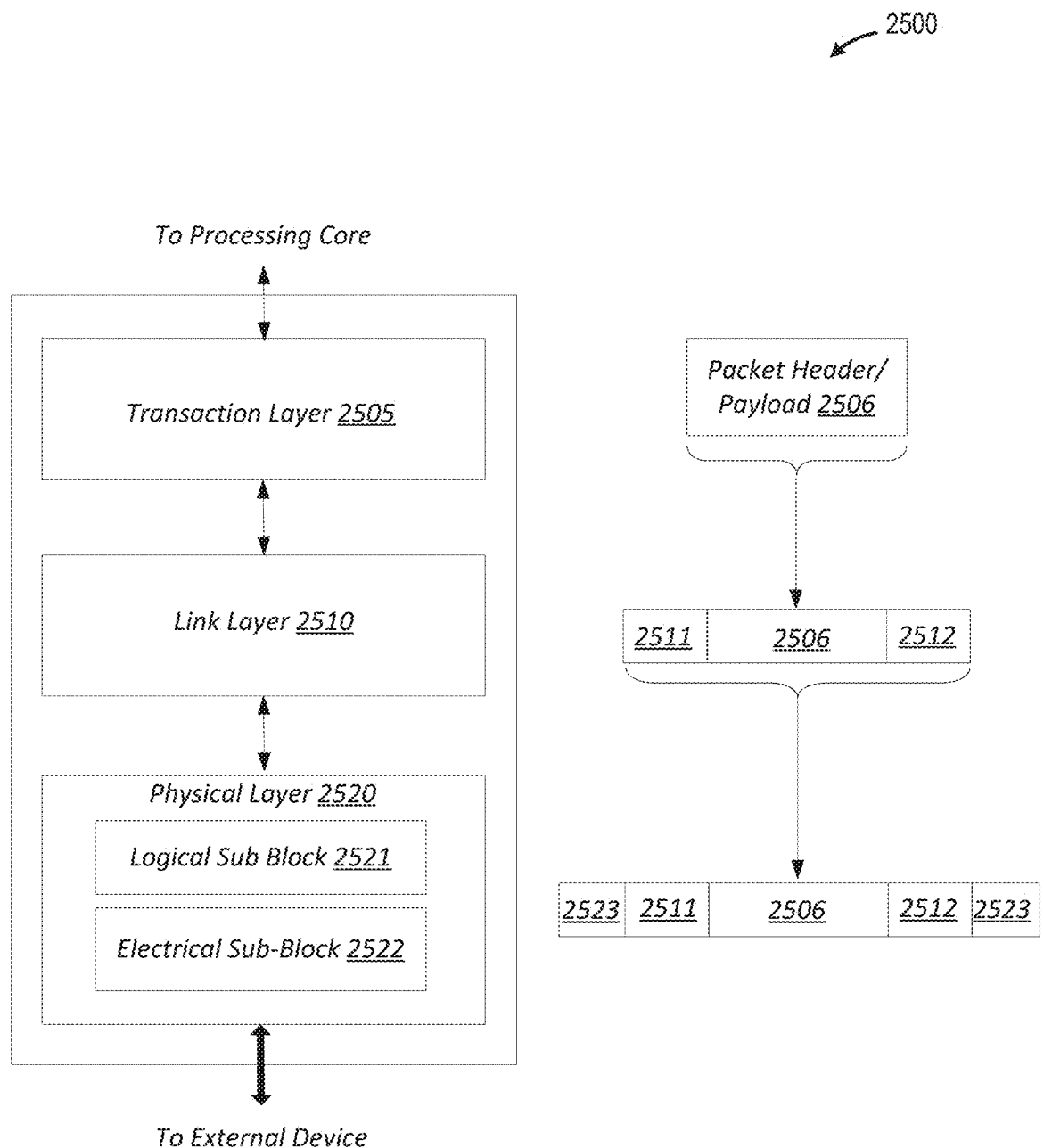
FIG. 25 illustrates an embodiment of an interconnect architecture including a layered stack according to at least one embodiment.

Turning to FIG. 25 an embodiment of a layered protocol stack is illustrated. Layered protocol stack 2500 includes any form of a layered communication stack, such as a Quick Path Interconnect (QPI) stack, a PCIe stack, a next generation high performance computing interconnect stack, or other layered stack. Although the discussion below relates to a PCIe stack, the same concepts may be applied to other interconnect stacks. In one embodiment, protocol stack 2500 is a PCIe protocol stack including transaction layer 2505, link layer 2510, and physical layer 2520. An interface, such as interfaces 2417, 2418, 2421, 2422, 2426, and 2431 in FIG. 24, may be represented as communication protocol stack 2500. Representation as a communication protocol stack may also be referred to as a module or interface implementing/including a protocol stack.

PCI Express uses packets to communicate information between components. Packets are formed in the Transaction Layer 2505 and Data Link Layer 2510 to carry the information from the transmitting component to the receiving component. As the transmitted packets flow through the other layers, they are extended with additional information necessary to handle packets at those layers. At the receiving side the reverse process occurs and packets get transformed from their Physical Layer 2520 representation to the Data Link Layer 2510 representation and finally (for Transaction Layer Packets) to the form that can be processed by the Transaction Layer 2505 of the receiving device.

In one embodiment, transaction layer 2505 is to provide an interface between a device's processing core and the interconnect architecture, such as data link layer 2510 and physical layer 2520. In this regard, a primary responsibility of the transaction layer 2505 is the assembly and disassembly of packets (e.g., transaction layer packets, or TLPs). The translation layer 2505 typically manages credit-base flow control for TLPs. PCIe implements split transactions, e.g., transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 2505. An external device at the opposite end of the link, such as controller hub 2415 in FIG. 24, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 2505 assembles packet header/payload 2506. Format for current packet headers/payloads may be found in the PCIe specification at the PCIe specification website.

Link layer 2510, also referred to as data link layer 2510, acts as an intermediate stage between transaction layer 2505 and the physical layer 2520. In one embodiment, a responsibility of the data link layer 2510 is providing a reliable mechanism for exchanging Transaction Layer Packets (TLPs) between two components a link. One side of the Data Link Layer 2510 accepts TLPs assembled by the Transaction Layer 2505, applies packet sequence identifier 2511, e.g., an identification number or packet number, calculates and applies an error detection code, e.g., CRC 2512, and submits the modified TLPs to the Physical Layer 2520 for transmission across a physical to an external device.

In one embodiment, physical layer 2520 includes logical sub block 2521 and electrical sub-block 2522 to physically transmit a packet to an external device. Here, logical sub-block 2521 is responsible for the "digital" functions of Physical Layer 2520. In this regard, the logical sub-block includes a transmit section to prepare outgoing information for transmission by physical sub-block 2522, and a receiver section to identify and prepare received information before passing it to the Link Layer 2510.

Physical block 2522 includes a transmitter and a receiver. The transmitter is supplied by logical sub-block 2521 with symbols, which the transmitter serializes and transmits onto to an external device. The receiver is supplied with serialized symbols from an external device and transforms the received signals into a bit-stream. The bit-stream is de-serialized and supplied to logical sub-block 2521. In one embodiment, an 8b/10b transmission code is employed, where ten-bit symbols are transmitted/received. Here, special symbols are used to frame a packet with frames 2523. In addition, in one example, the receiver also provides a symbol clock recovered from the incoming serial stream.

As stated above, although transaction layer 2505, link layer 2510, and physical layer 2520 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, e.g., a transaction layer; a second layer to sequence packets, e.g. a link layer; and a third layer to transmit the packets, e.g. a physical layer. As a specific example, a common standard interface (CSI) layered protocol is utilized.

A variety of other interconnect architectures and protocols may utilize the concepts discussed herein. In one example, Compute Express Link (CXL) may be used. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples).

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 26:
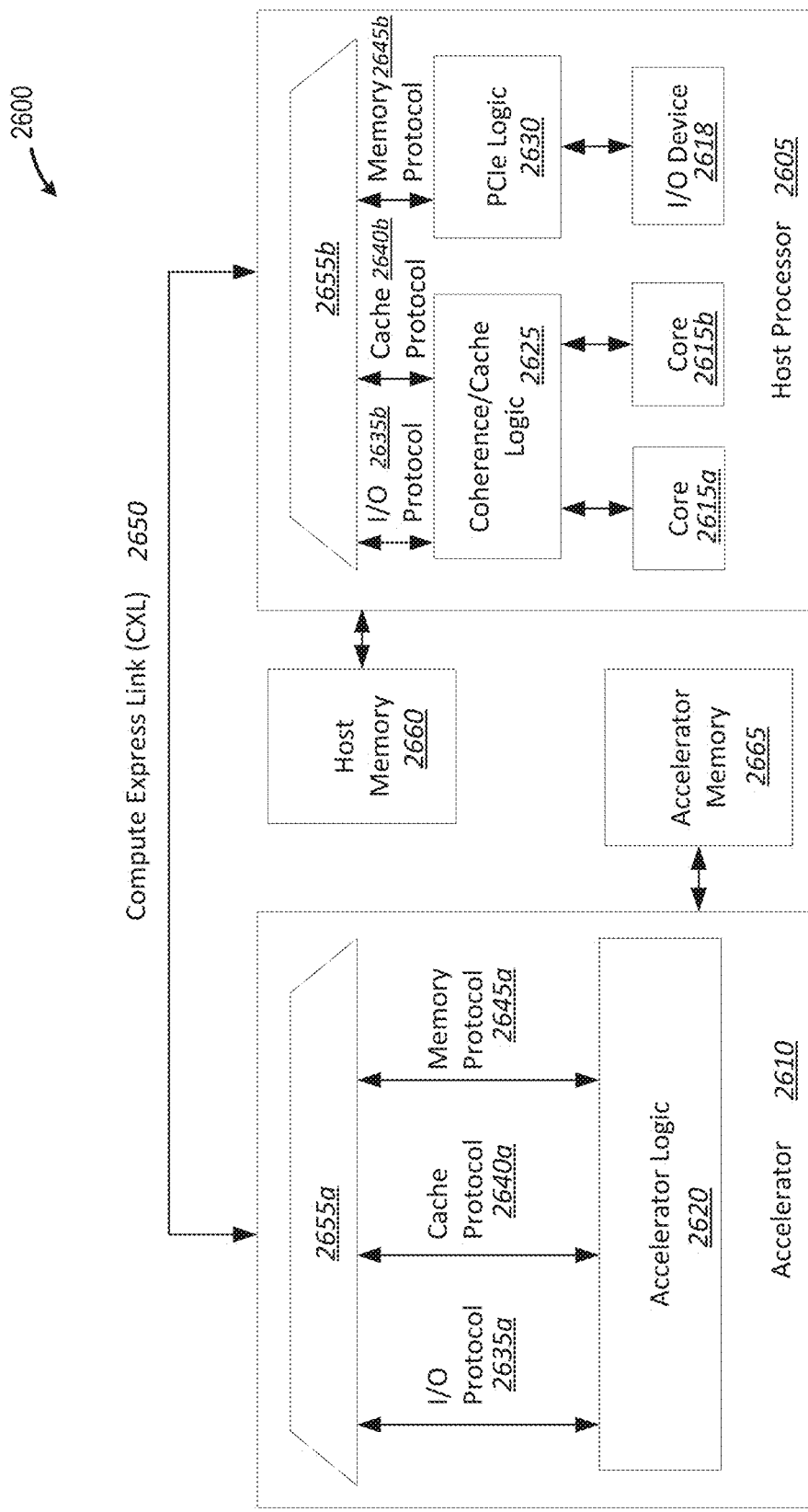
FIG. 26 illustrates a simplified block diagram is shown illustrating an example system utilizing a CXL link according to at least one embodiment.

Turning to FIG. 26, a simplified block diagram 2600 is shown illustrating an example system utilizing a CXL link 2650. For instance, the link 2650 may interconnect a host processor 2605 (e.g., CPU) to an accelerator device 2610. In this example, the host processor 2605 includes one or more processor cores (e.g., 2615a-b) and one or more I/O devices (e.g., 2618). Host memory (e.g., 2660) may be provided with the host processor (e.g., on the same package or die). The accelerator device 2610 may include accelerator logic 2620 and, in some implementations, may include its own memory (e.g., accelerator memory 2665). In this example, the host processor 2605 may include circuitry to implement coherence/cache logic 2625 and interconnect logic (e.g., PCIe logic 2630). CXL multiplexing logic (e.g., 2655a-b) may also be provided to enable multiplexing of CXL protocols (e.g., I/O protocol 2635a-b (e.g., CXL.io), caching protocol 2640a-b (e.g., CXL.cache), and memory access protocol 2645a-b (CXL.mem)), thereby enabling data of any one of the supported protocols (e.g., 2635a-b, 2640a-b, 2645a-b) to be sent, in a multiplexed manner, over the link 2650 between host processor 2605 and accelerator device 2610.

In some implementations, a Flex Bus™ port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 27:
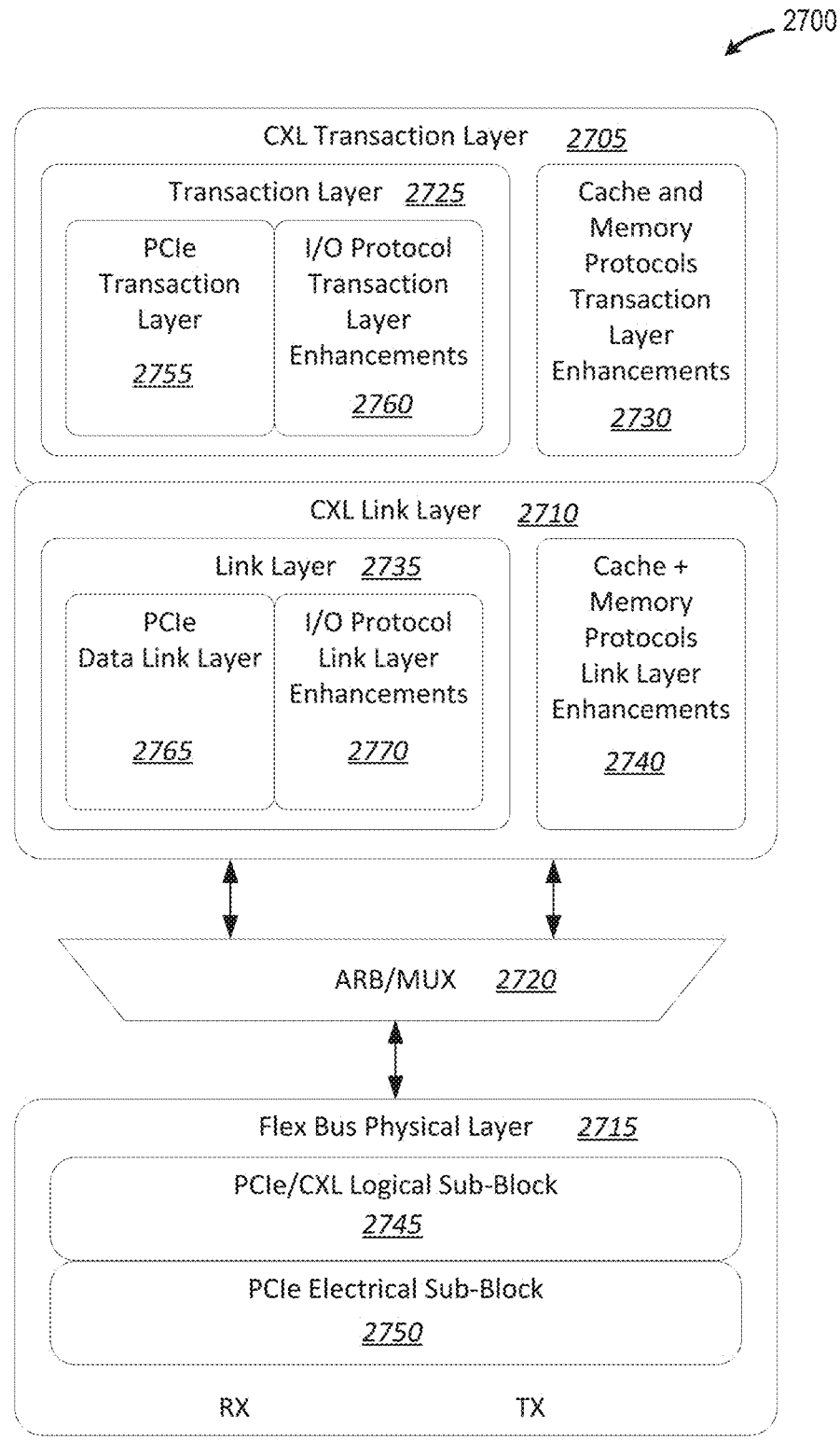
FIG. 27 illustrates a simplified block diagram illustrating an example port architecture utilized to implement CXL links according to at least one embodiment.

FIG. 27 illustrates a simplified block diagram illustrating an example port architecture 2700 (e.g., Flex Bus) utilized to implement CXL links. For instance, Flex Bus architecture may be organized as multiple layers to implement the multiple protocols supported by the port. For instance, the port may include transaction layer logic (e.g., 2705), link layer logic (e.g., 2710), and physical layer logic (e.g., 2715) (e.g., implemented all or in-part in circuitry). For instance, a transaction (or protocol) layer (e.g., 2705) may be subdivided into transaction layer logic 2725 that implements a PCIe transaction layer 2755 and CXL transaction layer enhancements 2760 (for CXL.io) of a base PCIe transaction layer 2755, and logic 2730 to implement cache (e.g., CXL.cache) and memory (e.g., CXL.mem) protocols for a CXL link. Similarly, link layer logic 2735 may be provided to implement a base PCIe data link layer 2765 and a CXL link layer (for CXI.io) (e.g., 2770) representing an enhanced version of the PCIe data link layer 2765. A CXL link layer 2710 may also include cache and memory link layer enhancement logic 2740 (e.g., for CXL.cache and CXL.mem).

Continuing with the example of FIG. 27, a CXL link layer logic 2710 may interface with CXL arbitration/multiplexing (ARB/MUX) logic 2720, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 2715 based on a PCIe physical layer (e.g., PCIe electrical PHY 2750). For instance, a Flex Bus physical layer may be implemented as a converged logical physical layer 2745 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., ×16, ×8, ×4, ×2, ×1, etc.). In PCIe mode, links implemented by the port 2700 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

EXAMPLES

Example CA1 relates to an apparatus that includes: a processor; memory; and a port comprising circuitry to implement one or more layers of an interconnect protocol, wherein the circuitry is to: receive an encoded pointer from an IO device on the interconnect; decode the encoded pointer to obtain a memory address in the memory; access encrypted data associated with the IO device at the memory address; decrypt the encrypted data based on the encoded pointer and a key associated with the IO device; and transmit the decrypted data to the IO device.

Example CA2 includes the subject matter of Example CA1, wherein the circuitry is to decrypt the encrypted data using a block cipher.

Example CA3 includes the subject matter of Example CA2, wherein the block cipher is one or more of a K-cipher, a PRINCE cipher, a Gimli cipher, and a Galois/Counter Mode cipher.

Example CA4 includes the subject matter of any one of Examples CA1-CA3, wherein the circuitry is to decrypt the encrypted data using the key associated with the IO device and a tweak value based on the encoded pointer.

Example CA5 includes the subject matter of Example CA4, wherein the tweak value is a field of the encoded pointer.

Example CA6 includes the subject matter of any one of Examples CA1-CA5, wherein the encoded pointer is an encrypted virtual address (EVA), and the circuitry is further to: decrypt the EVA to obtain a guest virtual address (GVA); obtain a host physical address (HPA) from the GVA; and transmit the HPA to the IO device; and receive a read or write request from the IO device that includes the HPA.

Example CA7 includes the subject matter of any one of Examples CA1-CA6, wherein the circuitry is further to perform an integrity check on the decrypted data.

Example CA8 includes the subject matter of any one of Examples CA1-CA7, wherein the IO device is a first IO device and the circuitry is further to: receive a request to access data from a second IO device on the interconnect, the request comprising an unencoded pointer to a second memory address in the memory; access encrypted data associated with the second IO device at the second memory address based on the request; and transmitting the encrypted data to the second IO device.

Example CA9 includes the subject matter of any one of Examples CA1-CA8, wherein the processor comprises circuitry to: access encrypted data associated with the processor in the memory based on an instruction, the instruction indicating an encoded pointer to a second memory location in the memory; decrypt the encrypted data based on the encoded pointer and a key associated with the processor; and use the decrypted data to execute the instruction.

Example CA10 includes the subject matter of any one of Examples CA1-CA9, wherein the interconnect protocol is one of a Peripheral Component Interconnect Express (PCIe)-based protocol and a Compute Express Link (CXL)-based protocol.

Example CM1 relates to a method that includes: receiving an encoded pointer from an IO device via an interconnect; decoding the encoded pointer to obtain a memory address in the memory; accessing encrypted data associated with the IO device at the memory address; decrypting the encrypted data based on the encoded pointer and a key associated with the IO device; and transmitting the decrypted data to the IO device.

Example CM2 includes the subject matter of Example CM1, wherein decrypting the encrypted data is based on a block cipher.

Example CM3 includes the subject matter of Example CM2, wherein the block cipher is a K-cipher, a PRINCE cipher, a Gimli cipher, and a Galois/Counter Mode cipher.

Example CM4 includes the subject matter of any one of Examples CM1-CM3, wherein decrypting the encrypted data is based on the key associated with the IO device and a tweak value based on the encoded pointer.

Example CM5 includes the subject matter of Example CM4, wherein the tweak value is a field of the encoded pointer.

Example CM6 includes the subject matter of any one of Examples CM1-CM5, wherein the encoded pointer is an encrypted virtual address (EVA), and the method further comprises: decrypting the EVA to obtain a guest virtual address (GVA); obtaining a host physical address (HPA) from the GVA; and transmitting the HPA to the IO device; and receiving a read or write request from the IO device that includes the HPA.

Example CM7 includes the subject matter of any one of Examples CM1-CM6, further comprising performing an integrity check on the decrypted data.

Example CM8 includes the subject matter of any one of Examples CM1-CM7, wherein the IO device is a first IO device and the method further comprises: receiving a request to access data from a second IO device on the interconnect, the request comprising an unencoded pointer to a second memory address in the memory; accessing encrypted data associated with the second IO device at the second memory address based on the request; and transmitting the encrypted data to the second IO device.

Example CM9 includes the subject matter of any one of Examples CM1-CM8, wherein the interconnect protocol is one of a Peripheral Component Interconnect Express (PCIe)-based protocol and a Compute Express Link (CXL)-based protocol.

Example CAA1 relates to an apparatus that includes: a port comprising circuitry to implement one or more layers of an interconnect protocol, wherein the circuitry is to: decode an encoded pointer to obtain a virtual address; obtain a memory address in memory of another device on the interconnect based on the virtual address; transmit a request to the other device to access data at the memory address; receive encrypted data based on the request; decrypt the encrypted data based on a key associated with the IO device; and execute an instruction using the decrypted data.

Example CAA2 includes the subject matter of Example CAA1, wherein the circuitry is to decrypt the encrypted data using a block cipher.

Example CAA3 includes the subject matter of Example CAA2, wherein the block cipher is a K-cipher, a PRINCE cipher, a Gimli cipher, and a Galois/Counter Mode cipher.

Example CAA4 includes the subject matter of any one of Examples CAA1-CAA3, wherein the circuitry is to decrypt the encrypted data using the key associated with the IO device and a tweak value based on the encoded pointer.

Example CAA5 includes the subject matter of Example CAA4 wherein the tweak value is a field of the encoded pointer.

Example CAA6 includes the subject matter of any one of Examples CAA1-CAA5, wherein the encoded pointer is an encrypted virtual address (EVA), and the circuitry is further to decrypt the EVA to obtain the virtual address.

Example CAA7 includes the subject matter of any one of Examples CAA1-CAA6, wherein the virtual address is a guest virtual address (GVA) and the circuitry to is to: transmit the GVA to the other device; receive a host physical address (HPA) based on the GVA; and transmit the HPA in the request to access data.

Example CAA8 includes the subject matter of any one of Examples CAA1-CAA7, wherein the interconnect protocol is one of a Peripheral Component Interconnect Express (PCIe)-based protocol and a Compute Express Link (CXL)-based protocol.

Example CMM1 relates to a method that includes: decoding an encoded pointer to obtain virtual address; obtaining a memory address in memory of another device on the interconnect based on the virtual address; transmitting a request to the other device to access data at the memory address; receiving encrypted data based on the request; decrypting the encrypted data based on a key associated with the IO device; and executing an instruction using the decrypted data.

Example CMM2 includes the subject matter of Example CMM1, wherein decrypting the encrypted data is based on a block cipher.

Example CMM3 includes the subject matter of Example CMM2, wherein the block cipher is a K-cipher, a PRINCE cipher, a Gimli cipher, and a Galois/Counter Mode cipher.

Example CMM4 includes the subject matter of any one of Examples CMM1-CMM3, wherein the circuitry is to decrypt the encrypted data using the key associated with the IO device and a tweak value based on the encoded pointer.

Example CMM5 includes the subject matter of Example CMM4, wherein the tweak value is a field of the encoded pointer.

Example CMM6 includes the subject matter of any one of Examples CMM1-CMM5, wherein the encoded pointer is cryptographically encoded, and the circuitry is further to decrypt at least a portion of the encoded pointer to obtain the memory address.

Example CMM7 includes the subject matter of any one of Examples CMM1-CMM6, wherein the virtual address is a guest virtual address (GVA) and the method further comprises: transmitting the GVA to the other device; receiving a host physical address (HPA) based on the GVA; and transmitting the HPA in the request to access data.

Example CMM8 includes the subject matter of any one of Examples CMM1-CMM7, wherein the interconnect protocol is one of a Peripheral Component Interconnect Express (PCIe)-based protocol and a Compute Express Link (CXL)-based protocol.

Example CL1 relates to an apparatus comprising means to perform one or more elements of a method of any one of Examples CM1-CM10 and CMM1-CMM8.

Example CL2 relates to one or more non-transitory computer-readable media comprising instructions to cause an electronic device, upon execution of the instructions by one or more processors of the electronic device, to perform one or more elements of a method of any one of Examples CM1-CM10 and CMM1-CMM8.

Example CL3 relates to machine-readable storage including machine-readable instructions which, when executed, implement the method of any one of CM1-CM10 and CMM1-CMM8.

Example CL4 relates to an apparatus comprising: one or more processors and one or more computer-readable media comprising instructions that, when executed by the one or more processors, cause the one or more processors to perform the method of any one of Examples CM1-CM10 and CMM1-CMM8.

Instruction Set Architecture and Message Authentication Codes

Figure 28:
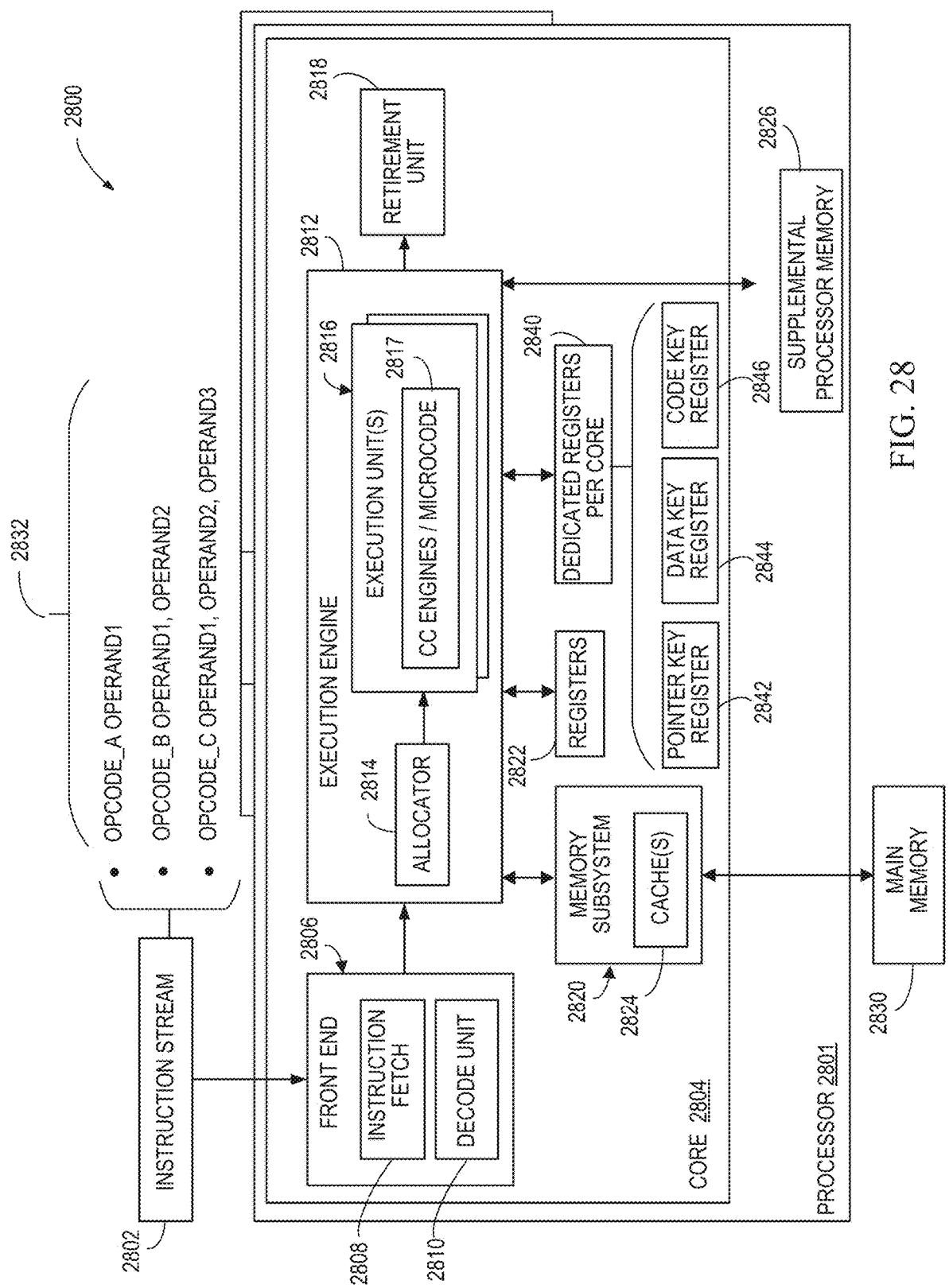
FIG. 28 is a simplified block diagram of a possible system for implementing example instructions and logic for various cryptographic computing operations according to at least one embodiment.

Some embodiments of the present disclosure involve instructions and processing logic for various cryptographic computing operations. FIG. 28 is a block diagram of a system 2800 for instructions and logic for various cryptographic computing operations, according to embodiments of the present disclosure.

A cryptographic computing (CC) central processing unit (CPU) may have multiple cryptographic engines to encrypt/decrypt code, encrypt/decrypt data transferred to and from memory caches, encode/decode pointers, and authenticate the integrity of code and data. These engines may require cryptographic keys and/or tweaks that need to be securely stored to prevent exposure outside the trusted computing base (TCB) such as user applications and possibly the operating system (OS).

For example, cryptographic keys and/or tweaks may be stored in internal hardware registers. In one or more embodiments, these keys are to be unique for each application tenant (e.g., application) running on the same hardware to avoid data leakage between tenants. The hardware is to be programmed with the correct keys based on which tenant is running. Each parallel hardware unit (e.g., core) has its own set of key registers.

System 2800 may include a processor with one or more cores, SoC, integrated circuit, or other mechanism. For example, system 2800 may include a processor 2801 with a core 2804. Although core 2804 is shown and described as an example in FIG. 28, any suitable mechanism may be used, including multiple cores within processor 2801. Core 2804 may include any suitable mechanisms for executing cryptographic computing operations, including those that involve programming 128-bit pointer keys, data keys, and code keys, switching keys between processes, making routable pointers, compressing/decompressing pointers, transferring pointer ownership of an object, and memory move/reverse data from one address to different address. In one embodiment, such mechanisms may be implemented in hardware. Core 2804 may be implemented fully or in part by the elements described in FIGS. 1-2B and embodiments of elements that will be further described herein at FIGS. 43-46.

Instructions to be executed on core 2804 may be included in instruction stream 2802. Instruction stream 2802 may be generated by, for example, an ahead-of-time compiler, just-in-time compiler, interpreter, or other suitable mechanism (which might or might not be included in system 2800), or may be designated by a drafter of code resulting in instruction stream 2802. For example, a compiler may take application code and generate executable code in the form of instruction stream 2802. Instructions may be received by core 2804 from instruction stream 2802. Instruction stream 2802 may be loaded to core 2804 in any suitable manner. For example, instructions to be executed by core 2804 may be loaded from storage, from other machines, or from other memory, such as main memory 2830. The instructions may arrive and be available in resident memory, such as RAM, wherein instructions are fetched from storage to be executed by core 2804. The instructions may be fetched from resident memory by, for example, a prefetcher or fetch unit (such as instruction fetch unit 2808).

In one embodiment, instruction stream 2802 may include instructions from an instruction set architecture (ISA) having particular formats 2832 based on respective instruction definitions. Generally, native instructions are executed by a CPU directly and contain an opcode and one to three operands. Example instruction formats 2832 may include a first instruction format having a first opcode-A and one operand, a second instruction format having a second opcode-B and two operands, and a third instruction having a third opcode-C and three operands. An opcode contains information that informs the CPU what operations are to be performed. Operands tell the CPU what data is to be processed in the operations to be performed. Types of operands can include immediate, register, and memory. An immediate operand is a constant value to be used by the instruction. A register operand may be a name/identifier of a register to be accessed. The register may contain data to be accessed or a pointer to a memory location where the data to be accessed is stored. A memory operand may be a reference to a location in memory that contains data or a pointer to a memory location where the data to be accessed is stored.

A typical instruction set architecture may be extended with new instructions to achieve the one or more embodiments of cryptographic computing embodiments using 128-bit addressing as disclosed herein. For example, instruction stream 2802 may include a "PRGPTRKEY" instruction, a "PRGDATAKEY" instruction, and a "PRGCODEKEY" instruction to program 128-bit pointer encryption keys for pointers, data, and code, respectively. Instruction stream 2802 may include a "SAVEPTRKEY" instruction, a "SAVEDATAKEY" instruction, and a "SAVECODEKEY" instruction to save programmed 128-bit pointer encryption keys for pointers, data, and code, respectively. Instruction stream 2802 may include a "RSTORPTRKEY" instruction, a "RSTORDATAKEY" instruction, and a "RSTORCODEKEY" instruction to restore (unwrap) 128-bit pointer encryption keys for pointers, data, and code, respectively. Instruction stream 2802 may include a "MKROUTPTR" instruction to make a routable pointer using a current local pointer and a host identifier, a "MOVOVERRIDEPTR" instruction to perform a memory move using an address defined in the current address space but encrypted/decrypted using a different address as the key/tweak, and "COMPRESSPTR" and "DECOMPRESSPTR" instructions to convert between a 128-bit representation of a pointer and a 32- or 64-bit compressed representation of a pointer. Instruction stream 2802 may further include a "BORROWOWNERSHIP" instruction to transfer ownership of an object from an input pointer to a new pointer, and a "RETURNOWNERSHIP" instruction to be used following a "BORROWOWNERSHIP" instruction to return ownership of the object to the input pointer. Various operands and specific operations performed with respect to each of these instructions are further defined and described herein. When multiple embodiments are described with respect to a particular instruction, it should be noted that all or a subset of these embodiments may be implemented by a processor unit. For example, different embodiments may be implemented by using variations of an instruction (where each variation may correspond to a different encoding of the instruction, such as a different opcode or different parameter format).

Core 2804 may include a front end 2806, which may include an instruction fetch pipeline stage (such as instruction fetch unit 2808) and a decode pipeline stage (such as decode unit 2810). Front end 2806 may receive and decode instructions from instruction stream 2802 using decode unit 2810. The decoded instructions may be dispatched, allocated, and scheduled for execution by an allocation stage of a pipeline (such as allocator 2814) and allocated to execution units 2816 for execution. Core 2804 may include an execution engine 2812 comprising the allocator 2814 and the execution units 2816.

Execution units 2816 may be configured with cryptographic computing engines and/or microcode 2817 in any suitable manner to enable cryptographic computing instruction extensions to be performed. In one nonlimiting example, core 2804 may include some dedicated execution units for cryptographic computing primitives (e.g., encoding/decoding a cryptographically encoded pointer, encrypting/decrypting a cryptographically encoded pointer, etc.), while some execution units are coordinated using microcode to accomplish the overall cryptographic computing instruction flows.

One or more specific cryptographic computing instructions to be executed by core 2804 may be included in a library defined for execution by core 2804. In another embodiment, specific cryptographic computing instructions may be targeted by particular portions of core 2804. For example, core 2804 may recognize, either implicitly or through decoding (e.g., via decode unit 2810) and execution or attempted execution of one of the aforementioned instructions, that one of these extended cryptographic computing operations is to be performed. In some implementations and scenarios, the extended cryptographic computing instruction (or particular operation(s) of the instruction) may be directed to a particular one of the execution units 2816 for execution of the instruction (or particular operation(s) of the instruction). For example, the instruction (or particular operation of the instruction) may be directed to a dedicated execution unit that performs a certain cryptographic primitive.

An execution unit 2816 that executes cryptographic computing instructions may be implemented in any suitable manner. In one embodiment, an execution unit 2816 may include or may be communicatively coupled to registers, supplemental processor memory 2826, and other memory elements to store information necessary to perform one or more cryptographic computing operations. In one embodiment, an execution unit 2816 may include circuitry to perform a cryptographic computing operation.

Generally, during execution of cryptographic computing instructions, access to data that is typically stored in memory or to additional instructions (including data or instructions resident in main memory 2830) may be made through memory subsystem 2820. Moreover, results from execution may be stored in memory subsystem 2820 and subsequently moved to main memory 2830 or some other longer storage memory. Memory subsystem 2820 may include, for example, memory, RAM, or a cache hierarchy, which may include caches 2824, such as one or more Level 1 (L1) caches or Level 2 (L2) caches, some of which may be shared by multiple cores 2804 or processors 2801.

Execution of cryptographic computing instructions may also involve cryptographically encoded pointers and other information related to the cryptographic computing functions such as, for example, secret keys, tweaks, context information, and/or credentials for information requiring authentication. Cryptographically encoded pointers are typically stored in registers 2822. Registers 2822 may be included in core 2804 and may also be used to store other information related to cryptographic computing. In one or more embodiments, dedicated registers 2840 per core may be provisioned to store secret keys and/or tweaks for the cryptographic operations. In addition, dedicated registers 2840 may include distinct registers that are to be used for data keys, code keys, and pointer keys. For example, the registers may comprise a pointer key register 2842, a data key register 2844, and a code key register 2846. It should be apparent that multiple dedicated registers for pointer keys, data keys, and code keys may be configured in a processor or core. In one example, two 64-bit registers may be implemented for each 128-bit key. Processor 2801 may also include supplemental processor memory 2826, such as content addressable memory (CAM), which may be dedicated for storage of information related to cryptographic computing. For example, dedicated supplemental processor memory 2826 may be a dedicated cache that is not accessible by software. Thus, information such as keys, tweaks, context information, credentials, and/or possibly cryptographically encoded pointers may be stored in the dedicated supplemental processor memory 2826. In other embodiments, keys used to secure a cryptographically encoded pointer, data, and/or code (and potentially other information related to cryptographic computing) can be stored in another memory location such as firmware, in a secure portion of main memory 2830 or another storage device, or any other form of secure memory suitable for performing the functions described herein.

After execution by execution units 2816, instructions may be retired by a writeback stage or retirement stage in retirement unit 2818. Various portions of such execution pipelining may be performed by one or more cores.

FIGS. 29-32 are simplified flow diagrams illustrating example operations of instructions for managing cryptographic keys in a cryptographic computing architecture. The instructions of FIGS. 29-32 may be executed as part of an instruction stream (e.g., 332 of FIG. 28) to perform operations including programming and initializing a key, saving a key on a context switch, and restoring a key on a context switch. In one or more embodiments, cryptographic computing keys are unique to applications running on the same hardware and for each application, different keys may be used for encryption and decryption of code, data, and cryptographically encoded pointers to the data and/or code. Code keys may be used for encrypting and decrypting any type of code image (e.g., via 270, 2817), including for example, applications, programs, libraries in binary form. In some scenarios, a code image may include only code and in other scenarios a code image can include code and data such as global variables and/or constants, for example. Data keys may be used for encrypting and decrypting data associated with an application (e.g., via 270, 2817). Pointer keys may be used for encrypting and decrypting at least a portion of a cryptographically encoded pointer (e.g., via 202, 2817). Accordingly, different instructions may be implemented for respective key management operations (e.g., programming and initializing, saving, and restoring) for code keys, for data keys, and for pointer keys. The instructions will now be described with reference to particular key management operations, understanding that instructions may be implemented respectively for code keys, data keys, and pointer keys.

Figure 29:
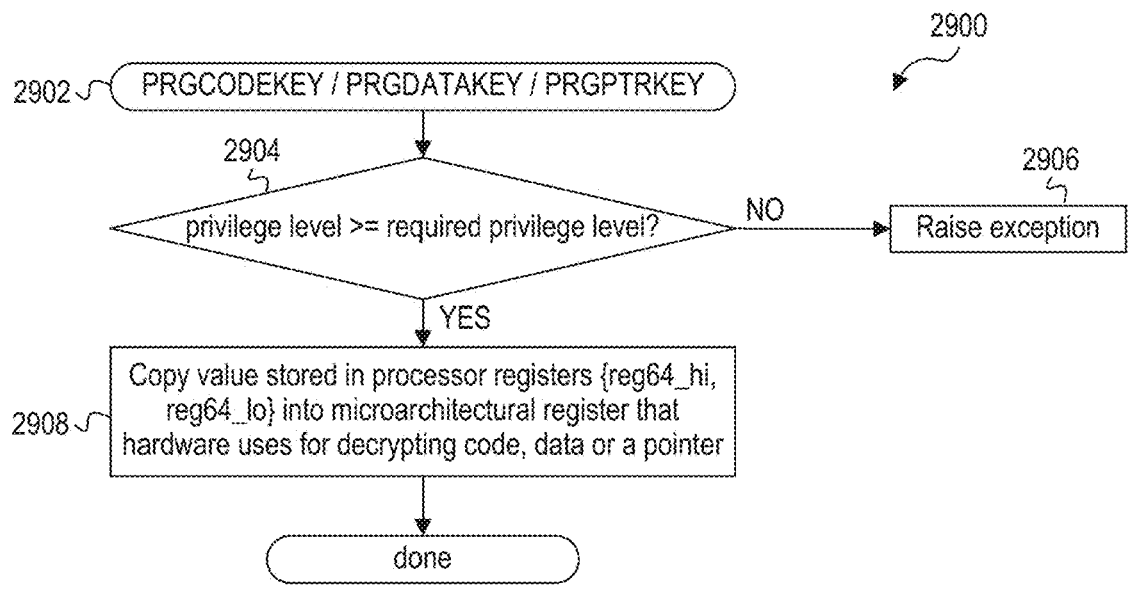
FIG. 29 is a flow diagram illustrating an example operation of an instruction to program a key for cryptographic computing, according to at least one embodiment.

FIG. 29 is a flow diagram 2900 illustrating an example operation of PRGxxxKEY instructions to program keys used in cryptographic computing, according to at least one embodiment. The PRGxxxKey instruction represents instructions for programming and initializing 128-bit (double quadword) data keys, code keys, and pointer keys from two 64-bit registers. The instructions may be implemented as three separate instructions such as PRGDATAKEY for data keys, PRGCODEKEY for code keys, and PRGPTRKEY for pointer keys. Thus, 'xxx' in PRGxxxKey represents 'CODE', 'DATA', and 'PTR'. In an embodiment, the PRGxxxKEY instructions may have two register operands in the following format:

PRGCODEKEY reg64_hi, reg64_lo
PRGDATAKEY reg64_hi, reg64_lo
PRGPTRKEY reg64_hi, reg64_lo The PRGxxxKEY instructions program the corresponding keys for code, data, and pointers in hardware by copying the key value specified in the operands into a key register in the corresponding cryptographic engine (e.g., 202, 270 2817). In at least one embodiment, the PRGxxxKEY instructions can only be executed by privileged software using a hardware trusted entity (e.g., 190) and should result in a fault if an attempt is made by an entity with a lower privilege level (e.g., by a user-level application at ring 3) to execute the instructions. In an example implementation, a 128-bit (double quadword) code/data/pointer encryption key can be split across two 64-bit general purpose CPU registers, with the highest 64 bits in the first operand (e.g., reg64_hi) and the lowest 64 bits in the second operand (e.g., reg64_lo). Embodiments are not so limited, however, and other sizes of keys and/or registers could be implemented and used based on particular architectures and needs.

With reference to privilege levels, some computer architectures define privileges in the context of concentric protection rings 0-3. Typically, the innermost ring (e.g., ring 0) is the smallest and has the most privileges. Privileges are progressively decreased in each larger ring, such that the outermost ring (e.g., ring 3), which is the largest ring, has the least privileges. In this specification, relative "privilege levels" (e.g., highest, lowest, etc.) are intended to mean the amount of privileges an entity (e.g., kernel, device drivers, applications, etc.) of a computing device has, rather than the number associated with a particular protection ring. For example, in an architecture with four protection rings (e.g., ring 0 through ring 3), references herein to the highest privilege level can correspond to ring 0, while references to the lowest privilege level can correspond to ring 3.

The flow diagram 2900 of FIG. 29 illustrates an example operation of PRGCODEKEY/PRGDATAKEY/PRGPTRKEY instructions 2902. At 2904, a determination is made as to whether the privilege level of the entity (e.g., tenant application) requesting execution of the instruction is greater than or equal to the minimum required privilege level defined for the instruction. If it is determined that the entity requesting execution does not have the minimum required privilege level or greater to execute the instruction, then at 2906 an exception may be raised and the instruction is not executed.

If it is determined at 2904 that the privilege level of the entity requesting execution of the instruction is greater than or equal to the minimum required privilege level defined for the instruction, then at 2908 the value stored in processor registers (e.g., 116, 2822) is copied into a microarchitectural register that hardware (e.g., 2842, 2844, 2846) uses for decrypting/encrypting the code, data, or pointer associated with the particular key. In an example, a first 64-bit register containing the most significant 64 bits of the key and a second 64-bit register containing the least significant 64 bits of the key are copied into a 128-bit microarchitectural register.

Figure 30:
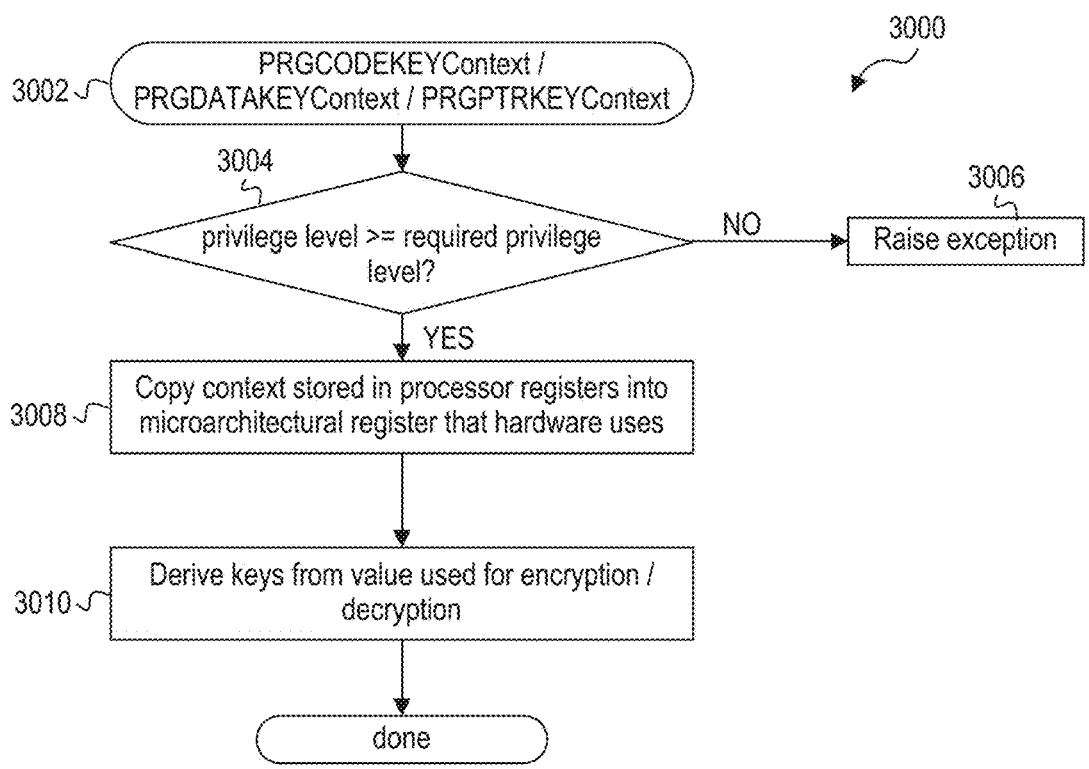
FIG. 30 is a flow diagram illustrating an example operation of an instruction to initialize a key for cryptographic computing, according to at least one embodiment.

FIG. 30 is a flow diagram 3000 illustrating an example operation of PRGxxxKEYContext instructions to program keys with some context, which are used in cryptographic computing, according to at least one embodiment. The PRGxxxKEYContext instruction represents instructions for programming and initializing data keys, code keys, and pointer keys with context, which may be implemented as three separate instructions such as PRGDATAKEYContext for data keys, PRGCODEKEYContext for code keys, and PRGPTRKEYContext for pointer keys. Thus, 'xxx' in PRGxxxKEYContext represents 'CODE', 'DATA', and 'PTR'. In an embodiment, the PRGxxxKEY instructions may have two register operands in the following format:

PRGCODEKEYContext reg64_hi, reg64_lo
PRGDATAKEYContext reg64_hi, reg64_lo
PRGPTRKEYContext reg64_hi, reg64_lo The PRGxxxKEYContext instructions program the corresponding context in hardware by copying the context value specified in the operands into a register in the corresponding cryptographic engine (e.g., 202, 270, 2817). In at least one embodiment, the PRGxxxKEYContext instructions can only be executed by privileged software using a hardware trusted entity (e.g., SEAM, CSME, embedded security processor) and should result in a fault if an attempt is made by an entity with a lower privilege level (e.g., by a user-level application at ring 3) to execute the instructions. A 128-bit key can be derived from the context by using a secret CPU_Private_Key (e.g., processor key 105) to hash the context and produce a key using standard hashing algorithms. Any suitable hashing algorithm may be used in this and other embodiments herein. Examples of hashing algorithms that may be used include, but are not necessarily limited to, a Secure Hash Algorithm (e.g., SHA1, SHA2, SHA3) or a Message Digest 5 (MD5). Furthermore, the context may be used directly or as part of a context. For example, the context provided may be appended/prepended with the current control register (e.g., CR3) value to ensure that it is bound to a process.

The flow diagram 3000 of FIG. 30 illustrates an example operation of PRGCODEKEYContext/PRGDATAKEYContext/PRGPTRKEYContext instructions 3002. At 3004, a determination is made as to whether the privilege level of the entity (e.g., tenant application) requesting execution of the instruction is greater than or equal to the minimum required privilege level defined for the instruction. If it is determined that the entity requesting execution does not have the minimum required privilege level or greater to execute the instruction, then at 3006 an exception may be raised and the instruction is not executed.

If it is determined at 3004 that the privilege level of the entity requesting execution of the instruction is greater than or equal to the minimum required privilege level defined for the instruction, then at 3008 the context stored in processor registers (e.g., 116, 2822) is copied into a microarchitectural register that hardware (e.g., 2842, 2844, 2846) uses. In an embodiment, a first 64-bit register containing the most significant 64 bits of the key and a second 64-bit register containing the least significant 64 bits of the key are copied into a 128-bit microarchitectural register.

At 3010, keys may be derived from the context value and used for decrypting/encrypting the code, data, or pointer associated with the particular key. In one nonlimiting example, a key may be derived by using a processor key (e.g., 105) to hash the context and produce a value to be used as the key:

Key_n=SHA3(context,CPU_Private_Key)

Computing systems today typically save the current processor state upon context switch which occurs due to multitasking, interrupts, or user-kernel mode switches. For example, a process can be instantiated by executing program instructions of a code image, and the code key, data key, and pointer key may all be programmed in the cryptographic engines. If the process receives an interrupt, a context switch occurs, and a new code key, data key, and/or pointer key may be stored in the cryptographic engines. However, the old code key, data key, and pointer key may still be needed once the process resumes. Therefore, a cryptographic computing enabled system also stores the keys currently programmed in the cryptographic engines. Example operations for save and restore instructions are provided in FIGS. 31 and 32.

Figure 31:
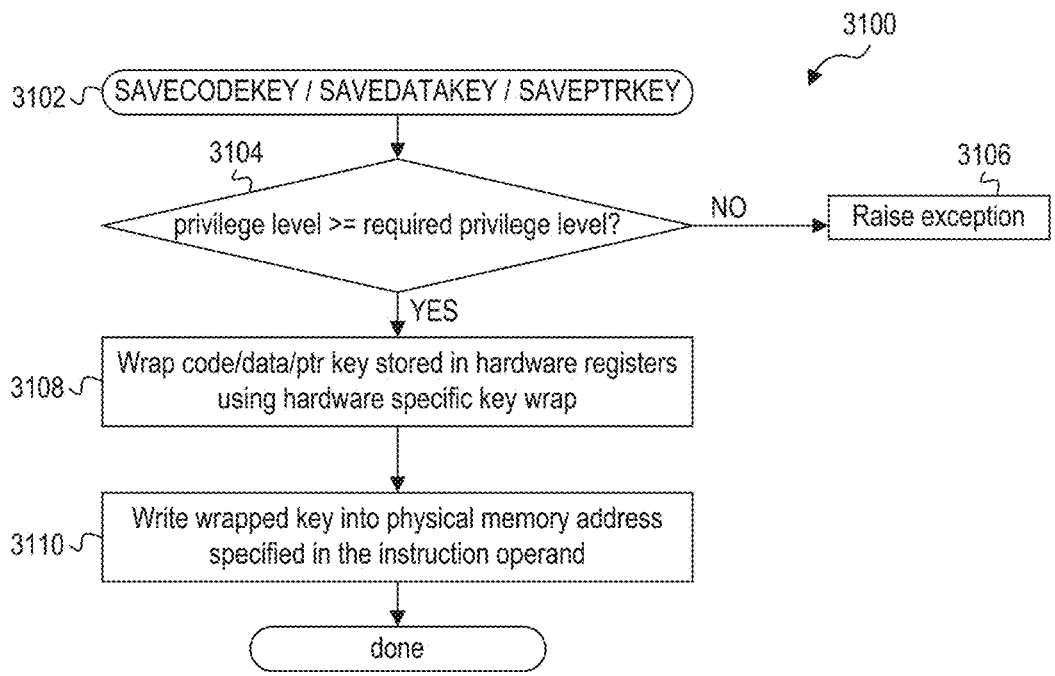
FIG. 31 is a flow diagram illustrating an example operation of an instruction to save a key for cryptographic computing, according to at least one embodiment.

FIG. 31 is a flow diagram 3100 illustrating an example operation of SAVExxxKEY instructions to save to memory the corresponding keys used in cryptographic computing, according to at least one embodiment. The SAVExxxKey instruction represents instructions for saving currently programmed 128-bit (double quadword) data keys, code keys, and pointer keys in memory starting from an address specified in a 64-bit register. The instructions may be implemented as three separate instructions such as SAVEDATAKEY for data keys, SAVECODEKEY for code keys, and SAVEPTRKEY for pointer keys. Thus, 'xxx' in SAVExxxKey represents 'CODE', 'DATA', and 'PTR'. In an embodiment, the SAVExxxKEY instructions may have one register operand in the following format:

SAVECODEKEY reg64_mem
SAVEDATAKEY reg64_mem
SAVEPTRKEY reg64_mem

The SAVExxxKEY instructions save the corresponding key in memory (e.g., in RAM) at the physical address specified by the operand. In one embodiment, the operand may be a 64-bit physical address specified in a 64-bit general purpose CPU register (e.g., 110, 2822). SAVExxxKEY instructions are privileged instructions that should result in a fault if executed with a lower privilege level (e.g., user-level application). Before writing the key, it is cryptographically wrapped (e.g., encrypted) using a platform-specific secret key (e.g., processor key 105). This prevents exposure of cryptographic computing keys to untrusted software.

The flow diagram 3100 of FIG. 31 illustrates an example operation of SAVECODEKEY/SAVEDATAKEY/SAVEPTRKEY instructions 3102. At 3104, a determination is made as to whether the privilege level of the entity (e.g., tenant application) requesting execution of the instruction is greater than or equal to the minimum required privilege level defined for the instruction. If it is determined that the entity requesting execution does not have the minimum required privilege level or greater to execute the instruction, then at 3106 an exception may be raised and the instruction is not executed.

If it is determined at 3104 that the privilege level of the entity requesting execution of the instruction is greater than or equal to the minimum required privilege level defined for the instruction, then at 3108 the key (e.g., code key, data key, or pointer key depending on the instruction) stored in hardware registers (e.g., 2842, 2844, 2846) is wrapped using a hardware specific key wrap (e.g., a hardware protected key like processor key 105). Wrapping a key can include encryption using any suitable encryption algorithms (e.g., block cipher (e.g., 64 bit, 48 bit, 32 bit, 16 bit, etc. using Simon, Speck, tweakable K-cipher, PRINCE or any other block cipher), Advanced Encryption Standard (AES), Data Encryption Standard (DES), or Rivest Ciphers (RC4, RC5, RC6). In some embodiments, a key derivation function may be used to derive keys (e.g., PRGxxxKEYContext instructions). A wrapping key can be advantageously used to prevent unauthorized software from directly reading the wrapped key. Thus, the wrapping key is not be accessible itself to the unauthorized software. One way to accomplish this is to randomly generate the wrapping key each time the processor boots and store it in a register that cannot be accessed by the unauthorized software. Other ways of establishing the wrapping key are also possible. In this embodiment, the context is stored by the SAVExxxKEY instructions instead of the key.

At 3110, the encrypted key can be written into physical memory at a memory address specified in the instruction operand. In an embodiment, the operand is a 64-bit register containing the physical memory address.

Figure 32:
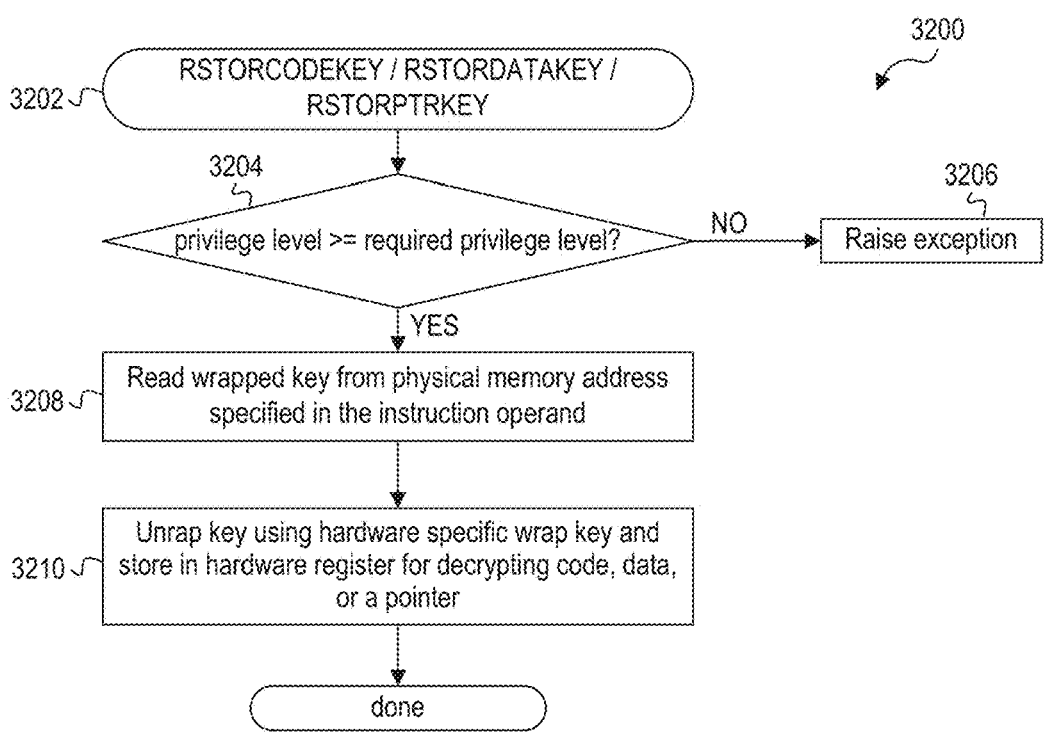
FIG. 32 is a flow diagram illustrating an example operation of an instruction to restore a key for cryptographic computing, according to at least one embodiment.

FIG. 32 is a flow diagram 3200 illustrating an example operation of RSTORxxxKEY instructions to restore the corresponding keys from memory used in cryptographic computing, according to at least one embodiment. The RSTORxxxKey instruction represents instructions for restoring 128-bit (double quadword) data keys, code keys, and pointer keys saved at the address specified in a 64-bit register operand. The instructions may be implemented as three separate instructions such as RSTORDATAKEY for data keys, RSTORCODEKEY for code keys, and RSTORPTRKEY for pointer keys. Thus, 'xxx' in RSTORxxxKey represents 'CODE', 'DATA', and 'PTR'. In an embodiment, the RSTORxxxKEY instructions may have one register operand in the following format:

RSTORCODEKEY reg64_mem
RSTORDATAKEY reg64_mem
RSTORPTRKEY reg64_mem

The RSTORxxxKEY instructions perform the reverse process of the SAVExxxKEY instructions by reading wrapped keys from memory (e.g., RAM), unwrapping them, and programming the keys into the cryptographic engines (e.g., 202, 270, 2817). RSTORxxxKEY instructions are privileged instructions that should result in a fault if executed with a lower privilege level (e.g., user-level application). In one embodiment, the operand may be a 64-bit physical address specified in a 64-bit general purpose CPU register (e.g., 110, 2822). When a key derivation function is used to derive keys, the context instead of the key is stored by the SAVExxxKEY instructions and therefore, the context can be restored by the RSTORxxxKEY instructions.

The flow diagram 3200 of FIG. 32 illustrates an example operation of RSTORCODEKEY/RSTORDATAKEY/RSTORPTRKEY instructions 3202. At 3204, a determination is made as to whether the privilege level of the entity (e.g., tenant application) requesting execution of the instruction is greater than or equal to the minimum required privilege level defined for the instruction. If it is determined that the entity requesting execution does not have the minimum required privilege level or greater to execute the instruction, then at 3206 an exception may be raised and the instruction is not executed.

If it is determined at 3204 that the privilege level of the entity requesting execution of the instruction is greater than or equal to the minimum required privilege level defined for the instruction, then at 3208 the wrapped key (e.g., code key, data key, or pointer key depending on the instruction) is read from a physical memory address specified in the instruction operand. At 3210, the wrapped key can be unwrapped using a hardware specific key (e.g., processor key 105) and can be stored in hardware registers (e.g., 2842, 2844, 2846) for decrypting code, data, or a pointer.

Figure 33:
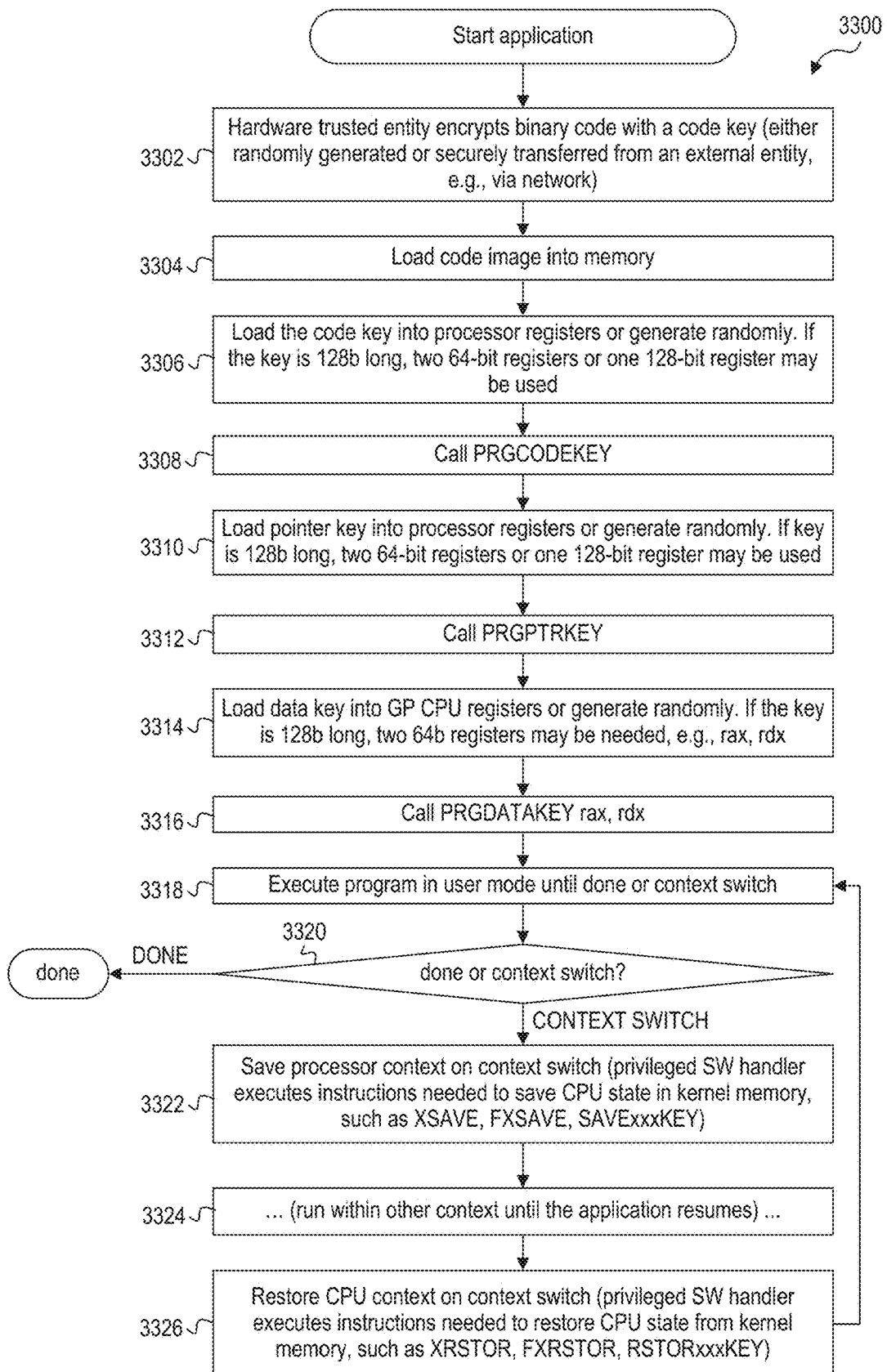
FIG. 33 is a flow diagram illustrating an example flow of an application managing keys for cryptographic computing operations according to at least one embodiment.

FIG. 33 is a flow diagram 3300 illustrating an example flow of an application utilizing cryptographic computing key management in a computing system according to an embodiment. One or more operations of flow diagram 3300 may be executed by hardware, firmware, and/or software of a computing device (e.g., 100, 2800). In this example, one or more operations may be performed by a hardware trusted entity (e.g., 190). The computing device may comprise means such as a processor (e.g., 102, 301) for performing the operations.

Upon application start, the hardware trusted entity receives a code image (e.g. from a file, or some out of bound manner). In some scenarios, the code image could be separately received in a trusted manner and/or protected by encryption and/or integrity. A non-platform tenant key may be used for additional security. In this scenario, the code image is to be decrypted before the application encrypts it.

At 3302, the hardware trusted entity encrypts the binary code image with a code key (e.g., a key for encrypting a code image). In an embodiment, the code key is internally generated for example, by key management hardware (e.g., 192). The key management hardware and hardware trusted entity may be logically separate entities or combined as one logical and physical entity.

At 3304, the encrypted code image, which is the encrypted binary, can be loaded into memory. The hardware trusted entity can then perform the operation of a loader or work with a loader to install the encrypted image into memory.

At 3306, the code key can be loaded into a processor register (e.g., general purpose register), before the program entry function is invoked. In one example, if the code key is 128 bits, then two 64-bit registers (e.g., rax, rdx) may be used to load the most significant 64 bits of the code key in one 64-bit register and the least significant 64 bits of the code key in the other 64-bit register. In some implementations, a 128-bit register (e.g., XMM) may be used to store the entire code key. In other embodiments, the code key may be generated randomly.

At 3308, the PRGCODEKEY instruction can be called with the appropriate register(s) containing the code key as operand(s) (e.g., rax and rdx, or XMM). The PRGCODEKEY instruction can program and initialize the code key as previously explained herein. In one example, prior to the general purpose registers or XMM register being used as a source operand(s) for the PRGCODEKEY instruction, the registers are initialized with the code key value (e.g., by loading it from memory or setting the registers to a random value using other instructions (e.g., RDRAND instruction). This has the benefit of giving software the flexibility to either load a key from memory or randomly generate it.

In some cases, however, access by software to the general purpose registers and XMM registers can lead to the key value being leaked. Thus, some variants of PRGCODEKEY obtain the code key value directly from a random number generator rather than source operand registers. In one alternative example, the PRGCODEKEYContext instruction can be called to program context into the cryptographic engine, from which the code key can be derived using a hash algorithm with the processor key (e.g., 120). For example, a secure hashing algorithm (e.g., SHA3) may be used on the processor key or other secure root key to produce a value that can be used as a derived key.

PRGCODEKEY takes the contents of the source operands and uses them to set one or more code key registers (e.g., 2846). The code key register(s) can be set by directly copying the contents of a 128-bit XMM register or concatenating the contents of two 64-bit GPRs to form a 128-bit value.

At 3310, the pointer key can be loaded into a processor register (e.g., general purpose register), before the program entry function is invoked. In one example, if the pointer key is 128 bits, then two 64-bit registers (e.g., rax, rdx) may be used to load the most significant 64 bits of the pointer key in one 64-bit register and the least significant 64 bits of the pointer key in the other 64-bit register. In some implementations, a 128-bit register (e.g., XMM) may be used to store the entire pointer key. In other embodiments, the pointer key may be generated randomly.

At 3312, the PRGPTRKEY instruction can be called with the appropriate register(s) containing the pointer key as operand(s) (e.g., rax and rdx, or XMM). The PRGPTRKEY instruction can program and initialize the pointer key as previously explained herein. In one example, prior to the general purpose registers or XMM register being used as a source operand(s) for the PRGPTRKEY instruction, the registers are initialized with the pointer key value (e.g., by loading it from memory or setting the registers to a random value using other instructions (e.g., RDRAND instruction). This has the benefit of giving software the flexibility to either load a key from memory or randomly generate it.

In some cases, however, access by software to the general purpose registers and XMM registers can lead to the key value being leaked. Thus, some variants of PRGPTRKEY obtain the pointer key value directly from a random number generator rather than source operand registers. In one alternative example, the PRGPTRKEYContext instruction can be called to program context into the cryptographic engine, from which the pointer key can be derived using a hash algorithm with the processor key (e.g., 120). For example, a secure hashing algorithm (e.g., SHA3) may be used on the processor key or other secure root key to produce a value that can be used as a derived key.

PRGPTRKEY takes the contents of the source operands and uses them to set one or more pointer key registers (e.g., 2842). The pointer key register(s) can be set by directly copying the contents of a 128-bit XMM register or concatenating the contents of two 64-bit GPRs to form a 128-bit value.

At 3314, the data key can be loaded into a processor register (e.g., general purpose register), before the program entry function is invoked. In one example, if the data key is 128 bits, then two 64-bit registers (e.g., rax, rdx) may be used to load the most significant 64 bits of the data key in one 64-bit register and the least significant 64 bits of the data key in the other 64-bit register. In some implementations, a 128-bit register (e.g., XMM) may be used to store the entire data key. In some embodiments, the pointer key may be generated randomly. Generally, the first time a key (e.g., code, pointer, or data) is generated, it may be generated from a random value source.

At 3316, the PRGDATAKEY instruction can be called with the appropriate register(s) containing the data key as operand(s) (e.g., rax and rdx, or XMM). The PRGDATAKEY instruction can program and initialize the data key as previously explained herein. In one example, prior to the general purpose registers or XMM register being used as a source operand(s) for the PRGDATAKEY instruction, the registers are initialized with the data key value (e.g., by loading it from memory or setting the registers to a random value using other instructions (e.g., RDRAND instruction). This has the benefit of giving software the flexibility to either load a key from memory or randomly generate it.

In some cases, however, access by software to the general purpose registers and XMM registers can lead to the key value being leaked. Thus, some variants of PRGDATAKEY obtain the data key value directly from a random number generator rather than source operand registers. In one alternative example, the PRGDATAKEYContext instruction can be called to program context into the cryptographic engine, from which the data key can be derived using a hash algorithm with the processor key (e.g., 120). For example, a secure hashing algorithm (e.g., SHA3) may be used on the processor key or other secure root key to produce a value that can be used as a derived key.

PRGDATAKEY takes the contents of the source operands and uses them to set one or more data key registers (e.g., 2846). The data key register(s) can be set by directly copying the contents of a 128-bit XMM register or concatenating the contents of two 64-bit GPRs to form a 128-bit value.

At 3318, the program may be executed in user mode until it is done or until there is a context switch. A context switch can include, for example, an interprocess communication or a hardware interrupt. If it is determined at 3320 that there is context switch in the program, then at 3322, the process context can be saved. On a context switch, the keys (code key, data key, and pointer key) and any other secret metadata and/or context can be key wrapped using the processor key (e.g., 102) and placed in regular memory to provide confidentiality. Additional metadata such as an integrity value (e.g., message authentication code (MAC)) may also be placed in memory to detect any corruption by an untrusted entity. The hardware trusted entity (or a privileged software handler) can execute appropriate instructions to save the processor state in kernel memory, such as XSAVE, FXSAVE, SAVECODEKEY, SAVEDATAKEY, and SAVEPTRKEY instructions, as previously described herein. For example, a trusted entity or handler could be a mode running on the same processor such as Secure-Arbitration Mode (SEAM). In some implementations it may be configured as processor microcode internally.

At 3324, the program can run within the other context until the application resumes. Upon context switch back at 3326, this stored metadata can be restored and verified to be correct. The hardware trusted entity (or a privileged software handler) can execute appropriate instructions to restore the processor state from kernel memory, such as XRSTOR, FXSTOR, RSTORCODEKEY, RSTORDATAKEY, and RSTORPTRKEY instructions, as previously described herein.

Data Integrity and Pointer Integrity

Current pointer authentication techniques embed authentication codes into pointers. While authentication codes are desirable, embedding them into the pointer steals valuable bits that could alternatively be used for other important metadata or context information. Additionally, an authentication code encoded in a 64-bit pointer may be allocated only a small number of bits. In some examples, authentication codes are encoded in four bits. Thus, they are too short to a secure authentication code because four bits allows for a $\frac{1}{16}$ chance of a collision. One approach to solving the authentication problem is to use a memory allocation scheme as described in FIGS. 34-39.

Figure 34:
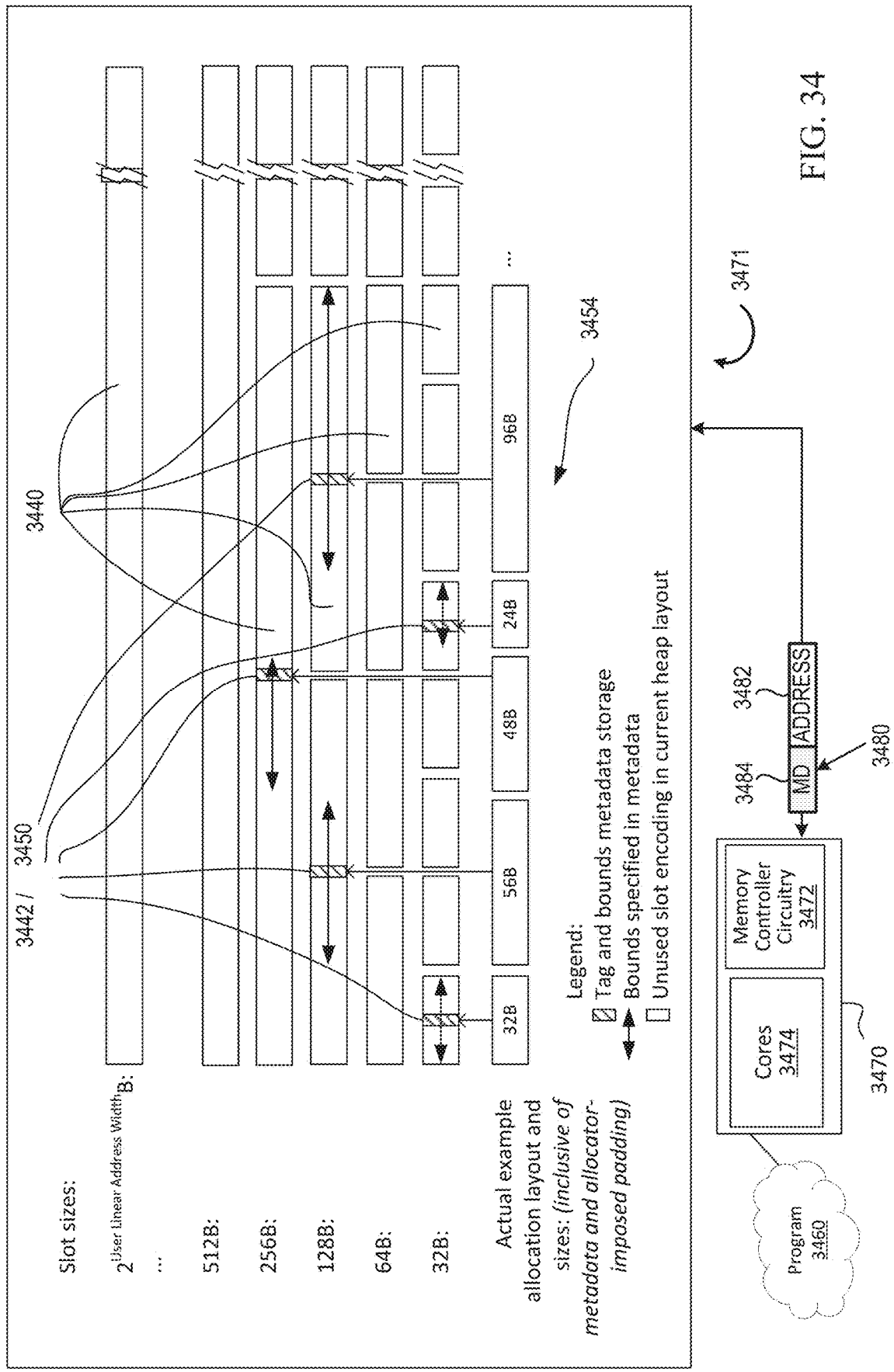
FIG. 34 is a schematic illustration of a memory allocation security check system according to an embodiment.

FIG. 34 is a schematic diagram of an illustrative memory circuitry/cache circuitry 3471 to allow the performing of security checks on memory allocations along with processor circuitry 46970, which can include cores 3474 and memory controller circuitry 3472. Although embodiments are not so limited, in the shown embodiment of FIG. 34, the memory circuitry/cache circuitry 3471 may be apportioned into one or more power of two (i.e., $2^0$ to $2^n$) slots 3440 in which the respective midpoint address 3442 includes respective, unique, metadata 3450 that is associated with the respective memory allocations 3454 within slots 3440, in accordance with at least one embodiment described herein.

Figure 45:
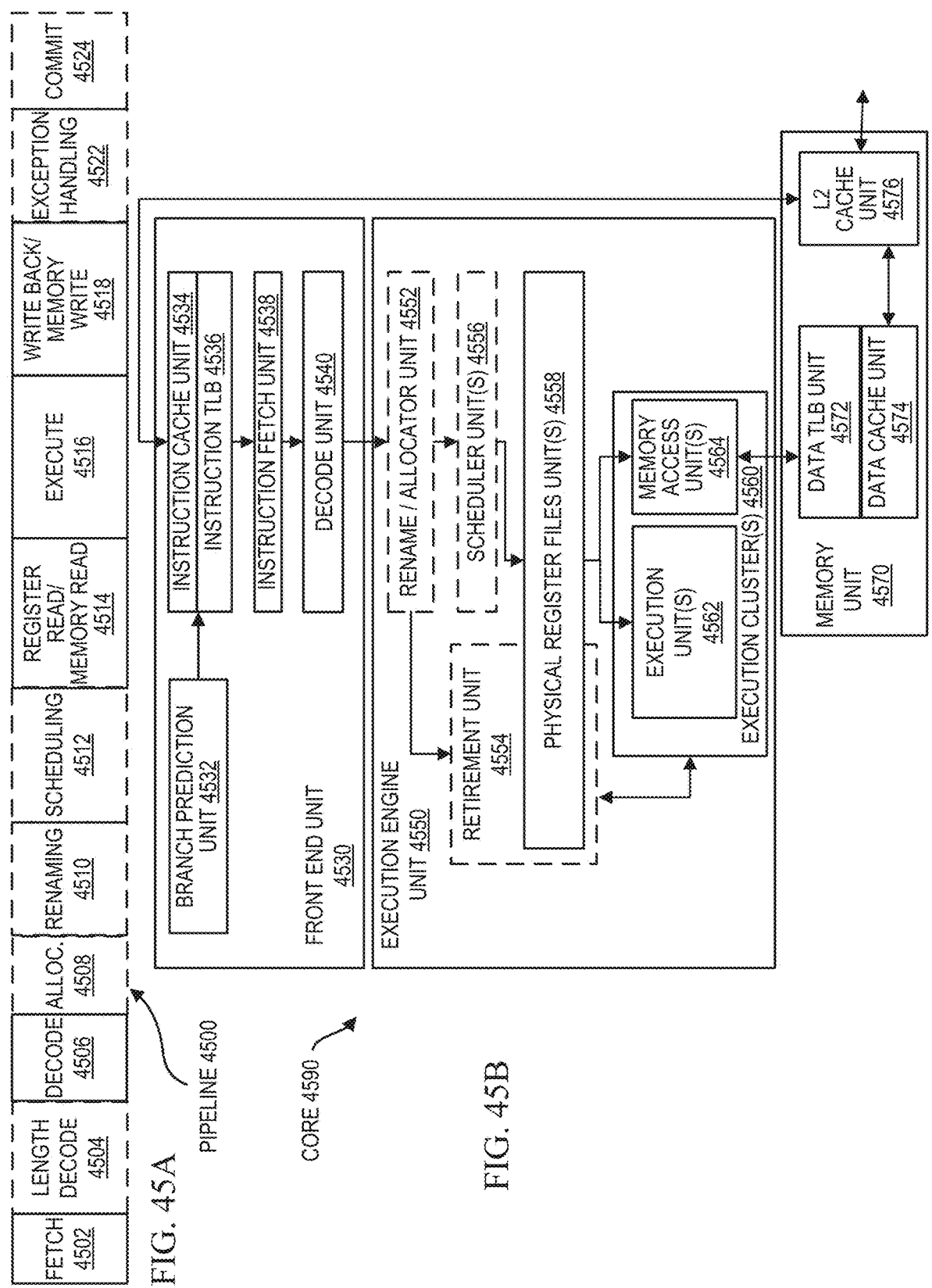
FIG. 45A is a block diagram illustrating both an exemplary in-order pipeline and an exemplary register renaming, out-of-order issue/execution pipeline in accordance with certain embodiments.
FIG. 45B is a block diagram illustrating both an exemplary embodiment of an in-order architecture core and an exemplary register renaming, out-of-order issue/execution architecture core to be included in a processor in accordance with certain embodiments.
Figure 46:
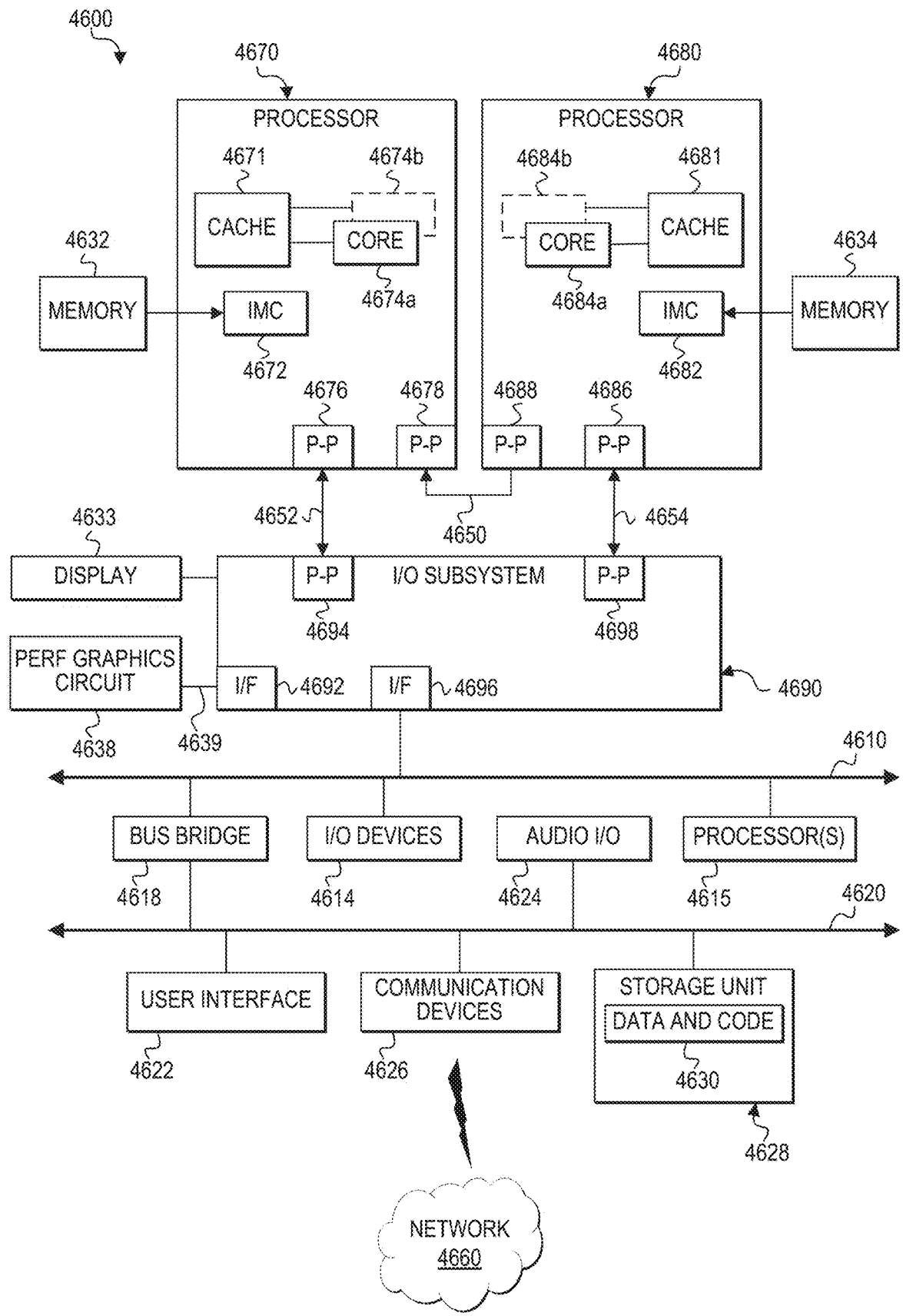
FIG. 46 is a block diagram of an example computer architecture according to at least one embodiment.

As an example, memory circuitry/cache circuitry 3471 may be similar to cache 170 or memory 120 of FIG. 1, or to cache 4671, 4681 or memory 4632, 4634 of FIG. 46. Also as an example, processor circuitry 3470 may be similar to processor 102 of FIG. 1 or to processor 4670, 4680 of FIG. 46, cores 3474 may be similar to cores 4674, 4684 of FIG. 46, and memory controller circuitry 3472 may be similar to memory access units 4564 of FIG. 45, or in some cases, IMC 4672, 4682 of FIG. 46. FIGS. 45-46 and their components will be further described below.

In some embodiments, an instruction (e.g., from a program 3460) that causes the processor circuitry (such as cores 3474 of FIG. 34) to perform a memory operation causes the memory controller circuitry 3472 to access the memory circuitry/cache circuitry 3471 using a pointer 3480 that includes at least data representative of the address 3482 for the memory operation and metadata 3484 associated with the respective memory allocation 3440 corresponding to memory address 3482. The metadata 3484 is compared to metadata 3450 stored at the midpoint address 3442 of the respective memory allocation 3440. If the pointer metadata 3484 matches the stored metadata 3450 within the memory allocation 3440, the operation at the designated memory address 3482 is permitted. If the pointer metadata 3484 fails to match the stored metadata 3450 within the memory allocation 3440, an exception is returned to the processor 3470.

It is to be noted that when a comparison of metadata is described in this section, the comparison is not meant to be viewed in a restrictive manner, and is meant to encompass comparison of all or part of the metadata (such as integrity value, message authentication code (MAC), tag data, compartment ID, etc.) in the pointer with metadata associated with the object for which an access control is to be implemented.

In the memory circuitry/cache circuitry 3471 of FIG. 34, each object 3454 is fully assigned to a given slot (i.e. one object per slot and one slot per object), in this way ensuring that the metadata 3450 at the midpoint can be easily associated with the object to which it pertains. The objects 3454 are shown in FIG. 34 once at the bottom of the figure, and represented correspondingly by double pointed arrows within the respective slots 3440 themselves. Even though the objects 3454 may be in slots larger than the allocations themselves, the allocations may, according to one embodiment, not need padding in order to be placed within the larger slots. According to some embodiments, the object may be allocated to a slot that most tightly fits the object, given the set of available slots and objects. In the shown embodiment of FIG. 34, for example, the 32B object 3454 is allocated to a 32B slot 3440, the 56B object to a 128B slot 3440, the 48B object to a 256B slot, the 24B object to a 32B slot and the 346B object to a 128B slot. In the shown example of FIG. 34, because the 48B object would have crossed an alignment boundary within two slots, it is assigned to the larger 256B slot. Although the shown example of FIG. 34 shows the objects as spanning through the slots in a contiguous fashion (tightly packed), clearly, embodiments are not so limited, and include within their scope an allocation scheme of objects to respective, dedicated memory slots as long as a midpoint address of the slot is crossed by the object, where some slots may be free, especially for example in use after free (UAF) scenario where a dangling pointer is involved. According to some embodiments, object sizes, inclusive of metadata storage, may not be smaller or equal in size to half the width of a smallest slot in order for them to cross (i.e. to at least partially cover) the midpoint when assigned to a slot.

Based on the above allocation scheme, where each object is uniquely assigned to a dedicated slot, and crosses the slot midpoint, the metadata 3450 may be located at the midpoint address of the slot in order to allow the processor to find it quickly, without having to go to a separate table or memory location to determine the metadata. Current approaches sometimes put the metadata before each allocation, typically in a non-power-of-two scheme, and within each pointer, specify a distance of the pointer address from the beginning of the allocation. However, the pointer has a limited number of bits, and the need to specify the latter distance may overrun the extent of the pointer where the distance is larger than what the pointer can accommodate, that is, where an allocation is larger than one that the bits in the pointer can accommodate. The power-of-two (Po2) approach, used according to one embodiment, allows a unique mapping of each object to a Po2 slot, where the slot is used to provide the possibility to uniquely encode and encrypt each object within it. According to some embodiments, metadata 3450 may be encrypted as well.

To overcome the problem of too long of a distance/offset from the beginning of an allocation as noted above, instead, some embodiments merely specify, in the size field of the pointer, the size of the slot, such as the Po2 size of the slot as a size exponent in the size field of the pointer, that the object to be addressed fits into. The size will determine the specific address bits to be referred to by the processor in order to determine the slot being referred to. Having identified the specific slot, the processor can go directly to the midpoint address of the identified slot in order to read out the metadata, including at least one of bounds information or a compartment ID, and possibly other metadata, such as tag data. Embodiments are however not limited to Po2 schemes for the slots, and may include a scheme where the availability of slots of successively increasing sizes may be based on a power of an integer other than two, or based on any other scheme.

Bounds information stored as part of metadata 3450, where the object is known to always cross the midpoint, may be expressed as the lower bounds (LB) and upper bounds (UB) with the midpoint as the point of reference for the LB and UB, and can be used regardless of the size of the slot and in order to allow, among other things, a detection of buffer overflow. Advantageously, because the bounds information is stored in with the object in a slot, it can be, at substantially the same time as the object itself, made available to the processor, in this manner making memory operations more efficient than those of the prior art. Bounds information, according to some embodiments, allows a determination of the location of the allocation based on known midpoint reference and without the need to take up a large number of bits in the pointer where the slot and/or the allocation itself are large, especially where the number of bits in the pointer may not be sufficient to support a distance of the pointer value from the beginning of the allocation. A Po2 scheme as shown by way of example in FIG. 34 provides a compact encoding scheme where, every time a value is added in the size exponent field of the pointer, the slot size being referenced is doubled, instead of a linear scaling as afforded by the provision of distance information from a pointer value to the beginning of a referred to object. Thus, a limited size field can, in a Po2 scheme can be used to designate much larger slot sizes and objects than schemes of the prior art.

Although the memory controller circuitry 3472 is depicted in FIG. 34 as a being included in the processor circuitry 3470, in some embodiments, the processor circuitry 3470 may only include a portion of the memory controller circuitry 3472 or it may be entirely separate.

In response to execution of an instruction causing a memory access operation, the processor circuitry 3470 generates an encoded pointer 3480 that includes at least data representative of the memory address 3482 involved in the operation and data representative of the metadata 3484 associated with the memory allocation 3440 corresponding to the memory address 3482. The metadata 3484 may include at least one of bounds information or a compartment ID. The encoded pointer 3480 may include additional information, such as data representative of the size of the memory allocation 3440.

In some embodiments, the memory controller circuitry 3472 stores metadata 3484, carried by the encoded pointer 3480, with metadata 3450 at the midpoint address 3442 of the memory allocation 3440. If the metadata 3484 carried by the encoded pointer 3480 matches the metadata 3450 stored at the midpoint address 3442 of slot 3440, the memory controller circuitry 3472 completes the requested operation. If the metadata 3484 carried by the encoded pointer 3480 fails to match the metadata 3450 stored at the midpoint address 3442 of slot 3440, the memory controller circuitry 3472 returns an exception to the processor circuitry 3470.

The memory circuitry/cache circuitry 3471 may include any number and/or combination of electrical components, semiconductor devices, optical storage devices, quantum storage devices, molecular storage devices, atomic storage devices, and/or logic elements capable of storing information and/or data. All or a portion of the memory circuitry/cache circuitry 3471 may include transitory memory circuitry, such as RAM, DRAM, SRAM, or similar. All or a portion of the memory circuitry/cache circuitry 3471 may include non-transitory memory circuitry, such as: optical storage media; magnetic storage media; NAND memory; and similar. The memory circuitry/cache circuitry 3471 may include one or more storage devices having any storage capacity. For example, the memory circuitry/cache circuitry 3471 may include one or more storage devices having a storage capacity of about: 512 kiloBytes or greater; 1 megaByte (MB) or greater; 100 MB or greater; 1 gigaByte (GB) or greater; 100 GB or greater; 1 teraByte (TB) or greater; or about 100 TB or greater.

In the shown embodiment of FIG. 34, the memory controller circuitry 3472 apportions the memory circuitry/cache circuitry 3471 into any power of two number of slots 3440. In some embodiments, the memory controller circuitry 3472 may apportion the memory circuitry/cache circuitry 3471 into a single memory slot 3440 (i.e., a power of two=$2^m$, for a value of m that results in the entire system memory being covered). In other embodiments, the memory controller circuitry 3472 may apportion the memory circuitry/cache circuitry 3471 into two memory slots 3440 (i.e., a power of two=$2^{m-1}$). In other embodiments, the memory controller circuitry 3472 may apportion the memory circuitry/cache circuitry 3471 into four memory slots 3440 (i.e., a power of two=$2^{m-2}$). In other embodiments, the memory controller circuitry 3472 may apportion the memory circuitry/cache circuitry 3471 into "n" memory allocations 3440 (i.e., a power of two=$2^k$ for a value k that results in dividing the memory space into "n" slots). Importantly, note that the midpoint address 3442 in each of the memory slots 3440 does not align with the midpoint address in other memory slots, thereby permitting the storage of metadata 3450 that is unique to the respective memory slot 3440s. In some embodiments, the metadata 3450 may include any number of bits. For example, the metadata 3450 may include 2 bits or more, 4-bits or more, 6-bits or more; 8-bits or more, 16-bits or more, or 32-bits or more.

The encoded pointer 3480 includes the memory address 3482 to perform a memory operation (fetch, store, etc.). The memory address 3482 may include any number of bits. For example, the memory address 3482 may include: 8-bits or more; 16-bits or more, 32-bits or more; 48-bits or more; or 64-bits or more; 128-bits or more; 256-bits or more, 512-bits for more, up to 2 to the power of user linear address width-bits in terms of slot sizes being addressed. In embodiments, the metadata 3484 carried by the encoded pointer 3480 may include any number of bits. For example, the metadata 3484 may include 4-bits or more, 8-bits or more, 16-bits or more, or 32-bits or more. In embodiments, all or a portion of the address and/or tag data carried by the encoded pointer 3480 may be encrypted. In embodiments, the metadata 3450 may be loaded as a cache line (e.g., a 32-Byte block, 64-Byte block, or 128-Byte block, 256-Byte block or more, 512-Byte block, or a block size equal to a power of two-Bytes) into the processor cache circuitry 3471. In such embodiments, in performing memory operations on data stored in the processor cache circuitry 3471, the memory controller circuitry 3472 or other logic, e.g. in processor circuitry 3470, compares the metadata 3484 with the metadata 3450 stored on the cache line containing the requested memory address.

For memory operations occurring at memory addresses before the midpoint address 3442 of the allocation 3440 (i.e., the "hidden" address containing the tag data in metadata 3450), upon successful verification of the metadata 3450 with the metadata 3484 associated with the memory allocation 3440, the pointer 3480 may simply perform the operation at the indicated memory address 3482. For memory operations occurring at memory addresses after the midpoint address 3442 of the allocation 3440, the encoded pointer 3480 may be offset based on the size of the metadata 3450 stored in the memory allocation 3440. Thus, the presence of the metadata 3450 is "hidden" by the processor circuitry from software having access to the metadata using the encoded pointer 3480.

Figure 35:
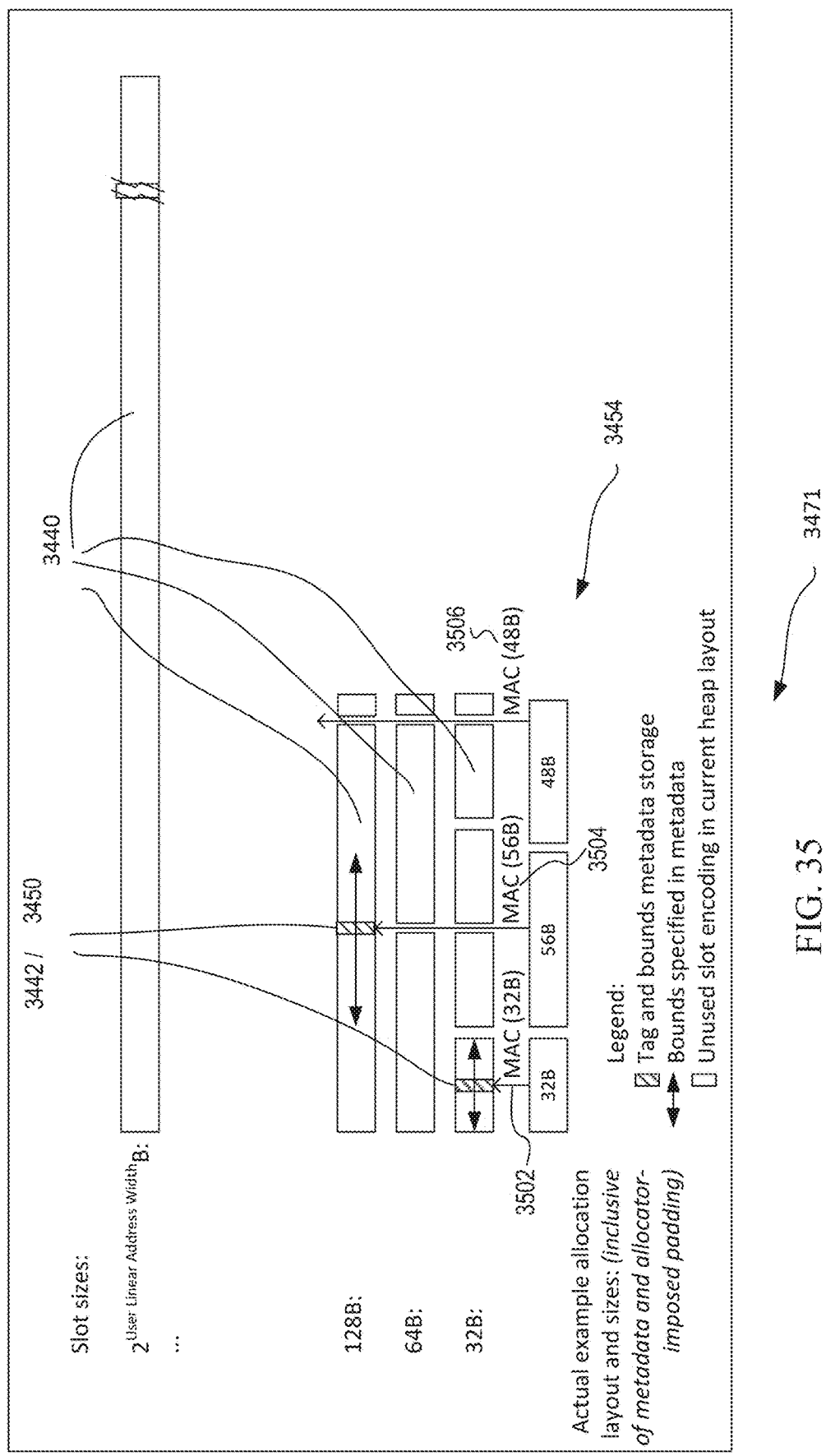
FIG. 35 is a schematic illustration of an enhanced memory allocation security check system according to an embodiment.

FIG. 35 is a schematic illustration of a portion of the memory circuitry/cache circuitry 3471 of the memory allocation security check system of FIG. 34 where storing metadata at a midpoint of a memory allocation is enhanced with a data integrity capability. Data integrity is provided by message authentication codes (MACs) stored in the metadata section, at the midpoint of a memory allocation. The portion of memory circuitry/cache circuitry 3471 shown in FIG. 35 shows message authentication codes 3502, 3504, and 3506 stored in the metadata 3442/3450 of different memory allocations 3454 of different slots 3440. The MACs 3502, 3504, and 3506 are integrity values generated for data stored in respective allocations. In one embodiment, a MAC store in the metadata of a particular allocation can be computed over the data (or slices of the data) stored in that allocation. MAC 3502 is computed over data stored in a 32-byte allocation and is stored in the metadata of that 32-byte allocation, MAC 3504 is computed over data stored in a 56-byte allocation and is stored in the metadata of that 56-byte allocation, and MAC 3506 is computed over data stored in a 48-byte allocation and is stored in the metadata of that 48-byte allocation.

Any suitable MAC algorithm can be used to compute the MAC. For instance, a keyed-hash MAC (HMAC) may be used with the following variables:

$$MAC=HMAC(cc\_key, slice\_data \| slice\_address)$$

In this example, the HMAC algorithm is applied to a slice of the data concatenated with a slice of the memory address of the allocation. A key is used as input. In some embodiments, the key may be process-specific (i.e., used to encrypt and decrypt data associated with a particular process). In other cases, the key may be generated or derived randomly or in any other suitable manner based on particular needs and implementations. The HMAC algorithm may be any suitable hash function, including but not necessarily limited to, Secure Hash Algorithm (e.g., SHA1, SHA2, SHA3) or a Message Digest 5 (MD5). In other embodiments, the MAC algorithm may not require a key as input.

Storing MAC values generated for data (also referred to herein as "data MACs"), is an efficient way to store and find an authentication code without using the limited available bits in the pointer. Moreover, the integrity verification can be performed on at the time of a read request, which is both efficient and useful in protecting against use-after-free or buffer-overflow safety breaches. It can also protect against bypass reads and writes if the operating system maps a page to another entity and they access override data. In this scenario, the operating system would not be able to generate an integrity value that would match the data, because only the entity that accesses the data has the right key to generate the integrity value and verify it on reads.

Figure 36:
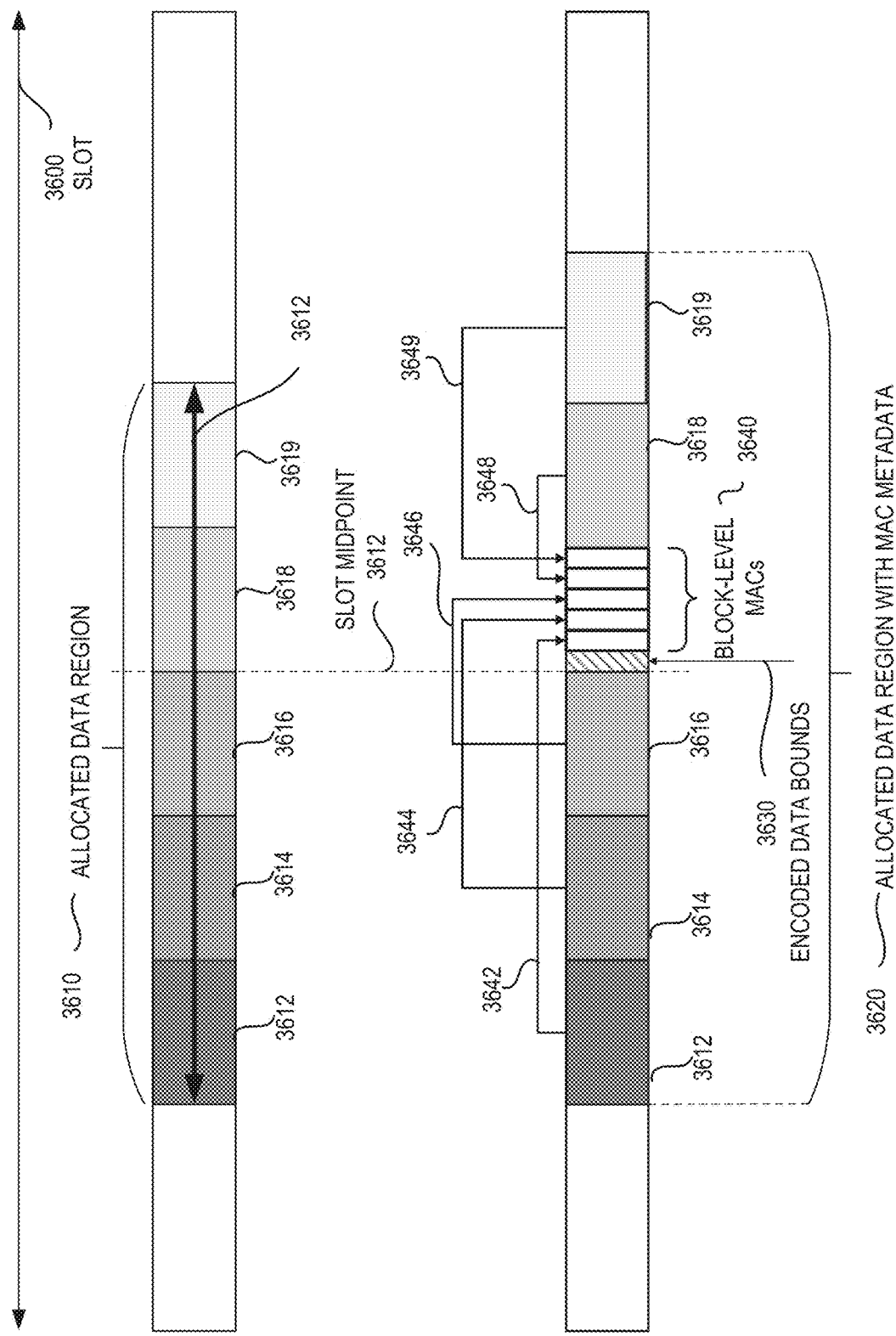
FIG. 36 is a schematic illustration of an example memory allocation according to an embodiment.

FIG. 36 is a schematic illustration of an example memory allocation of a memory allocation security check system according to an embodiment. FIG. 36 shows two examples of memory allocation in a slot 3600 of memory with a midpoint 3612. A first allocated data region 3610 includes stored data divided into five portions (or "data slices") 3612, 3614, 3616, 3618, and 3619, and these data slices can be aligned.

A second allocation of the same data region 3620 shows MAC values computed over each data slice and stored in metadata at the midpoint address 3612 together with data bounds information 3630. The data bounds information 3630 defines a valid data region. Each MAC verifies a respective data slice of the data of a fixed size (e.g., 16B, 32B, 64B, etc.). Each MAC can be a fixed size as well (e.g., 4B). The MACs may be calculated for each data slice using an application-specific MAC key as well as the encoded pointer to the particular data slice as tweak. Using a tweak cryptographically binds the data to its address to avoid forgeries by moving a data and MAC pair to a different data and MAC address. The MAC key can be independent or derived from another process-specific cryptographic key. If the data at the start or the end of the allocation does not align with the data slice, it is padded with a fixed value (e.g., zeros) for MAC calculation.

In this example, MAC 3642 is computed over data slice 3612, MAC 3644 is computed over data slice 3614, MAC 3646 is computed over data slice 3616, MAC 3648 is computed over data slice 3618, MAC 3649 is computed over data slice 3619. The MACs may be stored consecutively adjacent to the data bounds information 3630, shown as block-level MACs 3640. In some embodiments, a MAC may also be generated and stored to protect the integrity of the bounds metadata.

In operation, the data blocks (also referred to herein as "data slices") and MACs are to be initialized when memory is allocated for the data (e.g., during the malloc routine). When the memory is de-allocated, the MACs are cleared to avoid data re-use. During runtime of a process, MACs are updated on write operations and checked on both write and read operations. If data access spans across multiple data slices, all corresponding MACs are to be verified or updated. If a MAC mismatch occurs, the application may receive a "data corruption" exception.

The example memory allocation with data divided into multiple data slices and verified by respective MACs can offer significant advantages. In a traditional approach where a MAC is computed over all of the data in a memory allocation, all of the data in that allocation has to be read and a MAC has to be computed over all of the data even if only a small portion of the data is being accessed. With the embodiment shown in FIG. 36, however, incremental updates are enabled so that, if only a small portion of data is being accessed, then only that portion (or slice) of the data needs to read and the MAC can be recalculated using just that portion of the data.

Figure 37:
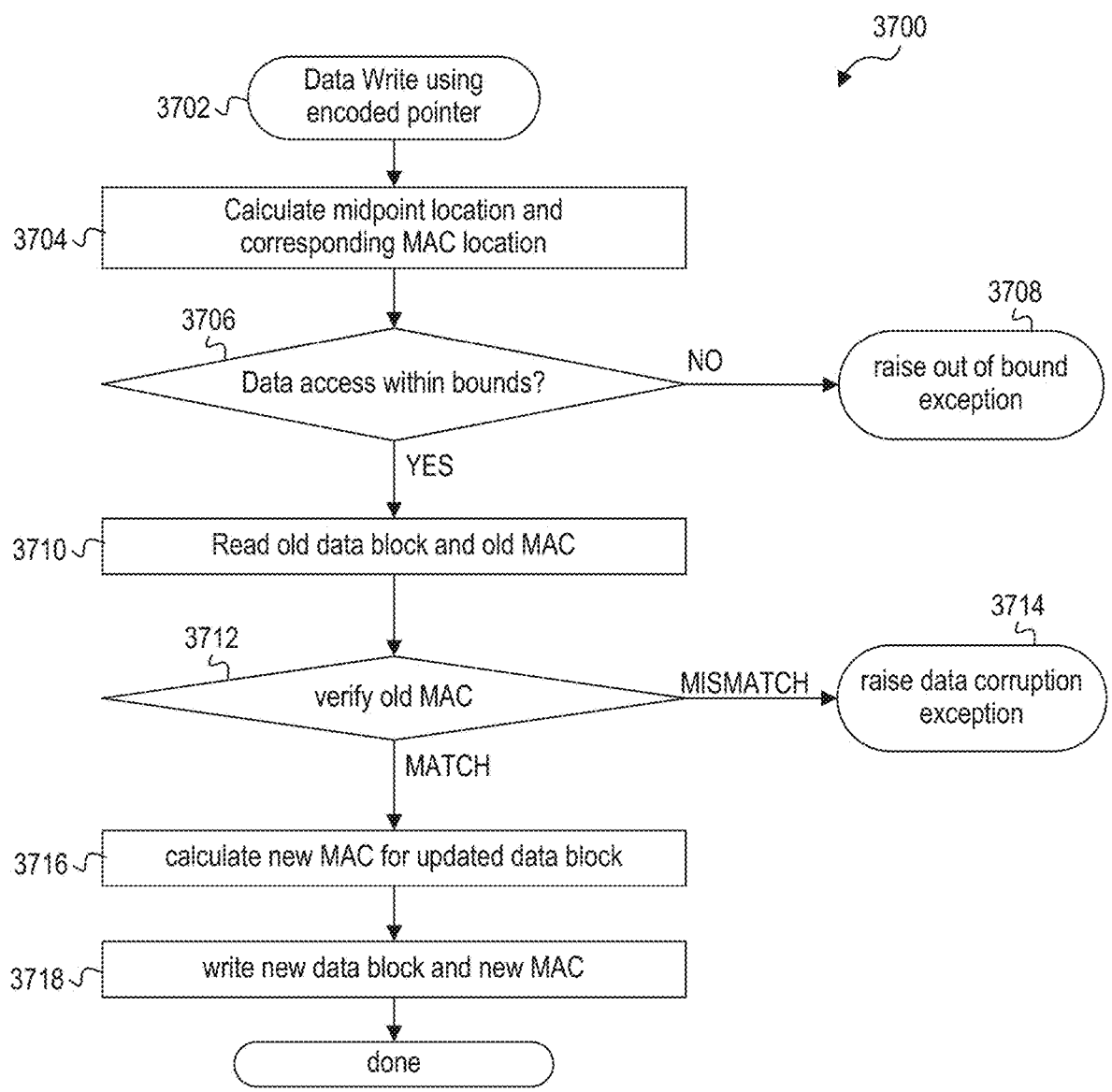
FIG. 37 is a flow diagram of an example process related to a write operation according to an embodiment.

FIG. 37 is a flow diagram of an example process 3700 related to performing a write operation using an encoded pointer according to an embodiment. At 3702, a data write operation is attempted using an encoded pointer. At 3704, a midpoint address of the allocated memory is calculated. By calculating the midpoint address of the memory allocation for the data, the location of the MAC corresponding to the requested data can be calculated. It should be noted that, if the memory allocation is configured with interleaved MACs (e.g., FIG. 36), then the processor (e.g., 102) translates the data addresses on the write operation in order to account for the interleaved MACs. In this scenario, the translated address is computed based on the number of data slices, the size of the data slices, and the size of the interleaved metadata.

At 3706, a determination is made as to whether the data access is within the bounds of the valid data region within the particular allocation (e.g., slot) of memory. If it is not, then an exception is raised at 3708. In some embodiments, bounds checks may be skipped during writes to instead rely upon the MAC check to detect out-of-bounds accesses. If the requested data is within the bounds (e.g., upper bound and lower bound) of the valid data region, then at 3710, the old data block and the old MAC currently stored in the allocation are read. At 3712, the MAC can be verified to ensure that the data in the allocation has not been corrupted. In one example, a data MAC algorithm (e.g., one-way hash with or without a key) may be performed on the old data block to compute a MAC. The computed MAC can be compared to the MAC read from the allocation. If the computed MAC and the MAC read from memory do not match, then a data corruption exception can be raised at 3714. However, if the computed MAC and the MAC read from memory match, then at 3716, the data can be returned to the core (e.g., from the memory controller circuitry).

Figure 38:
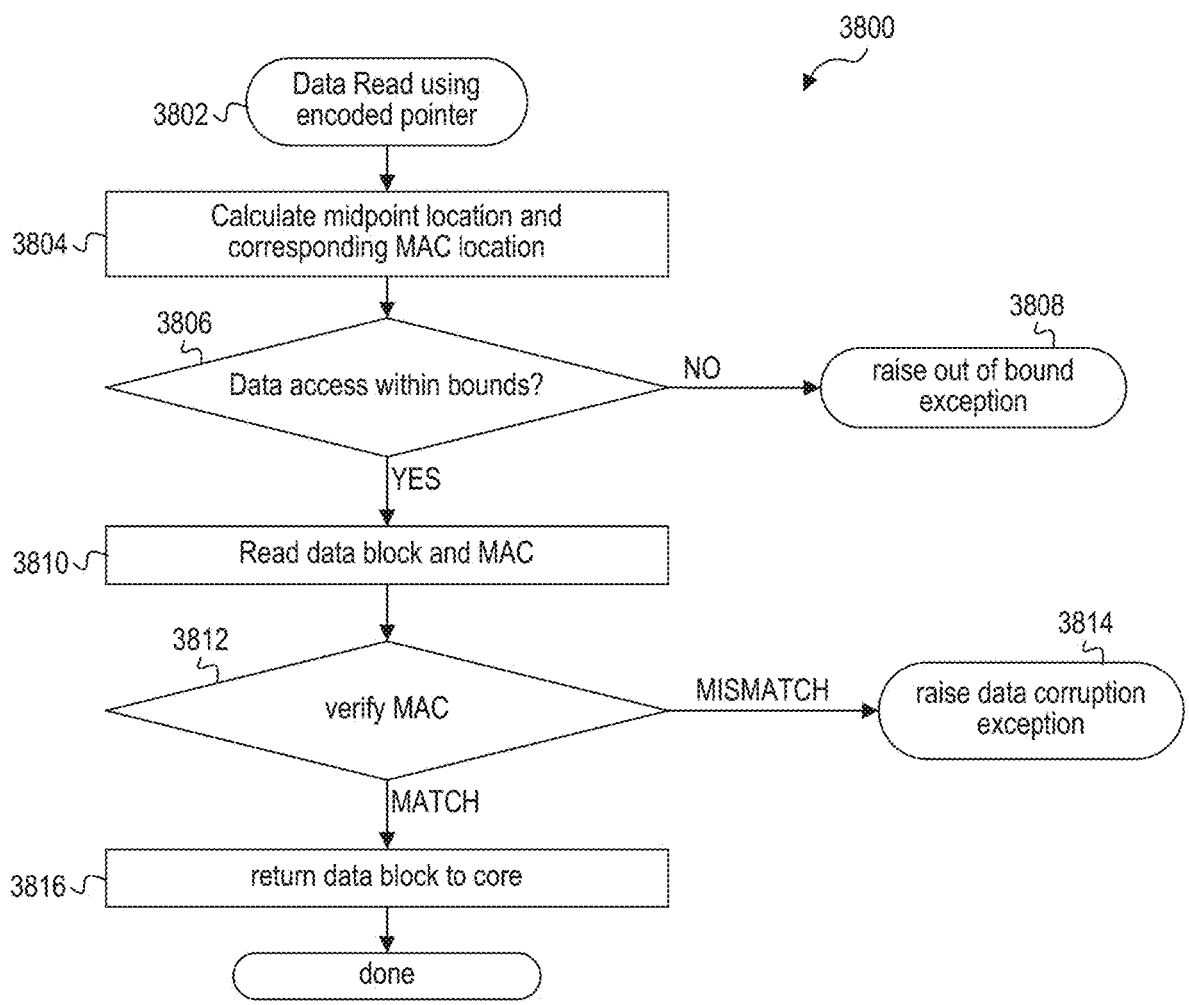
FIG. 38 is a flow diagram of an example process related to a read operation according to an embodiment.

FIG. 38 is a flow diagram of an example process 3800 related to performing a read operation using an encoded pointer according to an embodiment. At 3802, a data read operation is attempted using an encoded pointer. At 3804, a midpoint address of the allocated memory is calculated. By calculating the midpoint address of the memory allocation for the data, the location of the MAC corresponding to the requested data can be calculated. It should be noted that, if the memory allocation is configured with interleaved MACs (e.g., FIG. 36), then the processor (e.g., 102) translates the data addresses on the read operation in order to account for the interleaved MACs.

At 3806, a determination is made as to whether the data access is within the bounds of the valid data region within the particular allocation (e.g., slot) slot of memory. If it is not, then an exception is raised at 3808. In some embodiments, bounds checks may be skipped during reads to instead rely upon the MAC check to detect out-of-bounds accesses. If the requested data is within the bounds of the valid data region, then at 3810, the data block and the MAC stored in the data block are read. At 3812, the MAC can be verified. In one example, a data MAC algorithm (e.g., one-way hash with or without a key) may be performed on the data to compute a MAC. The computed MAC can be compared to the MAC read from the memory. If the computed MAC and the MAC read from memory do not match, then a data corruption exception can be raised at 3814. However, if the computed MAC and the MAC read from memory match, then at 3816, the data can be returned to the core (e.g., from the memory controller circuitry).

Figure 39:
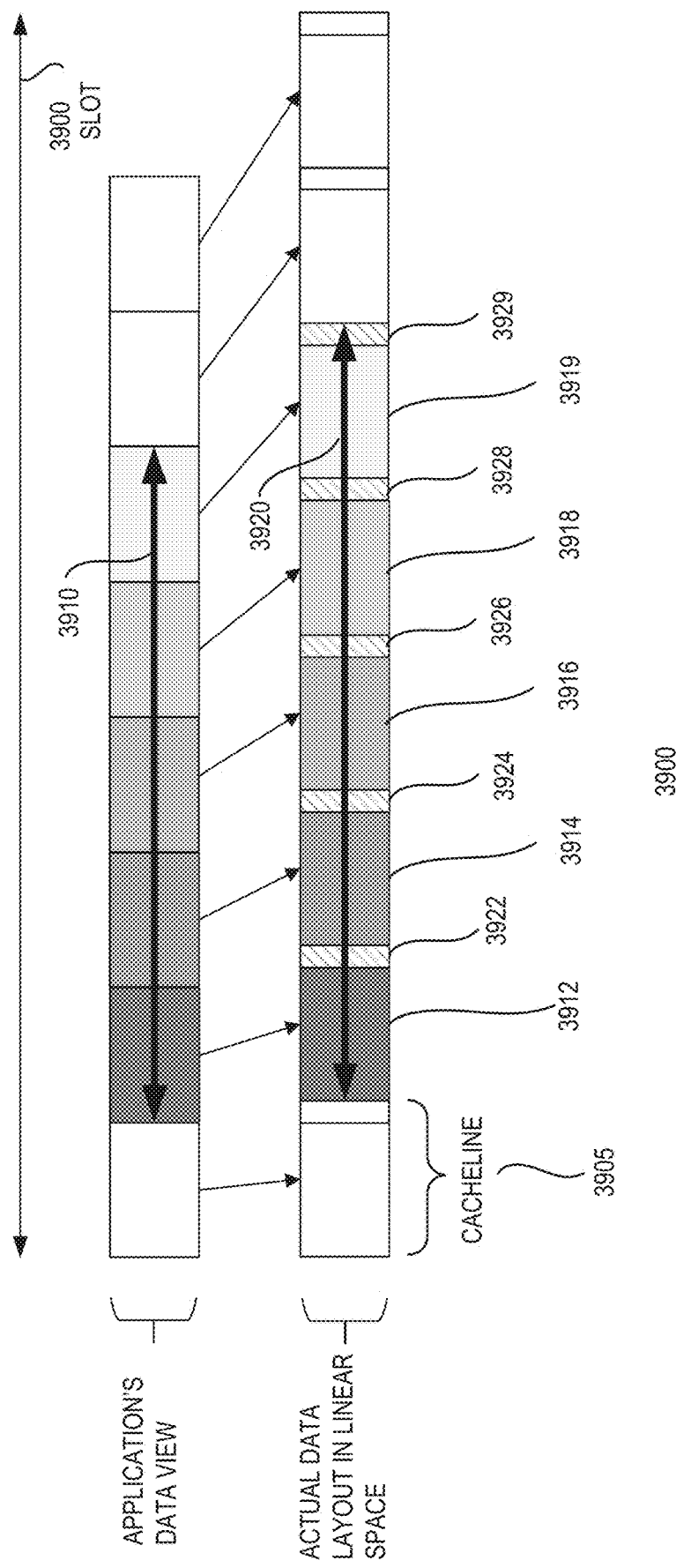
FIG. 39 is a schematic illustration of an alternative memory allocation security check system according to an embodiment.

FIG. 39 is a schematic illustration of an alternative example memory allocation of a memory allocation security check system according to an embodiment. FIG. 39 shows two examples of memory allocation in a slot 3900 of memory. A first allocated data region shows an allocation 3910 as the allocation appears to an application. The allocation 3900 contains stored data (or a "data block") divided into five portions (or "data slices") 3912, 3914, 3916, 3918, and 3919. A second allocation 3920 of the same data region shows the actual data layout in linear space. The data slices are packed together with their MACs 3912, 3914, 3916, 3918, and 3919 within the data allocation 3920. In this example, each data and MAC pair occupies exactly one cacheline 3905. This can be advantageous because, since the MACs are co-located with the data, the overhead of fetching the MACs from different cachelines can be reduced.

In this example, a memory allocator (e.g., 144, 146) needs to allocate additional bytes in order to account for the interleaved MACs. In addition, the processor (e.g., 102) needs to translate the data addresses on memory accesses in order to account for interleaved MACs.

Figure 40:
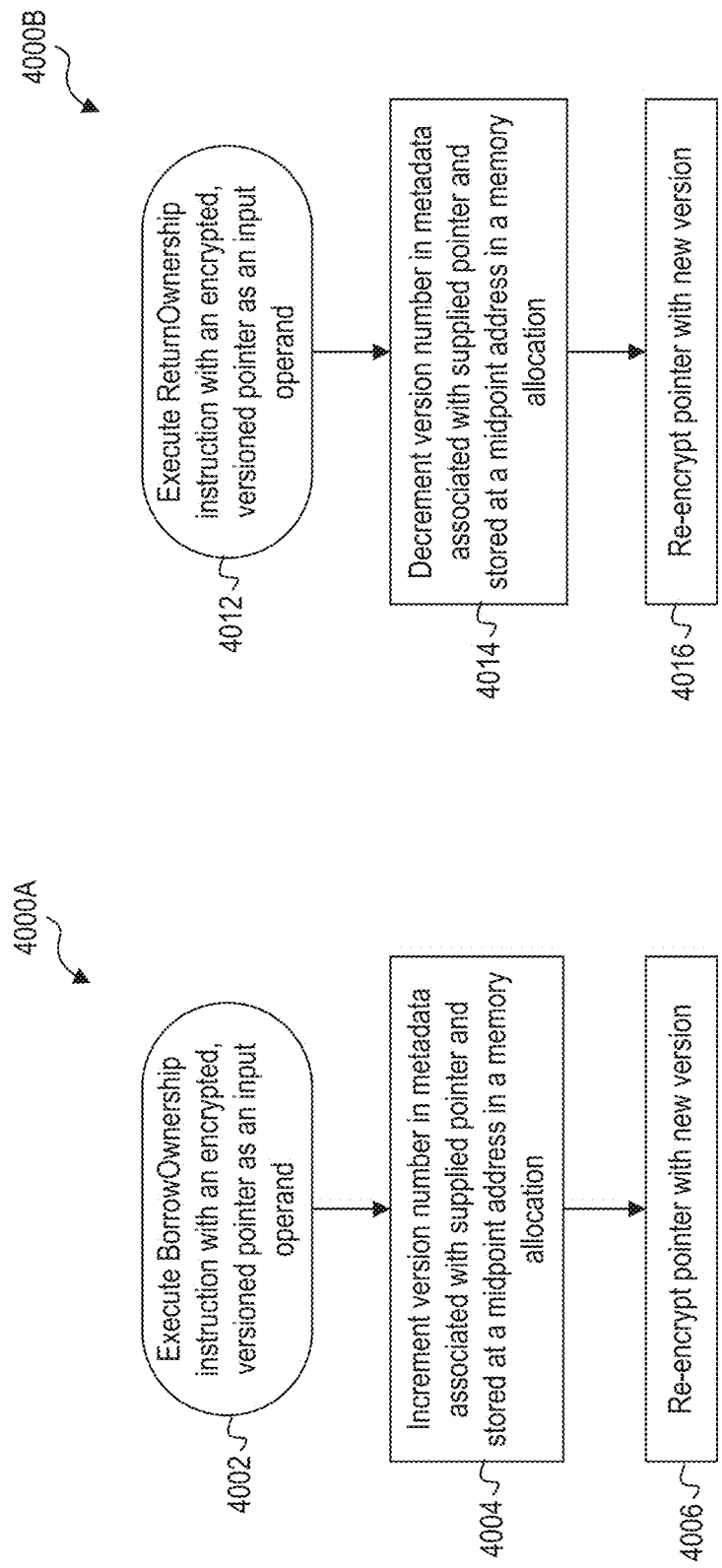
FIG. 40A is a flow diagram illustrating an example operation of an instruction to return an object in cryptographic computing, according to at least one embodiment.
FIG. 40B is a flow diagram illustrating an example operation of an instruction to return an object in cryptographic computing, according to at least one embodiment.

FIG. 40A-40B are flow diagrams 4000A-4000B illustrating example operations of a BorrowOwnership instruction and a ReturnOwnership instruction for 128-bit pointers for temporarily changing ownership of an object. In one example, the instructions can have the following formats:

BorrowOwnership r128

ReturnOwnership r128

The BorrowOwnership instruction transfers ownership of an object from an input pointer to a new pointer, in the combined source/destination operand. The BorrowOwnership instruction includes one operand, which is a 128-bit register containing an encrypted, versioned pointer as the input operand. The BorrowOwnership instruction first checks that the previous version number in the pointer operand matches the previous version number in the associated metadata for the object. The ownership transfer is accomplished by incrementing a large version field in the 128-bit pointer and also updating the current version field to match in the associated metadata for the object. The object may be stored using memory allocations where metadata is stored at the midpoint address of the allocation. Alternatively, the BorrowOwnership instruction may accept an additional source operand containing an updated value to use for the version fields in the pointer and associated metadata for the object rather than incrementing the current value. Although these instructions are described with reference to 128-bit pointers, it should be apparent that the concepts described herein are not so limited. Indeed, concepts related to Borrow and Return Ownership instructions, as well as other concepts disclosed herein, may be applicable to 32-bit pointers, 64-bit pointers, 256-bit pointers, etc.

The flow diagram 4000A of FIG. 40A illustrates an example operation of a BorrowOwnership instruction 4002. The instruction includes an encrypted, versioned pointer as an input operand. The memory address may reference a memory allocation for an object in which metadata is stored at a midpoint address in the memory allocation. At 3104, the version number in metadata associated with the supplied pointer and stored at a midpoint address in the memory allocation referenced by the pointer can be incremented. The version number encoded in the supplied pointer can also be incremented to match the version number in the metadata. At 4006, the pointer can be re-encrypted with the new version number.

The ReturnOwnership instruction may be used following a BorrowOwnership instruction to return ownership of the 'borrowed' object. The ReturnOwnership instruction includes one operand, which is a 128-bit register containing an encrypted, versioned pointer (which was generated during the BorrowOwnership instruction at 4006) as the input operand. The ReturnOwnership instruction first checks that the previous version number in the pointer operand matches the previous version number in the associated metadata for the object. The ownership return to can be accomplished by decrementing a large version field in the 128-bit pointer and also decrementing the version number in the associated object metadata.

The flow diagram 4000B of FIG. 40B illustrates an example operation of a ReturnOwnership instruction 4002. The instruction includes an encrypted, versioned pointer as an input operand. At 4014, the version number in metadata associated with the supplied pointer and stored at a midpoint address in the memory allocation referenced by the pointer can be decremented. In addition, the version number encoded in the supplied pointer can also be decremented to match the version number in the metadata. At 4016, the pointer can be re-encrypted with the new version number. Alternatively, the BorrowOwnership instruction may also be used when returning ownership in cases when the software is able to replace any copy of the pointer to that allocation that may be subsequently used. In that case, instead of incrementing the version field, the BorrowOwnership instruction may randomize the version field.

Figure 41:
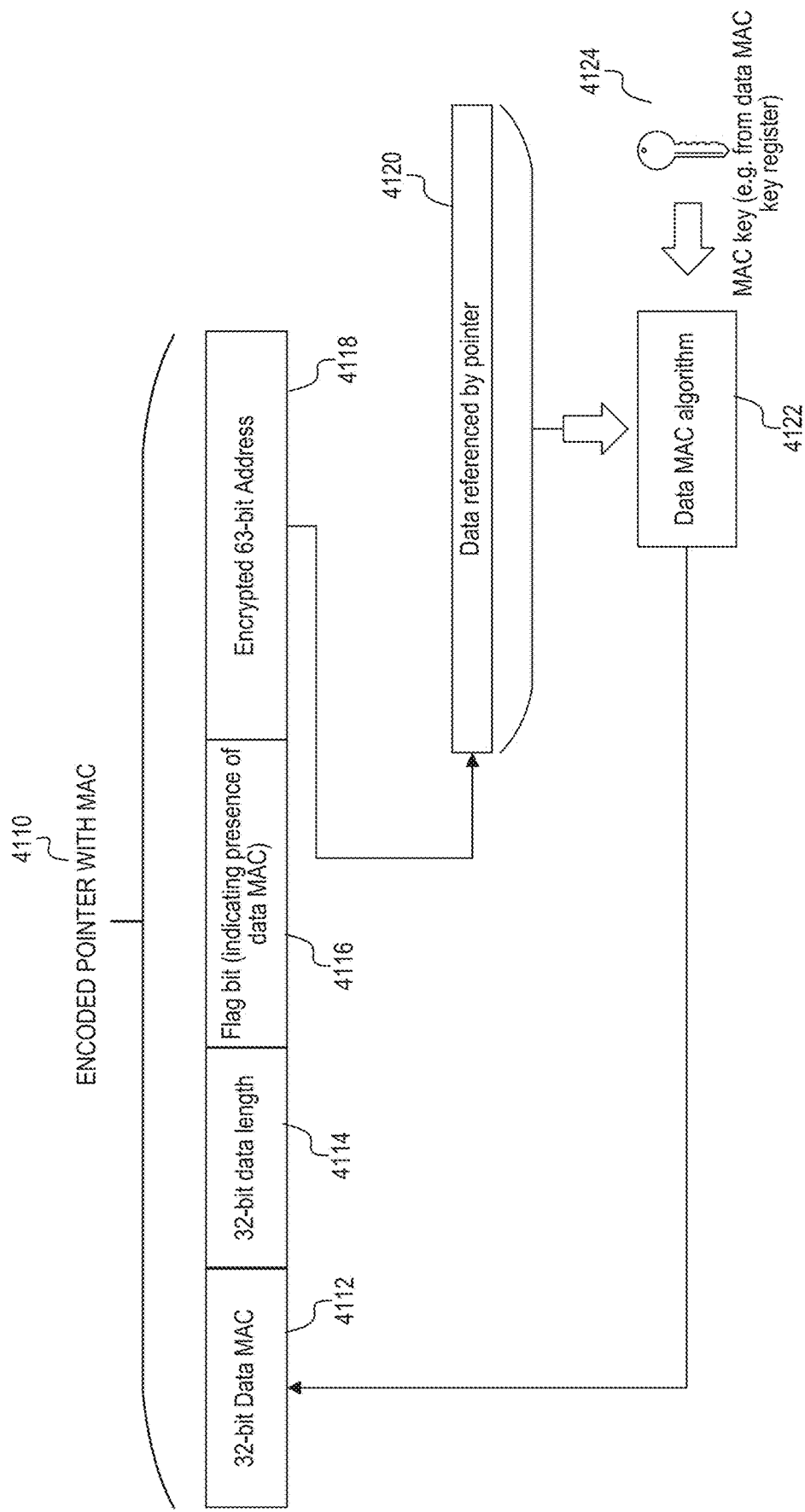
FIG. 41 a schematic diagram of an illustrative encoded pointer format according to one embodiment.
Figure 42:
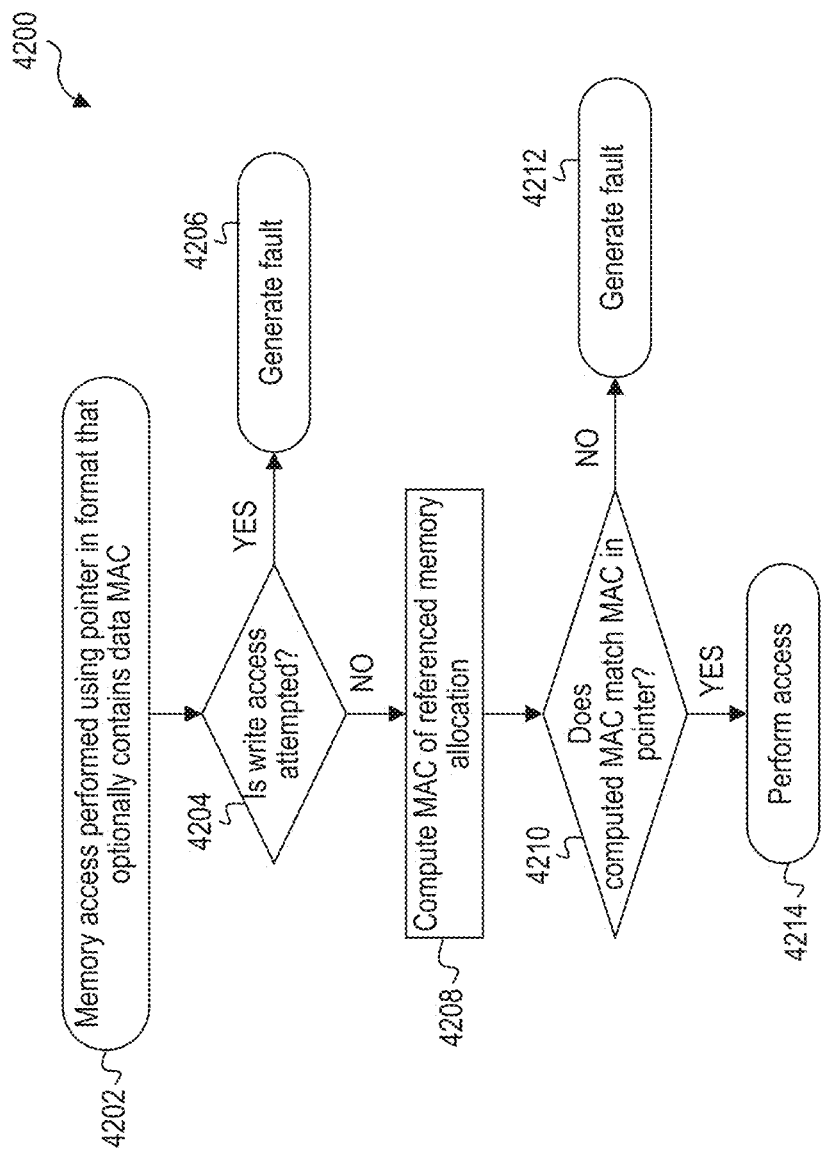
FIG. 42 is a flow diagram of an example process related to the encoded pointer of FIG. 41 according to an embodiment.

FIGS. 41 and 42 are related to additional options for providing security when implementing 128-bit pointers. Using a 128-bit pointer as opposed to a smaller pointer (e.g., 64-bit pointer) provides additional bits within the pointer that can be encoded with security metadata. In one example, a data integrity value or message authentication code (MAC) may be carried in its corresponding data pointer to enable simplified and efficient integrity checks of data during memory accesses. This can be particularly useful when referencing immutable object. In this example, the integrity of an immutable object can be validated by storing a MAC of the immutable objects (i.e., code and/or data that is not modified or modifiable) in the pointer.

FIG. 41 is a schematic diagram of an example 128-bit encoded pointer 4110 according to an embodiment. In this example, pointer 4110 can be encoded with a linear address portion 4118, a flag bit portion 4116, a data length portion 4114, and a data message authentication code (MAC) portion 4112. By way of illustration, but not of limitation, the linear address can be encoded in a 63-bit portion 4118, the flag bit can be encoded in a 1-bit portion 4116, the data length can be encoded in a 32-bit portion 4114, and the data MAC can be encoded in a 32-bit portion 4112.

The encrypted address 4118 portion can include a portion of the address bits of a 128-bit linear address. The encrypted address 4118 can be decrypted to obtain a linear address that corresponds to a memory location where data (or code) is stored. The decryption can be performed using any suitable decryption algorithms including the ones disclosed herein (e.g., 64 bit, 48 bit, 32 bit, 16 bit, etc. block cipher using Simon, Speck, tweakable K-cipher, PRINCE or any other block cipher) and potentially others. In at least some scenarios, a key may be used as input in the decryption. In at least some implementations, a process-specific pointer key may be used for the decryption of the encrypted address in the encoded pointer 3810. In addition, a tweak may also be used as input to the decryption. A tweak may contain a least a portion of the linear address and potentially other metadata.

In some scenarios, the decrypted address from the encrypted address portion 4110 can be combined with upper address bits (e.g., stored in a register or other memory) to obtain the full linear address. The linear address references data (or code) 4120 stored in memory. The 32-bit data length portion 4114 in the encoded pointer 4110 contains a value that represents the length of the data (or code) 4120 that is referenced by the pointer. The 32-bit data MAC portion 4112 can include a message authentication code generated by a data MAC algorithm 4122 that takes the data (or code) 4120 as input. In some scenarios the data MAC algorithm 4122 also has MAC key input, which may be stored in a data MAC key register. For example, a keyed-hash message authentication code (HMAC) may be calculated as follows:

MAC=HMAC(cc_key,slice_data||slice_address)

In other scenarios, the data MAC algorithm may be a one-way hash that does not require a key input. Any suitable algorithm may be used to provide a secure data MAC, such as a one-way hash function including, but not necessarily limited to, Secure Hash Algorithm (e.g., SHA-3, SHA-2, etc.) or Message Digest (e.g., MD4, MD5).

FIG. 42 is a flow diagram of an example process 4200 for verifying a MAC in a pointer during a memory access operation according to an embodiment. One or more operations of process 4200 may be performed, for example, by cryptographic computing engines and/or memory controller circuitry. As indicated at 4202, process 4200 is related to a memory access being performed using a pointer in a format that optionally contains a data MAC (e.g., 4110). At 4204, a memory access attempt is detected. If the memory access is an attempted write operation, then at 4206 a fault may be generated. This may occur because the pointer is referencing an immutable object and such objects are not allowed to be updated via a write operation through the pointer. If the memory access attempt is another operation such as a read operation, then at 4208, the linear address in the pointer can be decrypted to identify and locate the referenced memory allocation. A MAC can be computed over the referenced memory allocation using the same data MAC algorithm (e.g., 4122) and data MAC key (e.g., 4124), if any, to obtain a computed MAC.

At 4220, a comparison can be made between the computed MAC and the data MAC stored in the pointer (e.g., 4112). If the computed MAC and the data MAC stored in the pointer do not match, then at 4212, a fault can be generated. However, if the computed MAC and the data MAC stored in the pointer match, then at 4214 the attempted memory access can be performed.

EXAMPLES

Example DA1 provides apparatus comprising: a processor including a register to store an encoded pointer to a memory location in a memory allocation for a data region, where the encoded pointer is to include at least a portion of a linear address corresponding to the memory location; circuitry to: in response to a memory access request to access the memory location, calculate a midpoint address of the memory allocation and use the midpoint address to calculate a second memory address for a first message authentication code (MAC) associated with first data stored at the memory location; read the first MAC at the second memory address; read the first data from the memory location corresponding to the linear address; determine that the first data is not corrupted based, in part, on the first MAC; and in response to determining that the first data is not corrupted, allow the memory access request to be performed.

Example DA2 comprises the subject matter of Example DA1, and the circuitry is further to: compute a second MAC of the first data; and compare the second MAC to the first MAC, where the determination that the first data is not corrupted is in response to the first MAC matching the second MAC.

Example DA3 comprises the subject matter of any one of Examples DA1-DA2, and the memory access request is a write request.

Example DA4 comprises the subject matter of Example DA3, and the circuitry is further to: translate a third memory address of the first data to a fourth memory address, where the fourth memory address is computed based on the third memory address, a number of data blocks in the data region, a size of one or more data blocks in the data region, and a size of a metadata portion interleaved with each data block.

Example DA5 comprises the subject matter of any one of Examples DA3-DA4, and the circuitry is further to: In response to determining that the first data is not corrupted, calculate a new MAC for the first data; and store the new MAC and new data to the memory location.

Example DA6 comprises the subject matter of any one of Examples DA1-DA2, and the memory access request is a read request.

Example DA7 comprises the subject matter of Example DA6, and the circuitry is further to: determine whether the first data is stored within an upper bound and a lower bound of the data region, where, in response to determining that the first data is stored within an upper bound and a lower bound of the data region, the first MAC is to be read at the second memory address and the first data is to be read at the memory location corresponding to the linear address.

Example DA8 comprises the subject matter of any one of Examples DA1-DA7, and the first MAC is stored in a metadata portion of the memory allocation, the metadata portion adjacent to a midpoint of the memory allocation.

Example DA9 comprises the subject matter of any one of Examples DA1-DA7, and the first MAC is stored between the first data and second data in the memory allocation, where one or more other data.

Example DA10 comprises the subject matter of any one of Examples DA1-DA9, and the circuitry is further to: compute a second MAC of the first data using a data key and at least a portion of the linear address of the encoded pointer that references the memory location.

Example DB1 provides method comprising: creating an interrupt descriptor in a memory for a first process; in response to receiving, by processor circuitry, a memory access request to access a memory location in a memory allocation for a data region, calculating a midpoint address of the memory allocation, where the memory location is referenced by an encoded pointer that includes at least a portion of a linear address of the memory location; calculating, based on the midpoint address, a second memory address for a first message authentication code (MAC) associated with first data stored at the memory location; reading the first MAC at the second memory address; reading the first data from the memory location corresponding to the linear address in the encoded pointer; determining that the first data is not corrupted based, in part, on the first MAC; and in response to determining that the first data is not corrupted, allowing the memory access request to be performed.

Example DB2 comprises the subject matter of Example DB1, and the method further includes computing a second MAC of the first data; and comparing the second MAC to the first MAC, where the determination that the first data is not corrupted is in response to the first MAC matching the second MAC.

Example DB3 comprises the subject matter of any one of Examples DB1-DB2, and the memory access request is a write request.

Example DB4 comprises the subject matter of Example DB3, and the method further includes: translating a third memory address of the first data to a fourth memory address, where the fourth memory address is computed based on the third memory address, a number of data blocks in the data region, a size of one or more data blocks in the data region, and a size of a metadata portion interleaved with each data block.

Example DB5 comprises the subject matter of any one of Examples DB3-DB4, and the method further includes in response to determining that the first data is not corrupted, calculating a new MAC for the first data; and storing the new MAC and new data to the memory location.

Example DB6 comprises the subject matter of any one of Examples DB1-DB2, and the memory access request is a read request.

Example DB7 comprises the subject matter of Example DB6, and the method further includes: determining whether the first data is stored within an upper bound and a lower bound of the data region, where, in response to determining that the first data is stored within an upper bound and a lower bound of the data region, reading the first MAC at the second memory address and reading the first data at the memory location corresponding to the linear address.

Example DB8 comprises the subject matter of any one of Examples DB1-DB7, and the first MAC is stored in a metadata portion of the memory allocation, the metadata portion adjacent to a midpoint of the memory allocation.

Example DB9 comprises the subject matter of any one of Examples DB1-DB7, and the first MAC is stored between the first data and second data in the memory allocation, where one or more other data.

Example DB10 comprises the subject matter of any one of Examples DB1-DB9, and the method further includes: computing a second MAC of the first data using a data key and at least a portion of the linear address of the encoded pointer that references the memory location.

Example DC1 includes an apparatus comprising means to perform one or more elements of a method of any one of Examples DB1-DB10.

Example DD1 includes one or more non-transitory computer-readable media comprising instructions to cause an electronic device, upon execution of the instructions by one or more processors of the electronic device, to perform one or more elements of a method of any one of Examples DB1-DB10.

Example DE1 includes machine-readable storage including machine-readable instructions which, when executed, implement the method of any one of Examples DB1-DB10.

Example DF1 includes an apparatus comprising: one or more processors and one or more computer-readable media comprising instructions that, when executed by the one or more processors, cause the one or more processors to perform the method of any one of Examples DB1-DB10.

Example DB11 comprises the subject matter any one of Examples DB1-DB10, and further comprises the steps of the method of any one of other method Examples herein (as far as those method steps are not redundant with method steps of Examples DB1-DB10).

FIGS. 43-47 below provide some example computing devices, computing environments, hardware, software or flows that may be used in the context of embodiments as described herein.

FIG. 43 is a block diagram illustrating an example cryptographic computing environment 4300 according to at least one embodiment. In the example shown, a cryptographic addressing layer 4310 extends across the example compute vectors central processing unit (CPU) 4302, graphical processing unit (GPU) 4304, artificial intelligence (AI) 4306, and field programmable gate array (FPGA) 4308. For example, the CPU 4302 and GPU 4304 may share the same virtual address translation for data stored in memory 4312, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 4312 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 44:
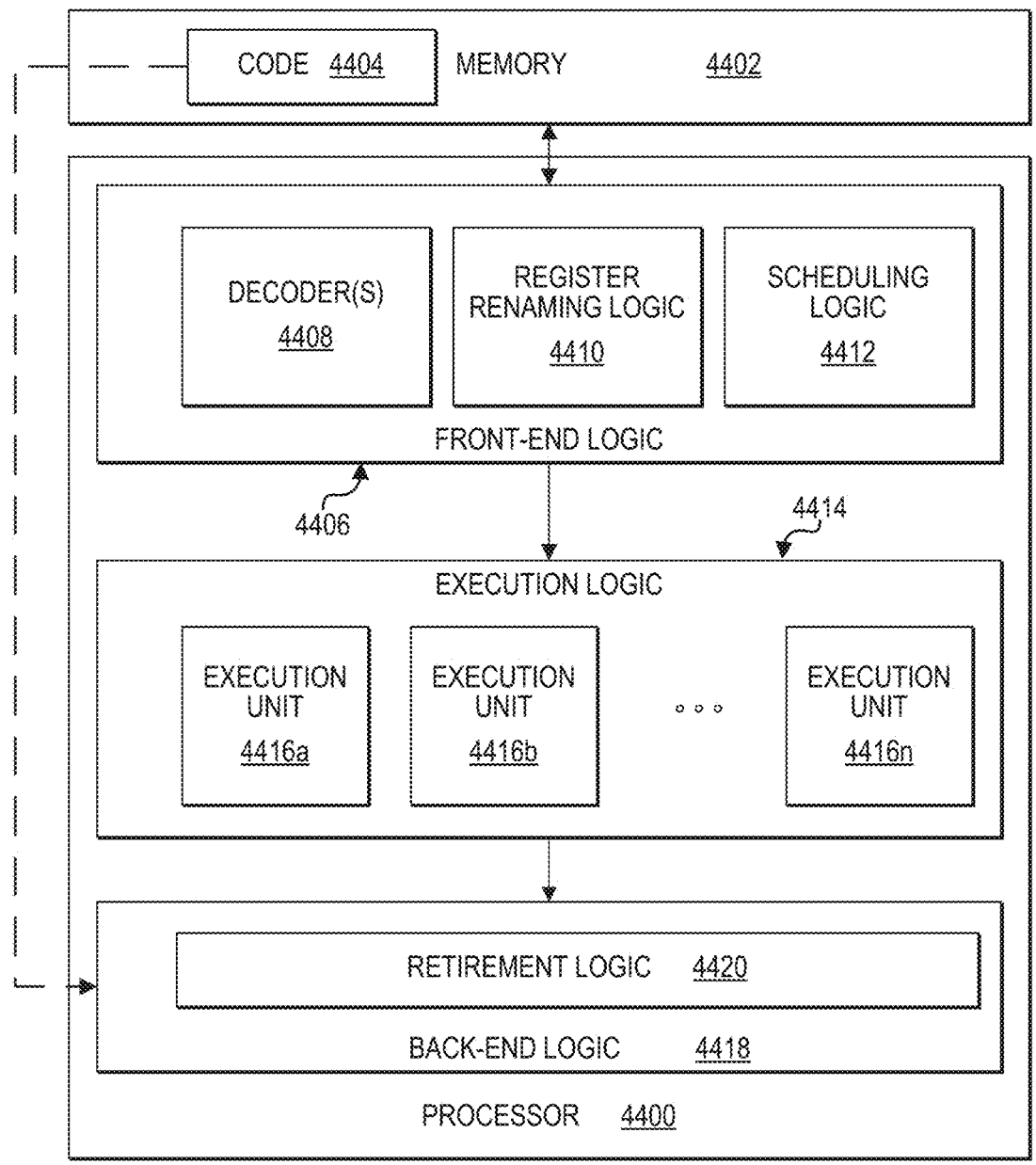
FIG. 44 is a block diagram illustrating an example processor according to at least one embodiment.

FIGS. 44-14 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 44-46.

FIG. 44 is an example illustration of a processor according to an embodiment. Processor 4400 is an example of a type of hardware device that can be used in connection with the implementations shown and described herein (e.g., processor 102). Processor 4400 may be any type of processor, such as a microprocessor, an embedded processor, a digital signal processor (DSP), a network processor, a multi-core processor, a single core processor, or other device to execute code. Although only one processor 4400 is illustrated in FIG. 44, a processing element may alternatively include more than one of processor 4400 illustrated in FIG. 44. Processor 4400 may be a single-threaded core or, for at least one embodiment, the processor 4400 may be multi-threaded in that it may include more than one hardware thread context (or "logical processor") per core.

FIG. 44 also illustrates a memory 4402 coupled to processor 4400 in accordance with an embodiment. Memory 4402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 4400 can execute any type of instructions associated with algorithms, processes, or operations detailed herein. Generally, processor 4400 can transform an element or an article (e.g., data) from one state or thing to another state or thing.

Code 4404, which may be one or more instructions to be executed by processor 4400, may be stored in memory 4402, or may be stored in software, hardware, firmware, or any suitable combination thereof, or in any other internal or external component, device, element, or object where appropriate and based on particular needs. In one example, processor 4400 can follow a program sequence of instructions indicated by code 4404. Each instruction enters a front-end logic 4406 and is processed by one or more decoders 4408. The decoder may generate, as its output, a micro operation such as a fixed width micro operation in a predefined format, or may generate other instructions, microinstructions, or control signals that reflect the original code instruction. Front-end logic 4406 also includes register renaming logic 4410 and scheduling logic 4412, which generally allocate resources and queue the operation corresponding to the instruction for execution.

Processor 4400 can also include execution logic 4414 having a set of execution units 4416a, 4416b, 4416n, etc. Some embodiments may include a number of execution units dedicated to specific functions or sets of functions. Other embodiments may include only one execution unit or one execution unit that can perform a particular function. Execution logic 4414 performs the operations specified by code instructions.

After completion of execution of the operations specified by the code instructions, back-end logic 4418 can retire the instructions of code 4404. In one embodiment, processor 4400 allows out of order execution but requires in order retirement of instructions. Retirement logic 4420 may take a variety of known forms (e.g., re-order buffers or the like). In this manner, processor 4400 is transformed during execution of code 4404, at least in terms of the output generated by the decoder, hardware registers and tables utilized by register renaming logic 4410, and any registers (not shown) modified by execution logic 4414.

Although not shown in FIG. 44, a processing element may include other elements on a chip with processor 4400. For example, a processing element may include memory control logic along with processor 4400. The processing element may include I/O control logic and/or may include I/O control logic integrated with memory control logic. The processing element may also include one or more caches. In some embodiments, non-volatile memory (such as flash memory or fuses) may also be included on the chip with processor 4400.

FIG. 45A is a block diagram illustrating both an exemplary in-order pipeline and an exemplary register renaming, out-of-order issue/execution pipeline according to one or more embodiments of this disclosure. FIG. 45B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 45A-45B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 45A, a processor pipeline 4500 includes a fetch stage 4502, a length decode stage 4504, a decode stage 4506, an allocation stage 4508, a renaming stage 4510, a scheduling (also known as a dispatch or issue) stage 4512, a register read/memory read stage 4514, an execute stage 4516, a write back/memory write stage 4518, an exception handling stage 4522, and a commit stage 4524.

FIG. 45B shows processor core 4590 including a front end unit 4530 coupled to an execution engine unit 4550, and both are coupled to a memory unit 4570. Processor core 4590 and memory unit 4570 are examples of the types of hardware that can be used in connection with the implementations shown and described herein (e.g., processor 102, memory 120). The core 4590 may be a reduced instruction set computing (RISC) core, a complex instruction set computing (CISC) core, a very long instruction word (VLIW) core, or a hybrid or alternative core type. As yet another option, the core 4590 may be a special-purpose core, such as, for example, a network or communication core, compression engine, coprocessor core, general purpose computing graphics processing unit (GPGPU) core, graphics core, or the like. In addition, processor core 4590 and its components represent example architecture that could be used to implement logical processors and their respective components.

The front end unit 4530 includes a branch prediction unit 4532 coupled to an instruction cache unit 4534, which is coupled to an instruction translation lookaside buffer (TLB) unit 4536, which is coupled to an instruction fetch unit 4538, which is coupled to a decode unit 4540. The decode unit 4540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 4540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 4590 includes a microcode ROM or other medium that stores microcode for certain macroinstructions (e.g., in decode unit 4540 or otherwise within the front end unit 4530). The decode unit 4540 is coupled to a rename/allocator unit 4552 in the execution engine unit 4550.

The execution engine unit 4550 includes the rename/allocator unit 4552 coupled to a retirement unit 4554 and a set of one or more scheduler unit(s) 4556. The scheduler unit(s) 4556 represents any number of different schedulers, including reservations stations, central instruction window, etc. The scheduler unit(s) 4556 is coupled to the physical register file(s) unit(s) 4558. Each of the physical register file(s) units 4558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 4558 comprises a vector registers unit, a write mask registers unit, and a scalar registers unit. These register units may provide architectural vector registers, vector mask registers, and general purpose registers (GPRs). In at least some embodiments described herein, register units 4558 are examples of the types of hardware that can be used in connection with the implementations shown and described herein (e.g., registers 110). The physical register file(s) unit(s) 4558 is overlapped by the retirement unit 4554 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 4554 and the physical register file(s) unit(s) 4558 are coupled to the execution cluster(s) 4560. The execution cluster(s) 4560 includes a set of one or more execution units 4562 and a set of one or more memory access units 4564. The execution units 4562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 4562 may also include an address generation unit to calculate addresses used by the core to access main memory (e.g., memory unit 4570) and a page miss handler (PMH).

The scheduler unit(s) 4556, physical register file(s) unit(s) 4558, and execution cluster(s) 4560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 4564). It should also be understood that where separate pipelines are used, one or more of these pipelines may be out-of-order issue/execution and the rest in-order.

The set of memory access units 4564 is coupled to the memory unit 4570, which includes a data TLB unit 4572 coupled to a data cache unit 4574 coupled to a level 2 (L2) cache unit 4576. In one exemplary embodiment, the memory access units 4564 may include a load unit, a store address unit, and a store data unit, each of which is coupled to the data TLB unit 4572 in the memory unit 4570. The instruction cache unit 4534 is further coupled to a level 2 (L2) cache unit 4576 in the memory unit 4570. The L2 cache unit 4576 is coupled to one or more other levels of cache and eventually to a main memory. In addition, a page miss handler may also be included in core 4590 to look up an address mapping in a page table if no match is found in the data TLB unit 4572.

By way of example, the exemplary register renaming, out-of-order issue/execution core architecture may implement the pipeline 4500 as follows: 1) the instruction fetch unit 4538 performs the fetch and length decoding stages 4502 and 4504; 2) the decode unit 4540 performs the decode stage 4506; 3) the rename/allocator unit 4552 performs the allocation stage 4508 and renaming stage 4510; 4) the scheduler unit(s) 4556 performs the scheduling stage 4512; 5) the physical register file(s) unit(s) 4558 and the memory unit 4570 perform the register read/memory read stage 4514; the execution cluster 4560 perform the execute stage 4516; 6) the memory unit 4570 and the physical register file(s) unit(s) 4558 perform the write back/memory write stage 4518; 7) various units may be involved in the exception handling stage 4522; and 8) the retirement unit 4554 and the physical register file(s) unit(s) 4558 perform the commit stage 4524.

The core 4590 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 4590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 4534/4574 and a shared L2 cache unit 4576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 46 illustrates a computing system 4600 that is arranged in a point-to-point (PtP) configuration according to an embodiment. In particular, FIG. 46 shows a system where processors, memory, and input/output devices are interconnected by a number of point-to-point interfaces. Generally, one or more of the computing systems or computing devices described herein may be configured in the same or similar manner as computing system 4600.

Processors 4670 and 4680 may be implemented as single core processors 4674*a* and 4684*a* or multi-core processors 4674*a*-4674*b* and 4684*a*-4684*b*. Processors 4670 and 4680 may each include a cache 4671 and 4681 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 4600. Moreover, processors 4670 and 4680 are examples of the types of hardware that can be used in connection with the implementations shown and described herein (e.g., processor 102).

Processors 4670 and 4680 may also each include integrated memory controller logic (IMC) 4672 and 4682 to communicate with memory elements 4632 and 4634, which may be portions of main memory locally attached to the respective processors. In alternative embodiments, memory controller logic 4672 and 4682 may be discrete logic separate from processors 4670 and 4680. Memory elements 4632 and/or 4634 may store various data to be used by processors 4670 and 4680 in achieving operations and functionality outlined herein.

Processors 4670 and 4680 may be any type of processor, such as those discussed in connection with other figures. Processors 4670 and 4680 may exchange data via a point-to-point (PtP) interface 4650 using point-to-point interface circuits 4678 and 4688, respectively. Processors 4670 and 4680 may each exchange data with an input/output (I/O) subsystem 4690 via individual point-to-point interfaces 4652 and 4654 using point-to-point interface circuits 4676, 4686, 4694, and 4698. I/O subsystem 4690 may also exchange data with a high-performance graphics circuit 4638 via a high-performance graphics interface 4639, using an interface circuit 4692, which could be a PtP interface circuit. In one embodiment, the high-performance graphics circuit 4638 is a special-purpose processor, such as, for example, a high-throughput MIC processor, a network or communication processor, compression engine, graphics processor, GPGPU, embedded processor, or the like. I/O subsystem 4690 may also communicate with a display 4633 for displaying data that is viewable by a human user. In alternative embodiments, any or all of the PtP links illustrated in FIG. 46 could be implemented as a multi-drop bus rather than a PtP link.

I/O subsystem 4690 may be in communication with a bus 4610 via an interface circuit 4696. Bus 4610 may have one or more devices that communicate over it, such as a bus bridge 4618, I/O devices 4614, and one or more other processors 4615. Via a bus 4620, bus bridge 4618 may be in communication with other devices such as a user interface 4622 (such as a keyboard, mouse, touchscreen, or other input devices), communication devices 4626 (such as modems, network interface devices, or other types of communication devices that may communicate through a computer network 4660), audio I/O devices 4624, and/or a storage unit 4628. Storage unit 4628 may store data and code 4630, which may be executed by processors 4670 and/or 4680. In alternative embodiments, any portions of the bus architectures could be implemented with one or more PtP links.

Program code, such as code 4630, may be applied to input instructions to perform the functions described herein and generate output information. The output information may be applied to one or more output devices, in known fashion. For purposes of this application, a processing system may be part of computing system 4600 and includes any system that has a processor, such as, for example; a digital signal processor (DSP), a microcontroller, an application specific integrated circuit (ASIC), or a microprocessor.

The program code (e.g., 4630) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 47:
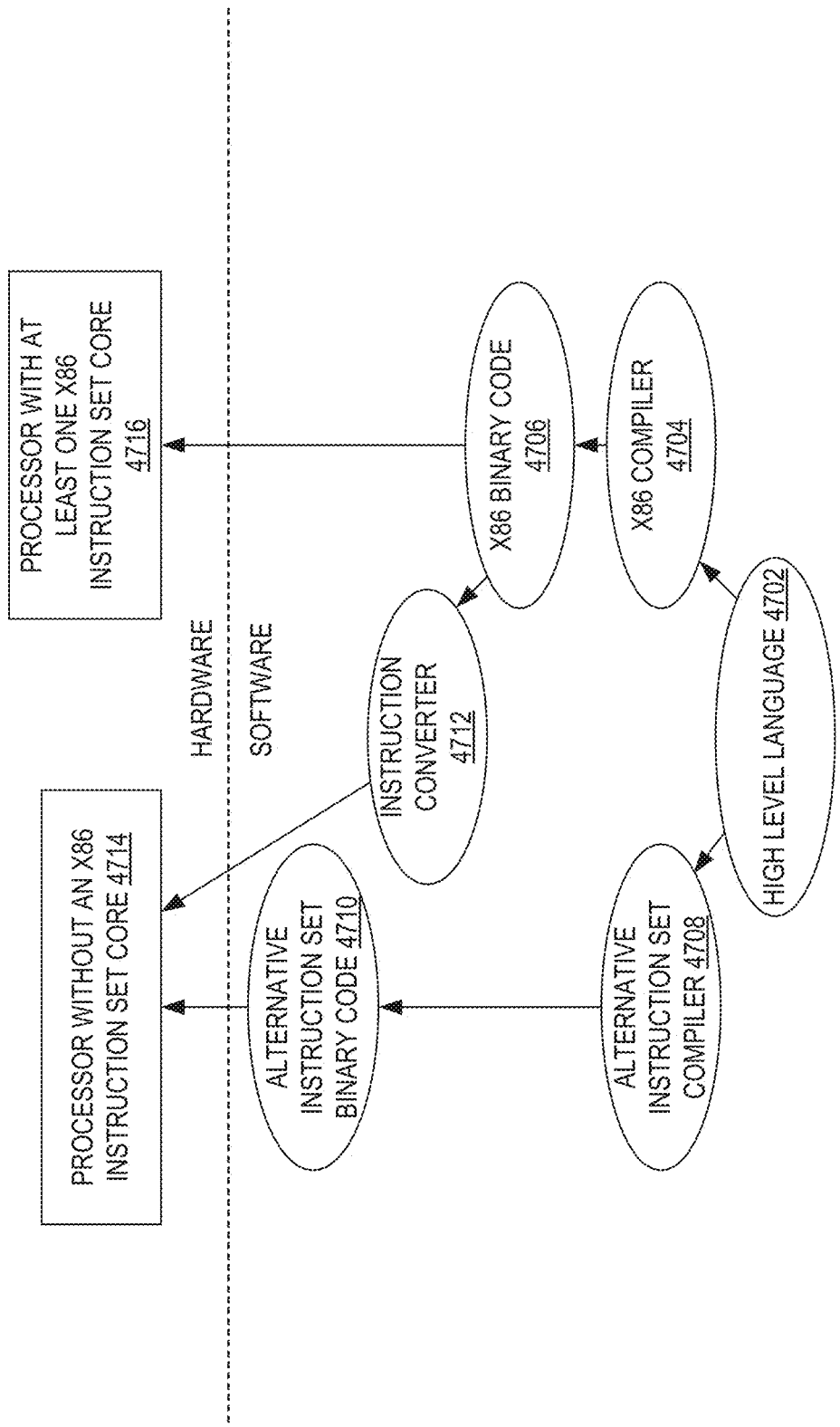
FIG. 47 is a block diagram contrasting the use of a software instruction converter to convert binary instructions in a source instruction set to binary instructions in a target instruction set according to embodiments of the present disclosure.

FIG. 47 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 47 shows a program in a high level language 4702 may be compiled using an x86 compiler 4704 to generate x86 binary code 4706 that may be natively executed by a processor with at least one x86 instruction set core 4716. The processor with at least one x86 instruction set core 4716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 4704 represents a compiler that is operable to generate x86 binary code 4706 (e.g., object code) that can, with or without additional linkage processing, be executed on the processor with at least one x86 instruction set core 4716. Similarly, FIG. 47 shows the program in the high level language 4702 may be compiled using an alternative instruction set compiler 4708 to generate alternative instruction set binary code 4710 that may be natively executed by a processor without at least one x86 instruction set core 4714 (e.g., a processor with cores that execute the MIPS instruction set of MIPS Technologies of Sunnyvale, CA and/or that execute the ARM instruction set of ARM Holdings of Sunnyvale, CA). The instruction converter 4712 is used to convert the x86 binary code 4706 into code that may be natively executed by the processor without an x86 instruction set core 4714. This converted code is not likely to be the same as the alternative instruction set binary code 4710 because an instruction converter capable of this is difficult to make; however, the converted code will accomplish the general operation and be made up of instructions from the alternative instruction set. Thus, the instruction converter 4712 represents software, firmware, hardware, or a combination thereof that, through emulation, simulation or any other process, allows a processor or other electronic device that does not have an x86 instruction set processor or core to execute the x86 binary code 4706.

One or more aspects of at least one embodiment may be implemented by representative instructions stored on a machine readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine readable media containing instructions or containing design data, such as Hardware Description Language (HDL), which defines structures, circuits, apparatuses, processors and/or system features described herein. Such embodiments may also be referred to as program products.

The computing system depicted in FIG. 46 is a schematic illustration of an embodiment of a computing system that may be utilized to implement various embodiments discussed herein. It will be appreciated that various components of the system depicted in FIG. 46 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Any of the flows, methods, processes (or portions thereof) or functionality of any of the various components described below or illustrated in the figures may be performed by any suitable computing logic, such as one or more modules, engines, blocks, units, models, systems, or other suitable computing logic. Reference herein to a "module", "engine", "block", "unit", "model", "system" or "logic" may refer to hardware, firmware, software and/or combinations of each to perform one or more functions. As an example, a module, engine, block, unit, model, system, or logic may include one or more hardware components, such as a micro-controller or processor, associated with a non-transitory medium to store code adapted to be executed by the micro-controller or processor. Therefore, reference to a module, engine, block, unit, model, system, or logic, in one embodiment, may refers to hardware, which is specifically configured to recognize and/or execute the code to be held on a non-transitory medium. Furthermore, in another embodiment, use of module, engine, block, unit, model, system, or logic refers to the non-transitory medium including the code, which is specifically adapted to be executed by the microcontroller or processor to perform predetermined operations. And as can be inferred, in yet another embodiment, a module, engine, block, unit, model, system, or logic may refer to the combination of the hardware and the non-transitory medium. In various embodiments, a module, engine, block, unit, model, system, or logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. A module, engine, block, unit, model, system, or logic may include one or more gates or other circuit components, which may be implemented by, e.g., transistors. In some embodiments, a module, engine, block, unit, model, system, or logic may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, or logics) may share hardware, software, firmware, or a combination thereof, while potentially retaining some independent hardware, software, or firmware.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus comprising:
a processor unit comprising:
circuitry to generate, for a first network host, a request for an object of a second network host, wherein the request comprises an address comprising a routable host ID of the second network host and an at least partially encrypted object ID, wherein the address uniquely identifies the object within a distributed computing domain, wherein the routable host ID in the request comprises an Internet Protocol address of the second network host, and wherein the distributed computing domain comprises a plurality of Internet Protocol hosts; and
a memory element to store at least a portion of the object.

2. The apparatus of claim 1, wherein the partially encrypted object ID is unforgeable.

3. The apparatus of claim 1, wherein the circuitry is to execute a memory access instruction having an operand that references the address.

4. The apparatus of claim 1, wherein the object ID includes context information for a cryptographic operation associated with the object.

5. The apparatus of claim 1, wherein the address comprises at least 128 bits.

6. The apparatus of claim 1, wherein the routable host ID is 64 bits long and the object ID is 64 bits long.

7. The apparatus of claim 1, wherein the circuitry is to use the address as a cryptographic key to decrypt the object.

8. The apparatus of claim 1, wherein the distributed computing domain comprises the entire Internet.

9. The apparatus of claim 1, wherein the circuitry is to generate the request responsive to a call instruction referencing the address and a determination to offload execution of a code object based on a current load of a processor unit running the first network host.

10. The apparatus of claim 1, wherein the circuitry is to generate the request responsive to a determination that a page table does not include a mapping of the object ID to a physical address.

11. The apparatus of claim 1, further comprising a key lookaside buffer to associate the host ID with a key to decrypt the object.

12. The apparatus of claim 11, wherein the circuitry is to invoke an authorization protocol to obtain the key responsive to a miss in the key lookaside buffer.

13. Computer-readable media comprising instructions that, when executed by a machine, cause the machine to:
generate, by a first network host, a request for an object of a second network host, wherein the request comprises an address comprising a routable host ID of the second network host and an at least partially encrypted object ID, wherein the address uniquely identifies the object within a distributed computing domain, wherein the routable host ID in the request comprises an Internet Protocol address of the second network host, and wherein the distributed computing domain comprises a plurality of Internet Protocol hosts; and
access the object.

14. The media of claim 13, wherein the partially encrypted object ID is unforgeable.

15. The media of claim 13, the instructions to cause the machine to execute, by the first network host, a memory access instruction having an operand that references the address.

16. The media of claim 13, wherein the object ID includes context information for a cryptographic operation associated with the object.

17. The media of claim 13, wherein the address comprises at least 128 bits.

18. The media of claim 13, wherein the routable host ID is 64 bits long and the object ID is 64 bits long.

19. The media of claim 13, the instructions to cause the machine to use the address as a cryptographic key to decrypt the object.

20. The media of claim 13, wherein the distributed computing domain comprises the entire Internet.

21. The media of claim 13, the instructions to cause the machine to generate the request responsive to a call instruction referencing the address and a determination to offload execution of a code object based on a current load of a processor unit running the first network host.

22. The media of claim 13, the instructions to cause the machine to generate the request responsive to a determination that a page table does not include a mapping of the object ID to a physical address.

23. A method comprising:
   generating, by a first network host, a request for an object of a second network host, wherein the request comprises an address comprising a routable host ID of the second network host and an at least partially encrypted object ID, wherein the address uniquely identifies the object within a distributed computing domain, wherein the routable host ID of the request comprises an Internet Protocol address of the second network host, and wherein the distributed computing domain comprises a plurality of Internet Protocol hosts; and
   accessing the object.

\* \* \* \* \*